US008533583B2

(12) United States Patent  
Miyahara et al.

(10) Patent No.: US 8,533,583 B2  
(45) Date of Patent: Sep. 10, 2013

(54) APPLICATION SOFTWARE GENERATION DEVICE, COMPUTER PROGRAM PRODUCT AND APPLICATION SOFTWARE GENERATION SYSTEM

(75) Inventors: Kouji Miyahara, Setagaya (JP); Koji Nishitani, Ome (JP); Hideki Takamura, Fussa (JP); Noriyoshi Katsumura, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 275 days.

(21) Appl. No.: 12/691,983

(22) Filed: Jan. 22, 2010

(65) Prior Publication Data

US 2010/0199163 A1 Aug. 5, 2010

(30) Foreign Application Priority Data

Jan. 30, 2009 (JP) ................................ 2009-020567

(51) Int. Cl.
*G06F 17/00* (2006.01)

(52) U.S. Cl.
USPC ........................... 715/220; 715/212; 715/213

(58) Field of Classification Search
USPC ......................... 715/200, 212, 213, 218, 220
See application file for complete search history.

(56) References Cited

U.S. PATENT DOCUMENTS

| | | | |
|---|---|---|---|
| 5,604,516 A | 2/1997 | Herrod et al. | |
| 6,325,283 B1 * | 12/2001 | Chu et al. | 235/375 |
| 7,319,863 B2 * | 1/2008 | Engstrom et al. | 455/414.3 |
| 7,536,713 B1 * | 5/2009 | Bartholomew | 726/7 |
| 2005/0136949 A1 * | 6/2005 | Barnes | 455/461 |
| 2007/0119941 A1 | 5/2007 | He | |
| 2007/0203811 A1 * | 8/2007 | Hoopes et al. | 705/28 |
| 2007/0204164 A1 * | 8/2007 | Cattrone et al. | 713/176 |
| 2007/0215706 A1 | 9/2007 | Kotlarsky et al. | |
| 2007/0283273 A1 * | 12/2007 | Woods | 715/738 |
| 2007/0300167 A1 | 12/2007 | Kadur et al. | |
| 2008/0050107 A1 * | 2/2008 | Yamashita et al. | 396/89 |
| 2008/0126260 A1 * | 5/2008 | Cox et al. | 705/67 |
| 2008/0201319 A1 * | 8/2008 | McNamar | 707/5 |

(Continued)

FOREIGN PATENT DOCUMENTS

| | | |
|---|---|---|
| JP | 2000-056908 A | 2/2000 |
| JP | 2004-164195 A | 6/2004 |

(Continued)

OTHER PUBLICATIONS

Japanese Office Action dated Oct. 19, 2010 (and English translation thereof) in counterpart Japanese Application No. 2009-020567.

(Continued)

*Primary Examiner* — Stephen S. Hong  
*Assistant Examiner* — Gregory J Vaughn  
(74) *Attorney, Agent, or Firm* — Holtz, Holtz, Goodman & Chick, PC

(57) ABSTRACT

Disclosed is an application software generation device to generate an application software for a data collection device having a reading unit to read discrimination information to carry out collection of data based on the discrimination information including a table data generation unit to generate table data for defining arbitrary items, an application software generation unit to generate an application software which is executed by the data collection device in order to collect the data based on the item which is defined in the table data and a transfer unit to transfer the generated application software to the data collection device.

9 Claims, 44 Drawing Sheets

(56) References Cited

U.S. PATENT DOCUMENTS

| | | | |
|---|---|---|---|
| 2009/0045260 A1* | 2/2009 | Blake et al. | 235/462.15 |
| 2009/0048917 A1* | 2/2009 | Blake et al. | 705/14 |
| 2009/0049109 A1* | 2/2009 | Blake et al. | 707/204 |
| 2009/0144624 A1* | 6/2009 | Barnes, Jr. | 715/719 |

FOREIGN PATENT DOCUMENTS

| | | |
|---|---|---|
| JP | 2005-031815 A | 2/2005 |
| JP | 2005-031816 A | 2/2005 |
| WO | WO 2007/149735 A2 | 12/2007 |

OTHER PUBLICATIONS

Extended European Search Report dated Jul. 9, 2010 (in English) issued in counterpart European Application No. 10150707.7.

Japanese Office Action dated Jun. 11, 2013 (and English translation thereof) issued in Japanese Application No. 2011-088580, which is a Japanese Divisional application of priority Japanese Application No. 2009-020567.

* cited by examiner

| | A | B | C | D | E | F | G | H |
|---|---|---|---|---|---|---|---|---|
| 1 | DATE OF INVENTORY | PERSON IN CHARGE | PRODUCT CODE | QUANTITY | | | | |
| 2 | 20080101 | 012345 | 1234567890123 | 12345 | | | | |
| 3 | | | | | | | | |
| 4 | | | | | | | | |
| 5 | | | | | | | | |

\\ APPLICATION GENERATION \\ INVENTORY \\ FLOOR INVENTORY \\ AREA INVENTORY \\

| | A | B | C | D | E | F | G | H |
|---|---|---|---|---|---|---|---|---|
| 1 | DATE OF INVENTORY | PERSON IN CHARGE | FLOOR | PRODUCT CODE | QUANTITY | | | |
| 2 | 20080101 | 012345 | 10 | 1234567890123 | 12345 | | | |
| 3 | | | | | | | | |
| 4 | | | | | | | | |
| 5 | | | | | | | | |

\\ APPLICATION GENERATION \\ INVENTORY \\ FLOOR INVENTORY \\ AREA INVENTORY \\

| | A | B | C | D | E | F | G | H |
|---|---|---|---|---|---|---|---|---|
| 1 | DATE OF INVENTORY | PERSON IN CHARGE | FLOOR | PLACE | PRODUCT | QUANTITY | | |
| 2 | 20080101 | 012345 | 10 | 10 | 3014260274856 | 12345 | | |
| 3 | | | | | | | | |
| 4 | | | | | | | | |
| 5 | | | | | | | | |

\\ APPLICATION GENERATION \\ INVENTORY \\ FLOOR INVENTORY \\ AREA INVENTORY \\

2008/12/25/THU 22:07
INVENTORY

DATE OF INVENTORY  NUMBER OF CASES 0
PERSON IN CHARGE  20081225
PRODUCT CODE
QUANTITY

END    ENTER

FIG.7B

2008/12/25/THU 22:07
FLOOR INVENTORY

DATE OF INVENTORY  NUMBER OF CASES 0
PERSON IN CHARGE  20081225
FLOOR
PRODUCT CODE
QUANTITY

END    ENTER

FIG.7C

2008/12/25/THU 22:08
AREA INVENTORY

DATE OF INVENTORY  NUMBER OF CASES 0
PERSON IN CHARGE  20081225
FLOOR
PLACE
PRODUCT
QUANTITY

END    ENTER

2008/12/25/THU 21:47

INVENTORY

NUMBER OF CASES  0

DATE OF INVENTORY

PERSON IN CHARGE

PRODUCT CODE

QUANTITY

END    ENTER

2008/12/25/THU 21:47

INVENTORY

NUMBER OF CASES  0

DATE OF INVENTORY  20081225

PERSON IN CHARGE  111456

PRODUCT CODE

QUANTITY

END    ENTER

72

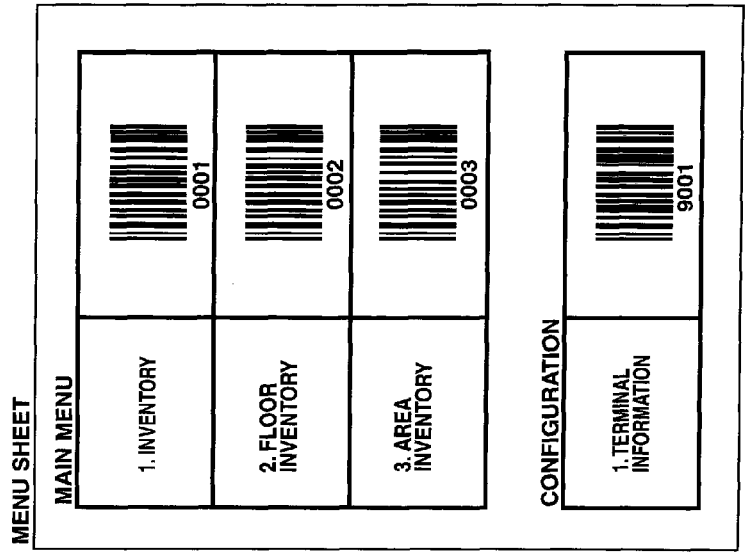
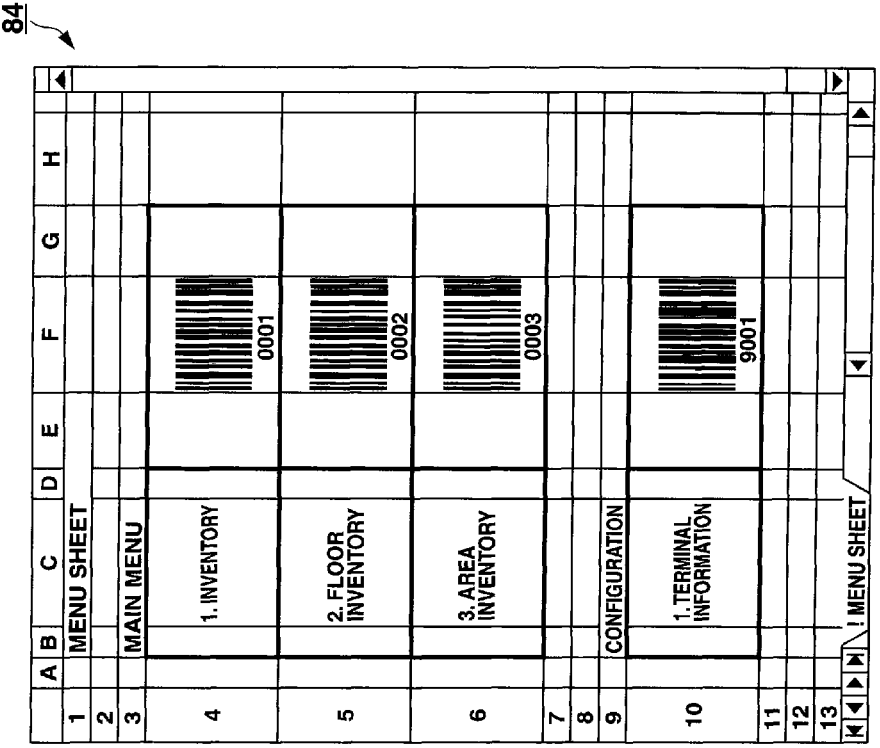

FIG.11A

| | A | B | C | D | E | F | G |
|---|---|---|---|---|---|---|---|
| 1 | DATE OF INVENTORY | PERSON IN CHARGE | PRODUCT CODE | QUANTITY | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |

\ INVENTORY \ FLOOR INVENTORY \ AREA INVENTORY \

FIG.11B

| | A | B | C | D | E | F | G |
|---|---|---|---|---|---|---|---|
| 1 | DATE OF INVENTORY | PERSON IN CHARGE | PRODUCT CODE | QUANTITY | | | |
| 2 | 20081226 | 011456 | 4003424909177 | 2 | | | |
| 3 | 20081226 | 011456 | 4033100001703 | 3 | | | |
| 4 | 20081226 | 011456 | 4033100009280 | 4 | | | |
| 5 | 20081226 | 011456 | 4210201302131 | 6 | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |

\ INVENTORY \ FLOOR INVENTORY \ AREA INVENTORY \

BS1

0001

BE1

9001

[MAIN MENU]
1=S1,S1.INI,0001
2=S2,S2.INI,0002
:
i=Si,Si.INI,0000+i

[CONFIGURATION]
1=E1,E1.INI,9001
2=E2,E2.INI,9002
:
j=Ej,Ej.INI,9000+j

```
[CTRL_BASE]
1=TITLE1 ,TITLE ,T1x,T1y,T1w,T1h,Si
2=BTN_END ,BUTTON,B1x,B1y,B1w,B1h,END
3=BTN_ENTRY,BUTTON,B2x,B2y,B2w,B2h,ENTER

[CTRL]
1=LABEL1,LABEL ,L1x,L1y,L1w,L1h,SiF1
2=EDIT1 ,EDIT ,E1x,E1y,E1w,E1h,
3=LABEL2,LABEL ,L1x,L1y,L1w,L1h,SiF2
4=EDIT2 ,EDIT ,E2x,E2y,E2w,E2h,
 :
ni*2-1=LABELni,LABEL ,Lnix,Lniy,Lniw,Lnih,SiFni
ni*2  =EDITni ,EDIT  ,Enix,Eniy,Eniw,Enih,

[FOCUS]
ORDER=EDIT1,EDIT2,…,EDITni
FIRST=EDIT1
SECOND=EDIT2

[SCAN]
1=NON
2=ALL
 :
ni=NON

[ENTRY]
FILENAME=Si.TXT
CONNECT=DATA.XLS
TABLE=Si
FIELDS=SiF1,SiF2,…,SiFni
VALUES=EDIT1,EDIT2,…,EDITni
```

FIG.18
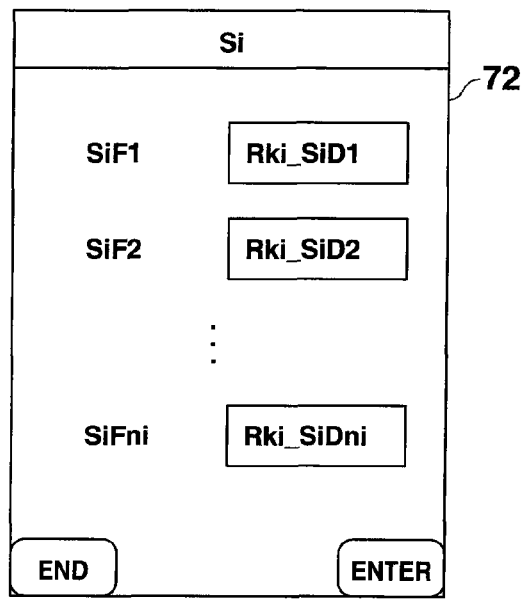
FIG.19
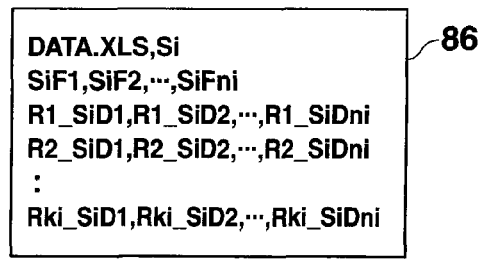
FIG.20
| | 1 | 2 | ... | ni |
|---|---|---|---|---|
| 1 | SiF1 | SiF2 | ... | SiFni |
| 2 | R1_SiD1 | R1_SiD2 | ... | R1_SiDni |
| 3 | R2_SiD1 | R2_SiD2 | ... | R2_SiDni |
| ⋮ | ⋮ | ⋮ | ⋮ | ⋮ |
| Ki+1 | Rki_SiD1 | Rki_SiD2 | ... | Rki_SiDni |

FIG.63

| | A | B | C |
|---|---|---|---|
| 1 | PRODUCT CODE | PRODUCT NAME | PRODUCT NAME READING |
| 2 | 3014260274856 | aaaaaa | AAAAAAAA |
| 3 | 3014260274917 | bbbbbb | BBBBBBBB |
| 4 | 3068320007373 | cccccc | |
| 5 | 3068320012834 | dddddd | |
| 6 | 3068320013473 | eeeeee | |
| 7 | 4003424909177 | ffffff | |
| 8 | 4032900000053 | gggggg | |
| 9 | 4003425436832 | hhhhhh | |
| 10 | 4511321110607 | iiiiii | |
| 11 | 4513147007574 | jjjjjj | |
| 12 | 4513147006232 | kkkkkk | |
| 13 | 4033100000300 | llllll | |
| 14 | 4511914002005 | mmmmmm | |
| 15 | 4033100009280 | nnnnnn | |
| 16 | 4033100001406 | oooooo | |
| 17 | 4210201294382 | pppppp | PPPPPPPP |
| 18 | 4210201302131 | qqqqqq | QQQQQQQQ |
| 19 | 4033100004414 | rrrrrr | RRRRRRRR |
| 20 | 4033100001598 | ssssss | SSSSSSSS |
| 21 | 4513861999845 | tttttt | TTTTTTTT |
| 22 | 4511977055956 | uuuuuu | UUUUUUUU |
| 23 | 4513364100171 | vvvvvv | VVVVVVVV |

Context menu:
- CUT(T)
- COPY(C)
- PASTE(P)
- SELECT FORMAT AND PASTE(S)...
- INSERT(I)
- DELETE(D)
- CLEAR FORMULA AND VALUE(N)
- CELL FORMAT SETTING(F)...
- COLUMN WIDTH(C)...
- HIDE(H)
- REDISPLAY(U)
- CREATE BARCODE LABEL

Tabs: FIXED ASSET MT / PRODUCT MT / PERSON IN CHARGE MT

CREATE BARCODE LABEL

PLEASE ASSIGN TYPE OF BARCODE TO BE CREATED

- CODE128
- CODE39
- JAN/EAN8
- JAN/EAN13

[OK] [CANCEL]

FIG.64

| | A | B | C |
|---|---|---|---|
| 1 | aaaaaa 3014260274856 | kkkkkk 4513147006232 | uuuuuu 4511977055956 |
| 2 | bbbbbb 3014260274917 | llllll 4033100000300 | vvvvvv 4513364100171 |
| 3 | cccccc 3068320007373 | mmmmmm 4511914002005 | wwwwww 4513364100164 |
| 4 | dddddd 3068320012834 | nnnnnn 4033100009280 | xxxxxx 4513147009592 |
| 5 | eeeeee 3068320013473 | oooooo 4033100001406 | yyyyyy 4513147010673 |
| 6 | ffffff 4003424909177 | pppppp 4210201294382 | zzzzzz 4033100001703 |

87

SHEET1

APPLICATION SOFTWARE GENERATION DEVICE, COMPUTER PROGRAM PRODUCT AND APPLICATION SOFTWARE GENERATION SYSTEM

BACKGROUND OF THE INVENTION

1. Field of the Invention

The present invention relates to an application software generation device, a computer program product and an application software generation system.

2. Background Art

In order to know and manage various types of information such as quantity of materials in case of inventory and the like, data collection devices (for example, a barcode reader, a RFID reader and the like) which read an identifier (for example, barcode, RFID and the like) applied to each material to take in as data are known.

As such data collection devices, there is a data collection device which takes on a form of such as a handy terminal in consideration of holding, carrying, managing and the like in the reading operation of an identifier applied to each material to be carried out in a facility housing a large number of materials. Hereinafter, as an example of the data collection device, a handy terminal which reads barcodes will be described.

Type of data to be collected by the handy terminal is not limited to one type and covers many types according to purposes. Therefore, there is a handy terminal which can execute application software depending on the data to be collected. In a case where such handy terminal is used, the application according to the data which is desired to be collected is transferred to the handy terminal from an external computer or the like, and then, the control unit of the handy terminal is made to execute the application. Hereinafter, "application" indicates application software.

In a case where the handy terminal in which different application is executed depending on the data to be collected is used, an arbitrary data can be collected by creating an application according to the data to be collected. However, technical knowledge is needed in order to create application. Therefore, it is difficult to create application according to items which are desired to be collected and the cost is expensive. In view of these problems, there are disclosed an application generation method and an application generation system for efficiently carrying out an application creating process by using a special program tool which supports creating of applications which are to be executed in the handy terminal (for example, JP2005-031816 and JP2005-031815).

However, when the program tools disclosed in JP2005-031816 and JP2005-031815 are used, special knowledge for using the program tool is needed. Therefore, using the program tool will be a difficult operation for those who do not know the method of using the program tool or who are not experienced in using the program tool. That is, even when the program tool is used, there is no difference to those who are not used to creating application that the creating of application is a difficult operation. Therefore, it is almost impossible for those who are not used to creating application to discretionary create application according to the items which are desired to be collected.

The above problems are not limited to the handy terminal which reads barcodes, but they also apply to data collection devices which can execute application.

An object of the present invention is to easily create application software which is to be executed in a data collection device.

SUMMARY OF THE INVENTION

According to a first aspect of the present invention, an application software generation device to generate an application software for a data collection device having a reading unit to read discrimination information to carry out collection of data based on the discrimination information comprises a table data generation unit to generate table data for defining arbitrary items, an application software generation unit to generate an application software which is executed by the data collection device in order to collect the data based on the item which is defined in the table data and a transfer unit to transfer the generated application software to the data collection device.

According to a second aspect of the present invention, a computer program product to make a computer generate an application software for a data collection device having a reading unit to read discrimination information carry out a data collection based on the discrimination information, and the computer program product is readable by the computer and carries out encoding of instructions for executing a computer process, and the computer process includes a table data generation step to generate table data which defines arbitrary items, an application software generation step to generate the application software to be executed by the data collection device to collect the data based on the items which are defined in the table data and a transfer step to transfer the generated application software to the data collection device.

According to a third aspect of the present invention, an application software generation system comprises a data collection device having a reading unit to read discrimination information, and an application software generation device to generate an application software for the data collection device to carry out a data collection based on the discrimination information, and the application software generation device comprises a table data generation unit to generate table data to define arbitrary items, an application software generation unit to generate an application to be executed by the data collection device to collect the data based on the items defined in the table data and a transfer unit to transfer the generated application software to the data collection device.

According to the present invention, application software which is to be executed in a data collection device can be created easily.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 4 is an explanatory diagram showing a schema of a processing content of the application generation system;

FIG. 5A is a diagram showing an example of table data indicating a state where an "inventory" sheet of the table data is focused;

FIG. 5B is a diagram showing an example of the table data indicating a state where a "floor inventory" sheet of the table data is focused;

FIG. 5C is a diagram showing an example of the table data indicating a state where an "area inventory" sheet of the table data is focused;

FIG. 7A is a diagram showing an example of a display content of a display unit of a handy terminal where an operation application is being executed, indicating the display content corresponding to an operation application definition of "inventory";

FIG. 7B is a diagram showing an example of a display content of the display unit of the handy terminal where the operation application is being executed, indicating a display content corresponding to an operation application definition of "floor inventory";

FIG. 7C is a diagram showing an example of a display content of the display unit of the handy terminal where the operation application is being executed, indicating a display content corresponding to an operation application definition of "area inventory";

FIG. 8A is a diagram showing an example of a focus position in a display screen when the operation application is being executed, indicating a state before data of inventory and person in charge are inputted and the display content being corresponded to the operation application definition of "inventory" shown in FIG. 7A;

FIG. 8B is a diagram showing an example of the focus position in the display screen when the operation application is executed, indicating a state after date of inventory and person in charge are inputted and the display content being corresponded to the operation application definition of "inventory" shown in FIG. 7A;

FIG. 10A is a diagram showing an example of a menu sheet, indicating a display example of the menu sheet which is generated as the last sheet of the table data;

FIG. 10B is a diagram showing an example of the menu sheet, indicating a printed menu sheet;

FIG. 11A is a diagram showing a display example of a registration table data, indicating the registration table data before registration data is stored;

FIG. 11B is a diagram showing a display example of the registration table data, indication the registration table data after the registration data is stored;

FIG. 16 is a diagram showing an example of a content of an operation application definition;

FIG. 18 shows an example of a display content of the operation application in a state where input is carried out to each textbox;

FIG. 19 shows an example of a content of registration data;

FIG. 20 is a schematic diagram showing an example of a content of registration table data after data of the registration data is stored;

FIG. 63 shows an example of a display content of a display device when creating a barcode label; and FIG. 64 shows an example of print data of the generated barcode label.

DETAILED DESCRIPTION OF THE PREFERRED EMBODIMENT

Hereinafter, an embodiment of the present invention will be described in detail with reference to the drawings.

Figure 1:
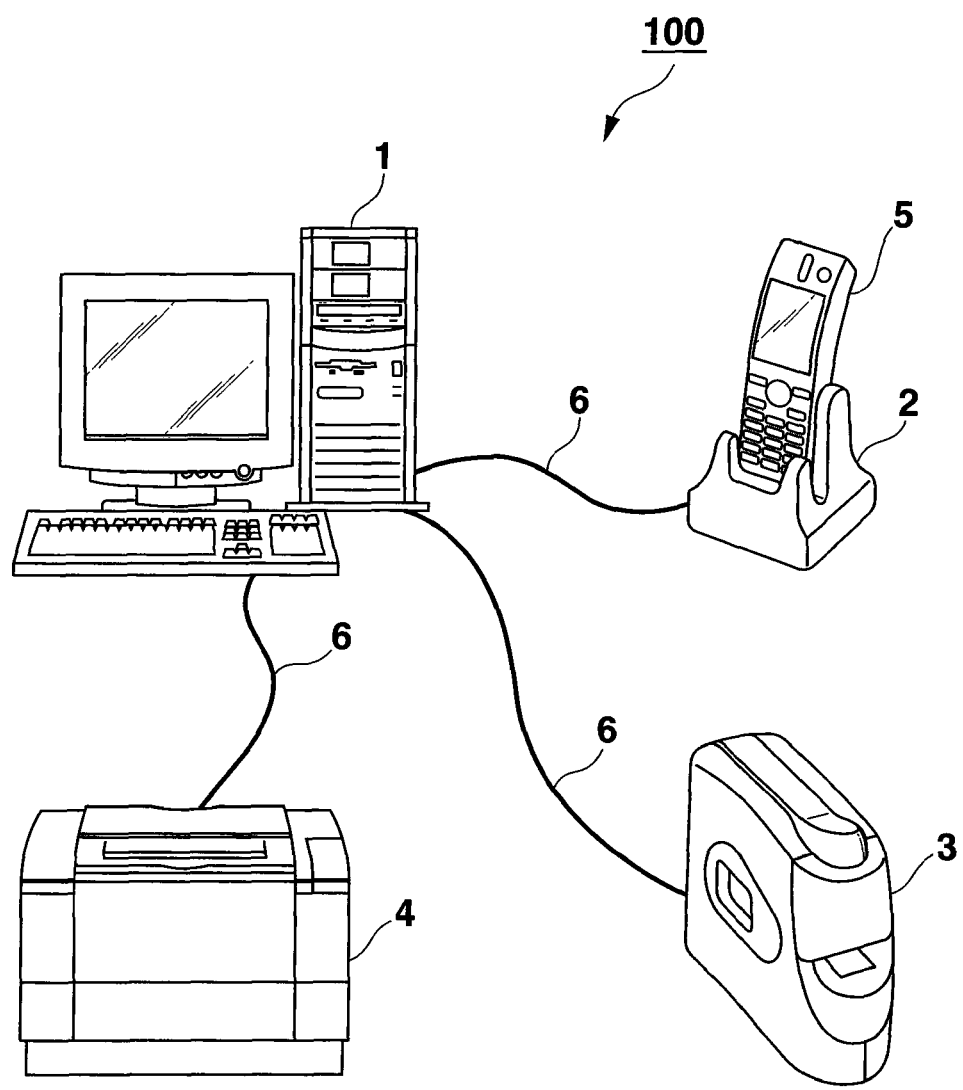
FIG. 1 is a diagram showing a structure of an application generation system including a data processing device which functions as an application generation device.

FIG. 1 is a diagram showing a structure of an application generation system 100 including a data processing device 1 which functions as an application generation device.

The application generation system 100 comprises a data processing device 1, a cradle 2, a label printer 3, a printer 4 and a handy terminal 5. The data processing device 1 and each of other devices are connected via a cable 6.

The data processing device 1 is a computer having a function to generate an application which is to be executed by the handy terminal 5, a function to transfer the generated application to the handy terminal, a function to take in and store data which is stored in the handy terminal 5, a function to carry out a control of printing by the label printer 3 and the printer 4 and a function to control other various types of operations of the application generation system 1.

The cradle 2 is connected with the data processing device 1 via the cable 6, and also, the cradle 2 includes a connection terminal to connect with a terminal of a communication device 36 (after mentioned) of the handy terminal 5 which is mounted on the cradle 2. Further, the cradle 2 functions as an interface for connecting the handy terminal 5 and the data processing device 1.

The label printer 3 has a function to printout a label in which barcodes that can be read by the scanner 41 (after mentioned) of the handy terminal 5 are printed.

The printer 4 has a function to carry out various types of printings including a printing of menu sheets for selecting application which is to be executed by the handy terminal 5.

The handy terminal 5 executes the application which is transferred from the data processing device 1. The handy terminal 5 has a function to collect and store various types of data by reading the barcodes by the scanner 41 (after mentioned) and a function to store the data which is inputted by the input operation by the input device 37 (after mentioned). The definition of the data which is collected and stored by the handy terminal 5 is based on the application.

Figure 2:
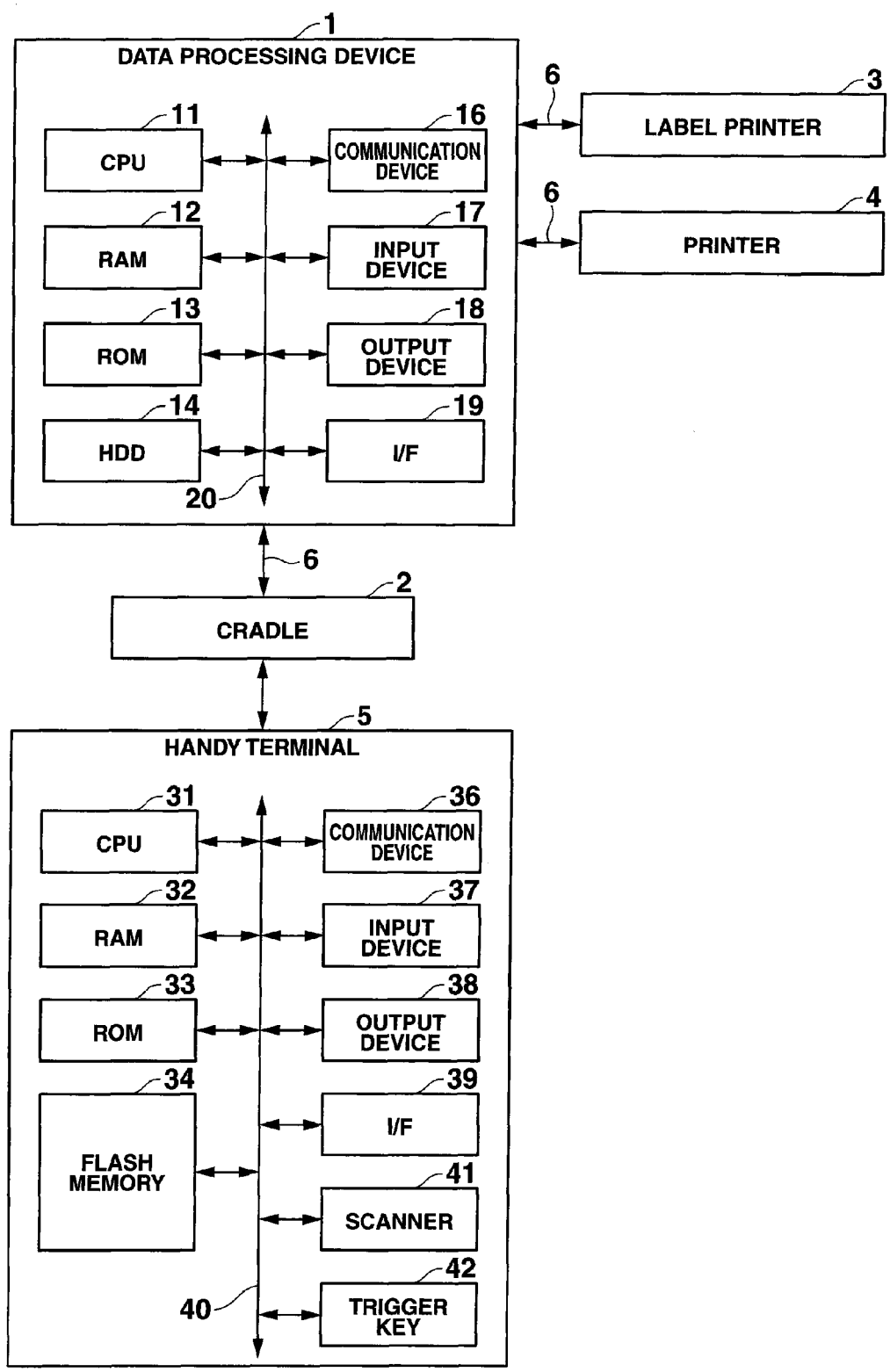
FIG. 2 is a block diagram of each structure of the application generation system.

FIG. 2 is a block diagram of each structure of the application generation system 100.

The data processing device 1 comprises CPU 11, RAM 12, ROM 13, HDD 14, a communication device 16, an input device 17, a display device 18 and an interface 19 (in the following description and diagrams, the interface 19 is indicated as I/F 19), and each of these compositions are connected by a bus 20.

The CPU 11 reads and carries out execution process of programs, data and the like according to processing content from the ROM 13 and the HDD 14 to carry out various types of processes related to operations of the data processing device 1 and the application generation system 100. The programs and data which are read and the parameters and the like which are temporarily generated in the process carried out by the CPU 11 are stored in the RAM 12.

The ROM 13 stores various types of programs, data and the like which are read by the CPU 11, the programs, data and the like being non-rewritable. The HDD 14 stores various types of programs, data and the like which are read by the CPU 11 so as to be rewritable, and also, the HDD 14 functions as a storage region to store various types of data generated as processing result of the CPU 11, data taken in from the handy terminal 5 and the like.

The communication device 16 has a function to carry out communication with other devices. The communication device 16 is a Network Interface Card (NIC) and a wireless LAN device for the Ethernet (registered trademark) connection, a device for communication by Bluetooth and the like, for example, and the devices can be used depending on the usages.

The input device 17 carries out input from outside relating to various types of processing contents which are carried out by the data processing device 1. The input device 17 is a key board, a mouse and the like, for example, and human interfaces other than a key board, a mouse and the like can also be used.

The display device 18 displays content of screen output which is carried out by the data processing device 1. The display device 18 is a liquid crystal display, a cathode-ray display, an organic Electro Luminescence display or the like, for example, and screen display devices other than the above can also be used.

The I/F 19 is an interface to connect the data processing device 1 and other devices. The I/F 19 is USB (Universal Serial Bus), IEEE1394 or other serial port or parallel port and the like, for example, and can be used depending on the usages. In the embodiment, the data processing device 1, the cradle 2, the label printer 3 and the printer 4 are connected via USB, and the cable 6 are USB cables.

The handy terminal 5 comprises CPU 31, RAM 32, ROM 33, a flash memory 34, a communication device 36, an input device 37, a display device 38, an interface 39 (in the following description and drawings, the interface 39 is indicated as I/F 39), a scanner 41 and a trigger 42, and each of the compositions are connected by a bus 40.

The CPU 31 reads programs, data and the like according to the processing content from the ROM 33 and the flash memory 34 and carries out the execution process to carry out various types of processes regarding operation of the handy terminal 5. The programs, data and the like which are read and parameters and the like which are temporarily generated in the process which is carried out by the CPU 31 are stored in the RAM 32.

The ROM 33 stores various types of programs, data and the like which are read by the CPU 31, the programs, data and the like being non-rewritable. The flash memory 34 stores various types of programs, data and the like which are read by the CPU 31 so as to be rewriteable, and also, the flash memory 34 functions as a storage region to store various types of data which are generated as processing result of the CPU 31 and the application which are transmitted from the data processing device 1 and the like.

The communication device 36 has a function to carry out communication with other devices. The communication device 36 is Network Interface Card (NIC) and a wireless LAN device for the Ethernet (registered trademark) connection, a device for communication by Bluetooth and the like, for example, and the devices can be used depending on the usages. The communication device 36 has a terminal for connecting with a connection terminal of the cradle 2, and the communication device 36 is structured so as to carry out communication with the communication device 16 of the data processing device 1 via the cradle 2 and the cable 6.

The input device 37 carries out input from outside regarding various types of processing contents which are carried out by the handy terminal 5. The input device 37 is buttons, keys or the like which are provided integrally with the handy terminal 5, for example, and other human interfaces such as an external key board can also be used.

The display device 38 displays a screen output content of the handy terminal 5. The display device 38 is a liquid crystal display, an organic Electro Luminescence display or the like, for example, and other screen display devices can also be used.

The I/F 39 is an interface for connecting the handy terminal 5 with other devices. The I/F 39 is USB (Universal Serial Bus), IEEE1394 or other serial port or parallel port and the like, and can be used depending on the usages. In the embodiment, the handy terminal 5 and the cradle 2 are connected via USB, and a USB port to connect with the data processing device 1 and a USB port to connect with the handy terminal 5 are individually provided at the cradle 2 as the interfaces 51 (I/F 51).

The scanner 41 reads barcodes. Particularly, when the reading unit of the scanner 41 is held over a barcode while the scanner 41 is operating, the scanner 41 reads information indicated by the barcode. The information read by the scanner 41 is input to the CPU 31 as data.

The trigger key 42 is a key to switch ON/OFF of operation of the scanner 41. When the scanner 41 is turned ON by the operation of the trigger key 42, reading of barcodes by the scanner 41 can be carried out.

Figure 3:
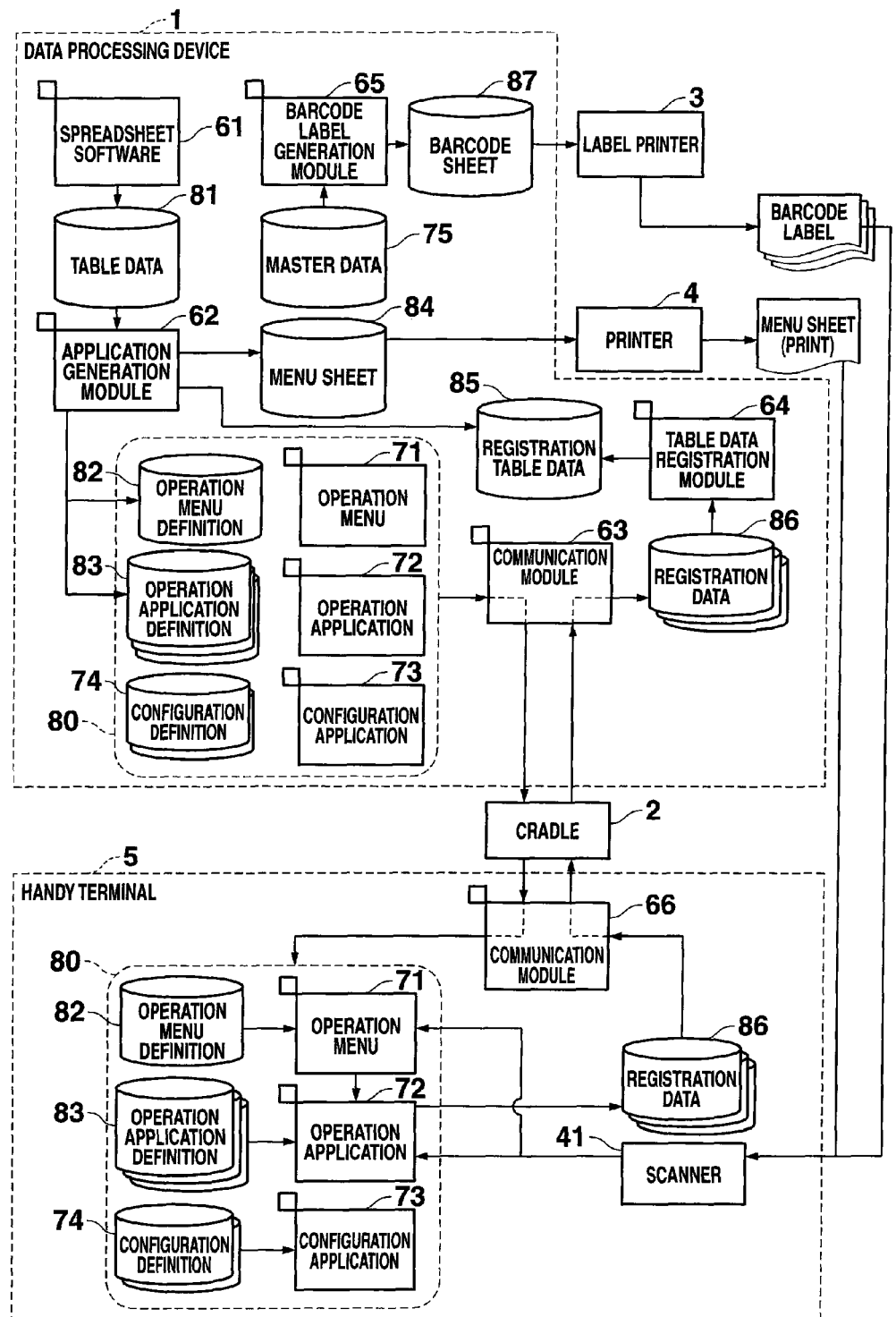
FIG. 3 is a diagram showing a structure of software and data of the application generation system.

FIG. 3 is a diagram showing a structure of software and data of the application generation system 100.

The data processing device 1 comprises various types of software such as a spreadsheet software 61, an application generation module 62, a communication module 63, a table data registration module 64 and a barcode label generation module 65, and they are stored in the HDD 14. Further, an operation menu 71, an operation application 72, a configuration application 73, a configuration definition 74 and master data 75 are stored in the HDD 14.

The handy terminal comprises a communication module 66. The communication module 66 is stored in the flash memory 34.

The spreadsheet software 61 is software which can generate table data 81 in a table format having lines and columns. A user who operates the data processing device 1 can define an arbitrary item in each column of the table data 81 by carrying out input operation with regards to the input device 17.

The application generation module 62 is a program to generate an operation menu definition 82, operation application definitions 83, a menu sheet 84 and registration table data 85 based on the table data 81. The operation menu definition 82 is data corresponding to the display content of the operation menu 71, the operation application definitions 83 are data corresponding to the items in the operation application 72, the menu sheet 84 is data of a sheet which is used to select the operation application which is to be executed by the handy terminal 5 and the registration table data 85 is data for storing the data which is collected and recorded by the handy terminal 5.

The communication module 63 is a program to carry out communication and transferring process between the data processing device 1 and the handy terminal 5 which are carried out via the cradle 2 in cooperation with the communication module 66. By the communication and transmission by the communication modules 63 and 66, the data processing device 1 transfers the application set 80 which includes the operation menu 71, the operation application 72, the configuration application 73, the configuration definition 74, the operation menu definition 82 and the operation application definition 83 to the handy terminal 5. On the other hand, the handy terminal 5 executes the operation application 72 to transfer the registration data 86 which is the data collected and stored via the scanner 41 or the input device 37 to the data processing device 1.

In the embodiment, the transferring between the communication modules 63 and 66 is carried out by the connection via the cradle 2. However, the transferring may be carried out via the communication between the communication devices 16 and 36.

The table data registration module 64 is a program to store data in the registration table data 85 based on the registration data 86. The operation of the table data registration module 64 will be after-mentioned in detail.

The barcode label creating module 65 is a program to generate the barcode sheet 87 based on the master data 75.

Figure 4:
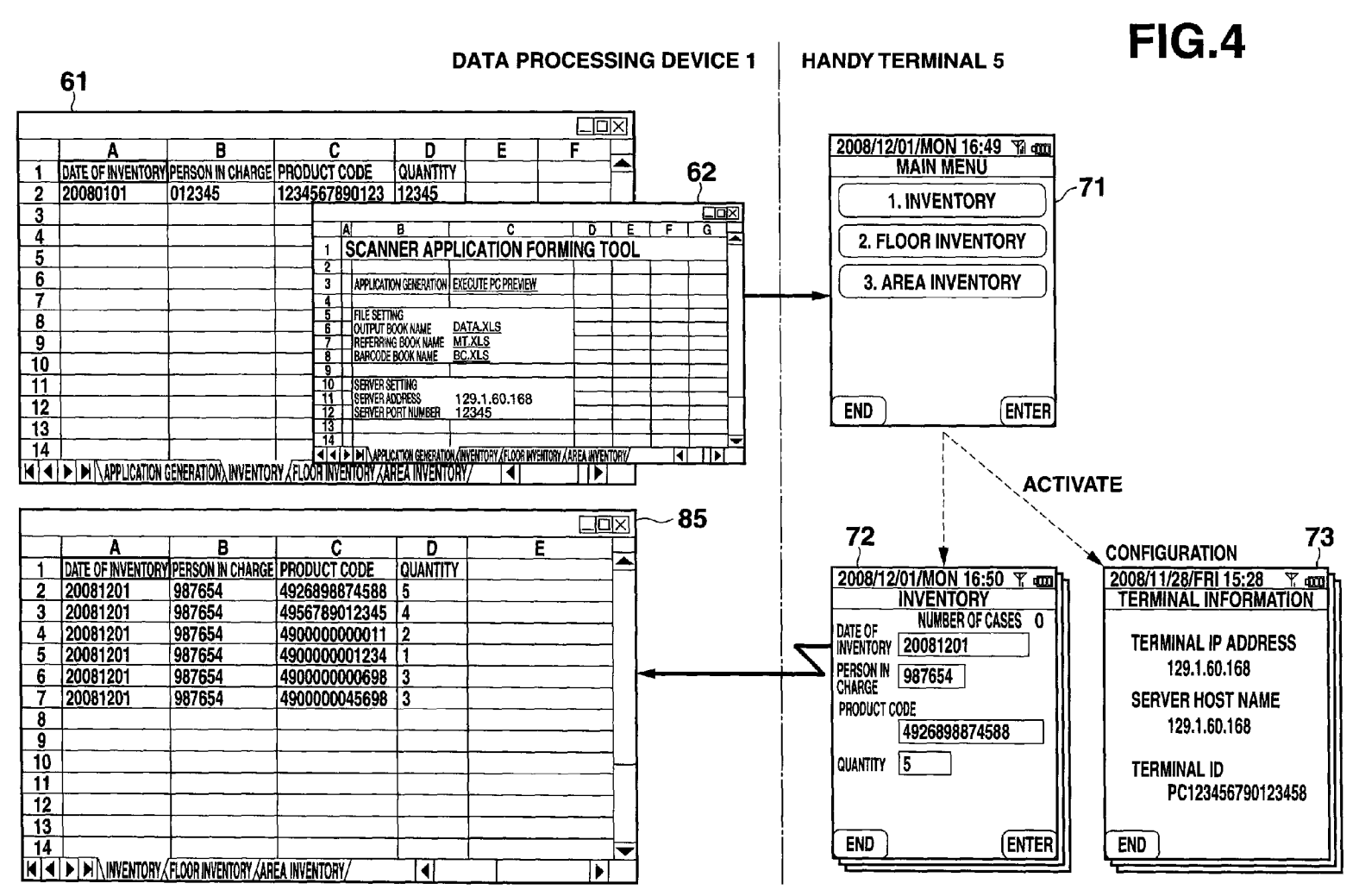

FIG. 4 is an explanatory diagram showing a schema of a processing content of the application generation system 100.

First, the table data 81 is generated by using the spreadsheet software 61 of the data processing device 1, and arbitrary items are defined in the table data 81. Thereafter, the operation menu definition 82, the operation application definition 83, the menu sheet 84 and the registration table data 85 are generated from the table data 81 by using the application generation module 62. Among the above, by the operation application definition 83, the handy terminal 5 executes the operation application 72 to decide items of data which are to be collected. The content of the operation application definition 83 corresponds to the items defined in the table data 81.

The data processing device 1 transfers the application set 80 including the operation menu definition 82 and the operation application definition 83 to the handy terminal 5. The handy terminal 5 collects data by executing the operation application 72. Selecting of the operation application to be executed can be carried out by selecting from the operation menu 71, and alternatively can be carried out by using the menu sheet 84. The display items of the operation menu 71 are decided by the operation menu definition 82. Further, by the configuration application 73, various types of settings of the handy terminal 5 can be changed and confirmed.

The data which is collected and stored by using the handy terminal 5 is stored in the flash memory 34 of the handy terminal 5 as the registration data 86. The registration data 86 is transferred to the data processing device 1 from the handy terminal 5. The data processing device 1 stores data based on the registration data 86 in the registration table data 85 by the table data registration module 64. The data collection is carried out as described above.

Next, each process to be carried out by the application generation system 100 will be described in detail.

First, generation of the table data 81 by using the spreadsheet software 61 will be described.

FIGS. 5A to 5C are diagrams showing examples of the table data 81.

FIG. 5A shows a state where focus is on the "inventory" sheet of the table data 81.

FIG. 5B shows a state where focus is on the "floor inventory" sheet of the table data 81.

FIG. 5C shows a state where focus is on the "area inventory" sheet of the table data 81.

Hereinafter, alignment in vertical direction in the table data 81 is called lines, and alignment in side direction in the table data 81 is called columns.

As shown in FIGS. 5A to 5C, the table data 81 is data in tabular format which can define one or a plurality of sheets. In the first line of each column of each of the sheets, an item is defined. The content of the items and the number of the items are set by a user's discretion.

Regarding definitions of the items, items corresponding to information to be read by the scanner 41 of the handy terminal 5 scanning the barcodes can be assigned.

In the embodiment, as shown in the item B1 which is "product code" of FIGS. 5A and 5B and as shown in the item B2 which is "product" of FIG. 5C, a user can make an arbitrary item be displayed in bold font (setting an attribution of bold font assignment) in comparison to other items to assign the item as the item corresponding to the information to be read by the scanner 41.

Of course, the item which corresponds to the information to be read by the scanner 41 can also be assigned by other assigning methods. For example, a method of changing font color, a method of attributing a specific identifier to the item and the like. Here, it is preferable that the item corresponding to the information to be read by the scanner 41 can be discriminated from other items in visual way, such as by using the method of changing the font to a bold font or the like as in the embodiment.

There is no limit in the number of items which can be assigned as the items corresponding to the information to be read by the scanner 41 in each sheet, and the number of the items can be one or plurality, or no item may be assigned. In the embodiment, when there is no item which is assigned as the item corresponding to the information to be read by the scanner 41 in each sheet, the CPU 11 assumes that the item in the most left of each sheet is the item corresponding to the information to be read by the scanner 41 and carries out processing to the item in the most left of each sheet.

In the second line of each sheet, an example of data corresponding to each item defined in the first line is inputted. By the example of data inputted in the second line, attribution of data of each item (for example, type of letters, figure length and the like of data to be input) is decided.

Next, the generation of the operation menu definition 82, the operation application definition 83, the menu sheet 84 and the registration table data 85 from the table data 81 by the application generation module 62 will be described.

Figure 6:
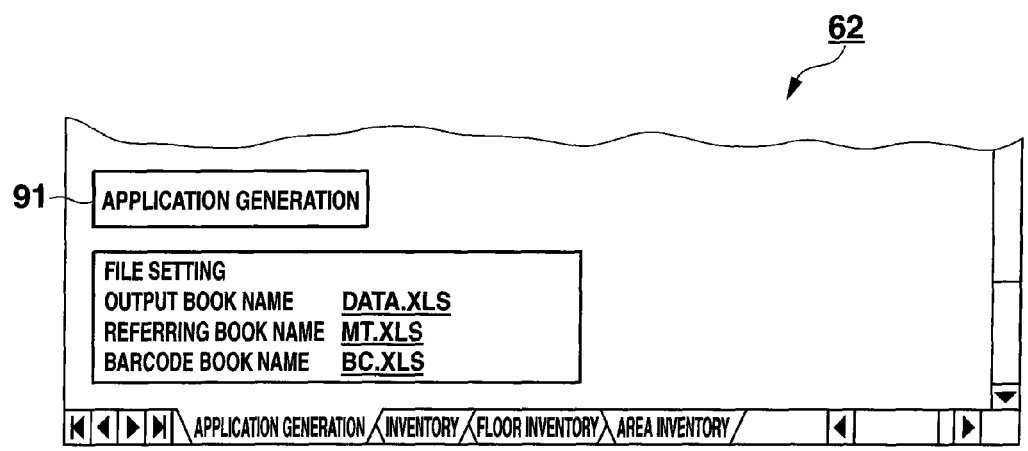
FIG. 6 is a display example of an operation screen of an application generation module.

FIG. 6 is a display example of an operation screen of the application generation module 62.

As shown in FIG. 6, the application generation module 62 comprises an application generation button 91. By clicking the application generation button 91, the operation menu definition 82, the operation application definition 83, the menu sheet 84 and the registration table data 85 according to the content of each sheet of the table data 81 are generated.

In the embodiment, the application generation module 62 is activated by operating the application generation button 91 which is provided at the first sheet of the data file in tabular format including the table data 81. In other words, a sheet which becomes the table data 81 can be additionally created and items can be defined in the data file in tabular format including the sheet having the application generation button 91. Of course, the table data 81, the application generation module 62 and the interface for activating the application generation module 62 may be individual files, and method is not limited to the method shown in the embodiment.

Next, the operation application 72 will be described.

FIGS. 7A to 7C are diagrams showing examples of display contents of the display device 38 of the handy terminal 5 where the operation application 72 is being executed.

FIG. 7A shows a display content corresponding to the operation application definition 83 of "inventory".

FIG. 7B shows a display content corresponding to the operation application definition 83 of "floor inventory".

FIG. 7C shows a display content corresponding to the operation application definition 83 of "area inventory".

The items which are displayed in the screen display of the operation application 72 and which can be collected as data correspond to the content of the operation application definition 83. Further, the content of the operation application definition 83 corresponds to the items defined in the table data 81. That is, the data which can be collected by executing the operation application 72 corresponds to the items defined in the table data 81.

Moreover, the operation application definition 83 is generated individually for each of the sheets in which items are defined in the table data 81. That is, when there is one sheet in which items are defined in the table data 81, one operation application definition 83 is generated, and when there are plurality of sheets, a plurality of operation application definitions 83 are generated. In the embodiment, an example based on three sheets of "inventory", "floor inventory" and "area inventory" is described.

The display content corresponding to the operation application definition 83 of "inventory" shown in FIG. 7A corresponds to each of the items defined in the "inventory" sheet shown in FIG. 5A. The display content corresponding to the operation application definition 83 of "floor inventory" shown in FIG. 7B corresponds to each of the items defined in the "floor inventory" sheet shown in FIG. 5B. Further, the display content corresponding to the operation application definition 83 of "area inventory" shown in FIG. 7C corresponds to each of the items defined in the "area inventory" sheets shown in FIG. 5C.

The operation application 72 is one execute file, and by changing the operation application definition 83 to be read at the time of execution, each of the display contents and the contents of data collecting items shown in FIGS. 7A to 7C can be switched. That is, the operation application definition 83 functions as a definition file to define operation content of the operation application 72, and the combination of the operation application 72 and the operation application definition 83 functions as an application program.

FIGS. 8A and 8B are diagrams showing examples of focused position in the display screen where the operation application 72 is being executed.

FIG. 8A shows an example before the date of inventory and the person in-charge are inputted.

FIG. 8B shows an example after the date of inventory and the person in-charge are inputted.

The diagrams shown in FIGS. 8A and 8B are display contents corresponding to the operation application definition 83 of "inventory" shown in FIG. 7A.

Right after the operation application 72 is activated, all of the textboxes for inputting each item, which are provided in the right side of each of the items, are empty. Among the items shown in FIGS. 8A and 8B, the item which is assigned as the item corresponding to the information to be read by the scanner 41 is "product code", and there are items which are "date of inventory" and "person in charge" before "product code".

Right after the operation application 72 is activated, when focus is on the textbox of "date of inventory" which is the first item and when inputting by the input device 38 is carried out, input is carried out to the textbox. Then, when a key (for example, return key and the like, omitted from the drawing) to instruct completion of input, which is included in the input device 38, is operated, the focus moves to the textbox of "person in charge" which is the next item. Thereafter, the focus moves sequentially to the next item downward every time the input and the instruction of input completion are repeated.

When focus is on the "product code" which is the item assigned as the item corresponding to information to be read by the scanner 41, reading operation by the scanner 41 can be carried out. At this time, when the barcode is read by the scanner 41, a letter string corresponding to the information indicated by the barcode is set in the text box of the "product code", and also, the focus moves to the text box of "quantity" which is the next item.

When the "enter" button which is displayed at lower right of the screen or the return key (omitted from the drawing) which is comprised in the input device 38 (omitted from the drawing) is operated in a state where input is carried out in the textbox of "quantity" which is the last item in the operation application 72 in which the operation application definition 83 of "inventory" is read, the letter strings in the textboxes of "date of inventory", "person in charge", "product code" and "quantity" which have been inputted are stored in the registration data 85 as one record. Then, the textboxes of "product code" and "numerical quantity" are automatically cleared, and the focus moves to the textbox of "product code" at the same time as the textboxes are cleared. At this time, the textboxes of "date of inventory" and "person in charge" are not cleared and the letter strings which were inputted before are kept in the textboxes. Thereafter, because focus is on "product code", a user of the handy terminal 5 can read the next barcode right away by the scanner 41.

That is, when the operation application 72 is executed, when the item corresponding to data to be collected based on barcode, among a plurality of items defined in the table data 81, is not the first to be inputted and when the focus is to be moved by operating the "enter" button which is included in the display content or the return key which is comprised in the input device 38 after the input of the item to be inputted before the item corresponding to data to be collected based on barcode is finished, the CPU 31 makes the focus move to an item corresponding to data to be collected based on the barcode.

Figure 9:
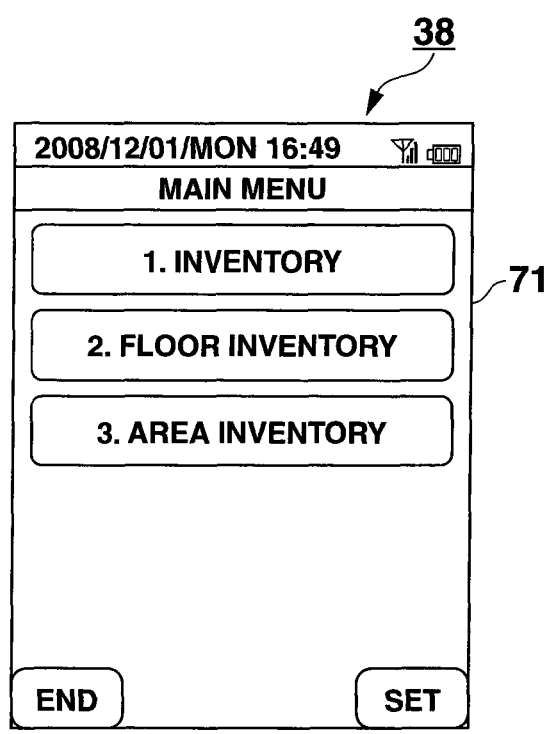
FIG. 9 is a diagram showing an example of a display content of a display device 38 of a handy terminal 5 where an operation menu is being executed.

FIG. 9 is a diagram showing an example of display content of the display device 38 of the handy terminal 5 where the operation menu 71 is being executed.

The display content of the operation menu 71 corresponds to the content of the operation menu definition 82. That is, the operation menu definition 82 functions as a definition file to define operation content of the operation menu 71, and the combination of the operation menu 71 and the operation menu definition 82 functions as an application program.

The operation menu 71 shown in FIG. 9 comprises menu buttons of "1. inventory", "2. floor inventory" and "3. area inventory". Each of the menu buttons corresponds to the content which is set when the operation application 72 is executed shown in FIGS. 7A to 7C, respectively. That is, the content of the operation menu definition 82 which decides the display content of the operation menu 71 correspond to the contents of the operation application definition 83, that is, the content of the table data 81. The application generation module 62 generates the operation application definitions 83 which correspond to each sheet of the table data 81, and also, generates the operation menu definitions 81 which correspond to the content of the operation application definitions 83.

The operation menu 71 comprises an end button and a set button other than the menu buttons corresponding to the operation application definitions 83. When the end button is operated, the CPU 31 finishes the display of the operation menu 71. When the set button is operated, the CPU 31 executes the configuration application 73.

FIGS. 10A and 10B are diagrams showing examples of the menu sheet 84.

FIG. 10A shows a display example of a menu sheets 84 which is generated as a last sheet of the table data 81.

FIG. 10B shows an example of a menu sheet which is printed.

The application generation module 62 generates the menu sheet 84. The menu sheet includes [main menu] item and [configuration] item. The [main menu] item includes item names corresponding to each of the sheets which are generated in the table data 81 and barcodes formed in right side of each of the item names. The barcodes formed in the right side of each of the item names are printed on a print medium such as paper as shown in FIG. 10B, and when a barcode is read by the scanner 41 of the handy terminal 5, the CPU 31 of the handy terminal 5 reads the operation application definition 83 which corresponds to the item name described in the left side of the barcode to execute the operation application 71. That is, by reading the printed menu sheet by the handy terminal 5, the data collecting item of the operation application 71 to be executed can be selected.

In similar way as the [main menu] item, the [configuration] item includes item names related to configuration of the handy terminal and barcodes formed in the right side of each of the item names, and by reading a barcode by the scanner 41, the configuration application 73 in which the configuration definition 74 corresponding to the item name of the configuration is read can be executed. In the embodiment, the configuration definition 74 which is read by the configuration application 73 is one, and the item name of the [configuration] item shown in FIGS. 10A and 10B corresponds to the one configuration definition 74.

Sheet name of the generated menu sheet 84 is "!menu sheet", and "!" (exclamation mark) is indicated as the first letter of the sheet name.

FIGS. 11A and 11B are diagrams showing display examples of the registration table data 85.

FIG. 11A shows a display example of the registration table data 85 before the registration data 86 is stored.

FIG. 11B shows a display example of the registration table data 85 after the registration data 86 is stored.

As shown in FIGS. 11A and 11B, the registration table data 85 has sheets corresponding to each of the sheets of the generated table data 81. Further, as shown in FIG. 11A, the items which are defined in each column of the first line of the table data 81 are set in each column of the first line of each of the sheets of the registration table data 85 just after being generated by the application generation module 62, and data is not entered in the second line. In other wards, the registration table data 85 is generated in tabular form data in which data of the second line in the table data 81 is deleted.

When the table data registration module 64 stores data in the registration table data 85 based on the registration data 86, the registration data 86 which is collected and stored by using the handy terminal 5 is recorded in the second line and in the lines thereafter of the registration table data 85 as shown in FIG. 11B. At this time, the operation application definitions 83 read by the operation application 72 which is executed by the handy terminal 5, the registration data 86 which is collected and stored by executing the operation application 72 in which the operation application definition 83 is read and the sheets of the registration table data 85 in which the registration data 86 is stored correspond to one another, respectively. That is, the registration data 86 and each sheet of the registration table data 85 are being managed by each operation application definition 83, that is, sheet by sheet in the table data 81.

Hereinafter, specific processing content will be described.

Figure 12:
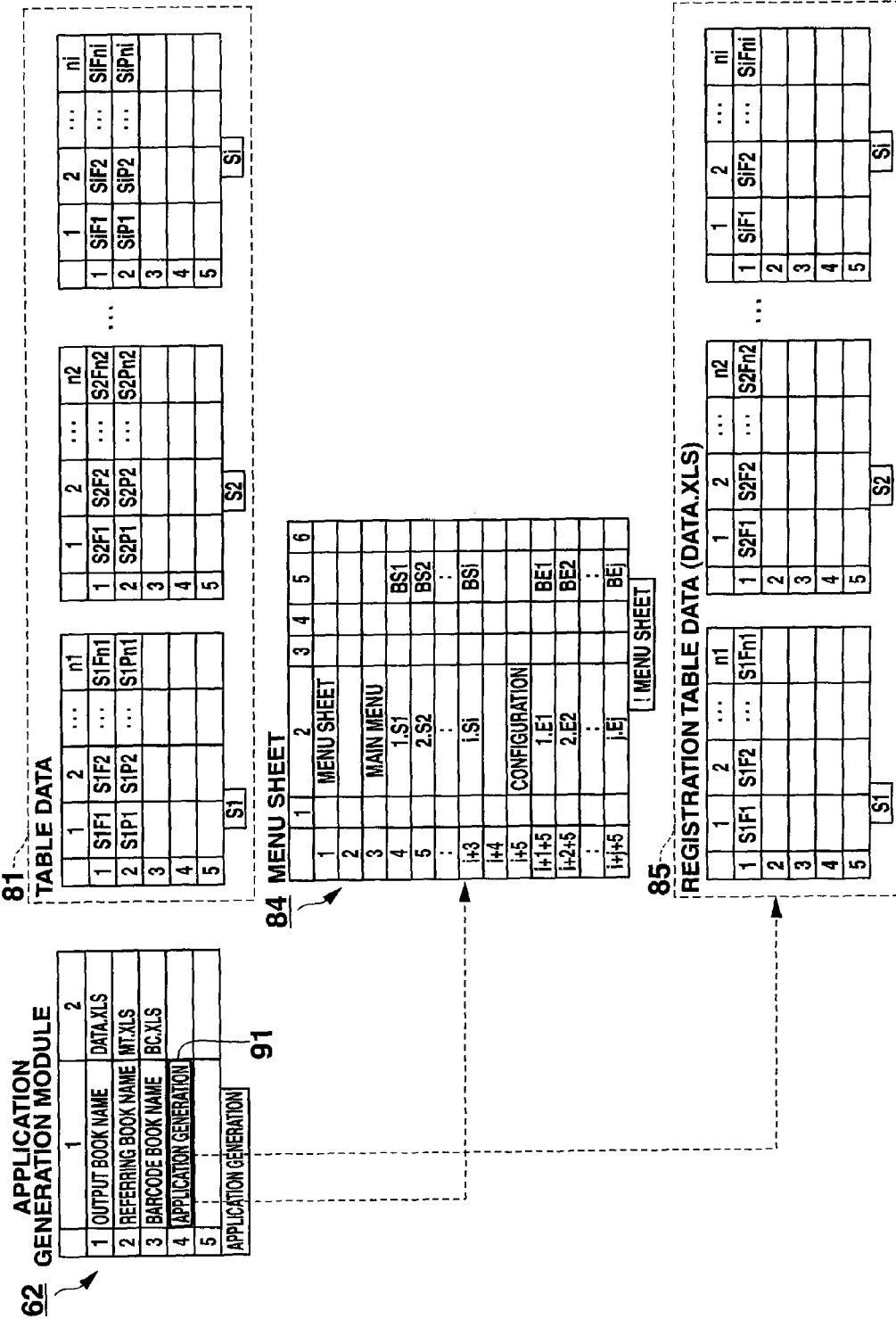
FIG. 12 is a schematic diagram showing a relationship between an item which is defined in each cell of the table data and data which is set in each cell of the table data and items which are defined in the menu sheet and the registration table data.

FIG. 12 is a schematic diagram showing a relationship between the items to be defined and the data to be set in each cell of the table data 81 and the items to be defined in the menu sheet 84 and in the registration table data 85. In the description hereinafter and in the diagrams, each or the sheets of the table data 81 and the registration table data 85 are described as a sheet S1, a sheet S2 . . . a sheet S1.

As shown in FIG. 12, the item S1F1 is defined in the first line of first column in the sheet S1. Similarly, the item S1F2 is defined in the first line of the second column in the sheet S1, and the item S1Fn1 is defined in the first line of the n1 column in the sheet S1. Further, the item S2F1 is defined in the first line of the first column in the sheet S2. That is, the item SiFni is defined in the first line of the ni column in the sheet Si.

Moreover, the data S1P1 is set in the second line of the first column in the sheet S1. Similarly, the data S1P2 is set in the second line of the second column in the sheet S1, and the data S1Pn2 is set in the second line of the n1 column in the sheet S1. Further, the data S2P1 is set in the second line of the first column in the sheet S2. That is, the data SiPni is set in the second line of the ni column in the sheet Si.

The item "output book name" is defined in the first line of the first column in the first sheet of the tabular form data file including each sheet of the table data 81, and "DATA.XLS" is set in the first line of the second column which is in the right side of the item "output book name". The item "output book name" is the item name for assigning file name of the registration table data 85, and "DATA. XLS" set in the right side of the item "output book name" becomes the file name of the registration table data 85 in the example shown in FIG. 12.

The item "referring book name" is defined in the second line of the first column and the item "barcode book name" is defined in the third line of the first column in the first sheet of the tabular form data file including each sheet of table data 81. Further, "MT. XLS" is set in the second line of the second column in the right side of the item "referring book name" and "BC.XLS" is set in the third line of the second column in the right side of the item "barcode book name". The item "referring book name" is the file name of the master data 75, and the "MT.XLS" which is set in the right side of the item "referring book name" becomes the file name of the master data 75 in the example shown in FIG. 12. The item "barcode book name" is the file name of the barcode sheet 87, and the "BC.XLS" which is set in the right side of the item "barcode book name" becomes the file name of the barcode sheet 87 in the example shown in FIG. 12.

When the application generation button 91 is operated, the menu sheet 84 and the registration table data 85 are generated. As described above and as shown in the registration table data 85 of FIG. 12, each sheet of the registration table data 85 is generated as tabular form data in which the second line of each sheet in the table data 81 is empty.

The menu sheet 84 is created as the last sheet of the tabular form data file including the table data 81, and the sheet name is "! menu sheet".

In the second column of the menu sheet 84, the letter string of "menu sheet" is set in the first line and "main menu" is set in the third line. Further, in the forth line of the second column of the menu sheet 84, the letter string corresponding to "1.S1" is set. The letter string corresponding to "1.S1" is a letter string in which the letter string of sheet name of the sheet S1 of the table data 81 and "1." indicating the number being the first are combined. For example, in a case where the sheet name of the sheet S1 is "inventory", the letter string of "1.inventory" will be set in the forth line of the second column in the menu sheet 84. Similarly, a letter string corresponding to "2.S2" is set in the fifth line of the second column in the menu sheet 84, and a letter string corresponding to "i.Si" which corresponds to each of the sheets of the table data 81 is set in each of the lines after the fifth line to the i+3 line.

The letter string of [configuration] is set in the i+5 line of the second column in the menu sheet 84. Then, the letter string corresponding to "1.E1" is set in the i+6(i+1+5) line of the second column in the menu sheet 84. The letter string corresponding to "1.E1" is a letter string omitting the extension from the file name of the configuration definition 74 and in which a number is attached at the beginning. For example, when the neme of the first configuration is "terminal information. INI", the letter sting of "1. terminal information" is set in the i+6 line of the second column in the menu sheet 84, the letter sting being a combination of the letter string of "terminal information" and "1." indicating the number being the first. Similarly, a letter string corresponding to "2.E2" is set in the i+7(i+2+5) line of the second column in the menu sheet 84, and letter strings corresponding to "j.Ej" corresponding to each sheet of the table data 81 are set in the rows thereafter to the i+j+5 line, respectively. The name of each configuration corresponds to each of the individual configuration definition 74, respectively.

Moreover, in each line of the fifth column where "1.S1", "2.S2" . . . "i.Si" and "1.E1", "2.E2" . . . "j.Ej" are respectively set in the second column of the menu sheet 84, the barcodes "BS1", "BS2" . . . "BSi" and "BE1", "BE2" . . . "BEj" corresponding to each item set in the second column are respectively set.

Figure 13A:
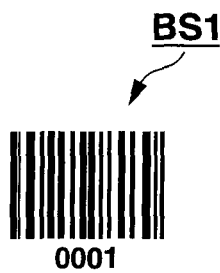
FIG. 13A is a diagram showing an example of a barcode, indicating the barcode of "BS1"
Figure 13B:
FIG. 13B is a diagram showing an example of the barcode, indicating the barcode of "BE1"

FIG. 13 is a diagram showing an example of a barcode. FIG. 13A shows an example of the barcode "BS1", and FIG. 13B shows an example of the barcode "BE1".

The barcodes which are to be set in the fifth column in the menu sheet 84 are the barcodes generated according to a number and the barcode pattern which are predetermined, and each of them is set as a barcode corresponding to the item in the left side of each of the barcodes. Here, each sheet name of the table data 81 corresponds to the operation application definitions 83 which are to be generated. That is, when the menu sheet 84 is printed and when any one of the barcodes of "BS1", "BS2" . . . "BSi" is read by the scanner 41 of the handy terminal 5, the operation application 72 in which the operation application definition 83 corresponding to the barcode is read can be executed. Similarly, when any one of the barcodes of "BE1", BE2" . . . "BEj" is read, the configuration application 73 in which the configuration 74 is read can be executed.

In the embodiment, the barcodes of "BSi" and "BEj" are generated as barcodes showing numbers of four digits. Further, as shown in FIG. 13A, the barcodes of "BSi" are barcodes having consecutive numbers starting from the barcode of "BS1" indicating the number of 0001, and as shown in FIG. 13B, the barcodes of "BEj" are barcodes having consecutive numbers starting from the barcode of "BE1" indicating the number of 9001.

Figure 14:
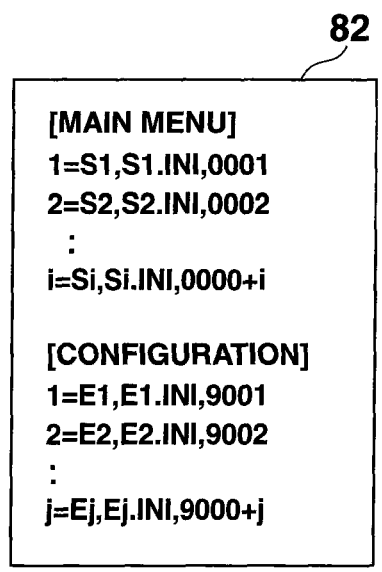
FIG. 14 is a diagram showing an example of a content of an operation menu definition.

FIG. 14 is a diagram showing an example of a content of the operation menu definition 82.

The operation menu definition 82 comprises setting relating to [main menu] and setting relating to [configuration]. The setting relating to [main menu] is described in a form of "i.Si,Si.INI,0000+i".

"i" is a value of net increase in which 1 is the initial value and functions as menu number of the main menu.

"Si" is a sheet name corresponding to the table data 81 and "Si.INI" is a file name of the operation application definition 83 corresponding to the sheet name which is indicated by "Si". Further, "0000+i" is a number (scancode number) for verifying to the scancode and is expressed by a numerical value in which i is added to the four digit number of initial value 0, and further, becomes the same value as the number of barcode BSi corresponding to the item name of the operation application definition 83 which is indicated by Si.INI in the menu sheet 84.

For example, the setting of main mane corresponding to the operation application of "1.inventory" in the menu sheet 84 will be "1=inventory, inventory. INI, 0001". As shown in FIG. 14, the setting related to [main menu] are provided according to the number of the operation application definitions 83, that is, according to the number of sheets S1 to Si which are generated by the table data 81, and the settings are orderly described.

Similarly, the setting related to [configuration] is described in a form of "j=Ej,Ej.INI, 9000+j". "j" is a numerical value of net increase in which 1 is the initial value and functions as menu number of the configuration.

Figure 15A:
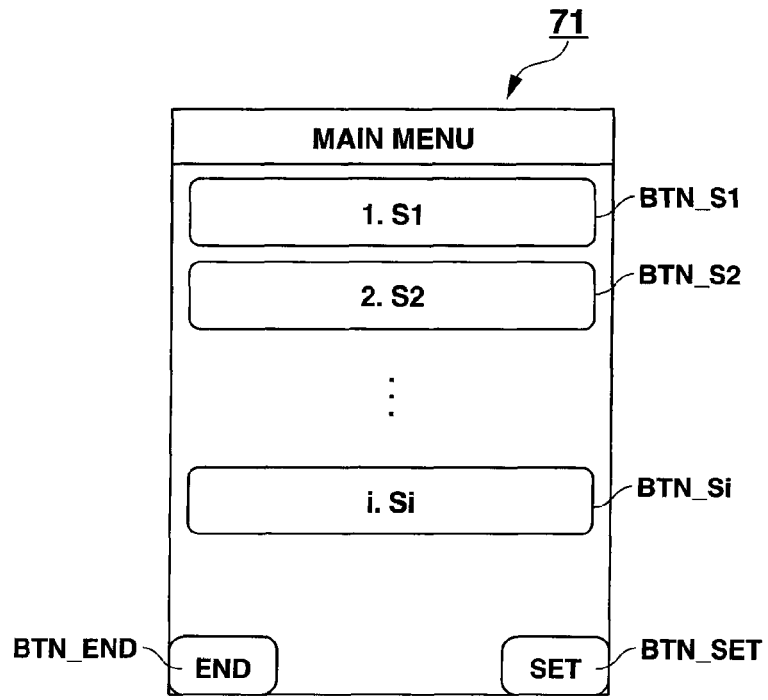
FIG. 15A is a schematic diagram showing an example of a display content of a menu screen, indicating a display content of a main menu.
Figure 15B:
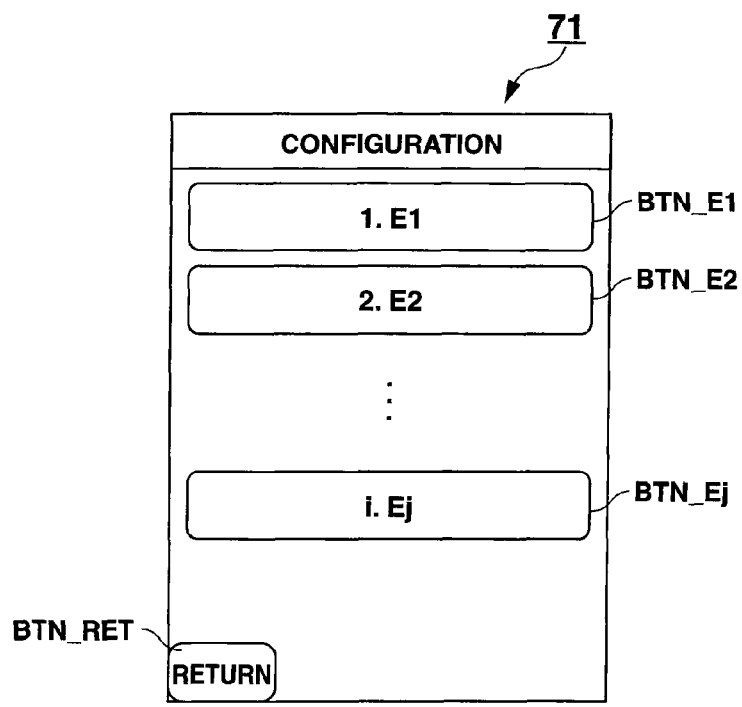
FIG. 15B is a schematic diagram showing an example of a display contents of the menu screen, indication a display content of a configuration menu.

FIGS. 15A and 15B are schematic diagrams showing examples of a display content of the menu screen 71.

FIG. 15A shows a display content of the main menu.

FIG. 15B shows a display content of the configuration menu.

The main menu and the configuration menu are displayed by the display device 38 of the handy terminal 5. As shown in FIG. 15A, the main menu screen comprises menu buttons of "1.S1", "2.S2" . . . "i.Si", an end button and a set button. The content of "i.Si" of the menu button corresponds to "i" of the data described in a form of "i=Si,Si.INI,0000+i" of the operation menu definition 82 and the contents of "Si". For example, the menu button corresponding to the data of "1=inventory, inventory.INI,00001" will be "1. inventory". The menu buttons in the main menu screen are assigned so as to be BTN_S1, BTN_S2, . . . BTN_Si by the CPU 31 and the display name of each of the menu buttons is individually controlled.

When the enter button is operated in the menu screen, the CPU 31 reads the operation application definition 83 corresponding to the description content of the enter button to activate the operations application 72. For example, when the enter button of "1.inventory" is operated, the CPU 31 reads the operation application definition 83 of "inventory.INT" which is assigned by the description of "1=inventory,inventory.INI, 0001" to activate the operation application 72.

When the set button is operated, the configuration menu shown in FIG. 15B is displayed. The configuration menu comprises menu buttons of "1.E1", "2.E2" . . . "j.Ej" and a return button. The content of "j.EJ" of the menu buttons corresponds to the content of "j" and "Ej" of the data described in a form of "j=Ej,Ej.INI,9000+j" of the operation menu definition 82. The menu buttons in the configuration menu are assigned so as to be BTN_E1, BTN_E2 . . . BTN_Ej by the CPU 31, and the display name of each of the menu buttons is individually controlled.

When the return button is operated, the display content of the display device 38 returns to the main menu shown in FIG. 15A.

FIG. 16 is a diagram showing an example of a content of the operation application definition 83.

Figure 17A:
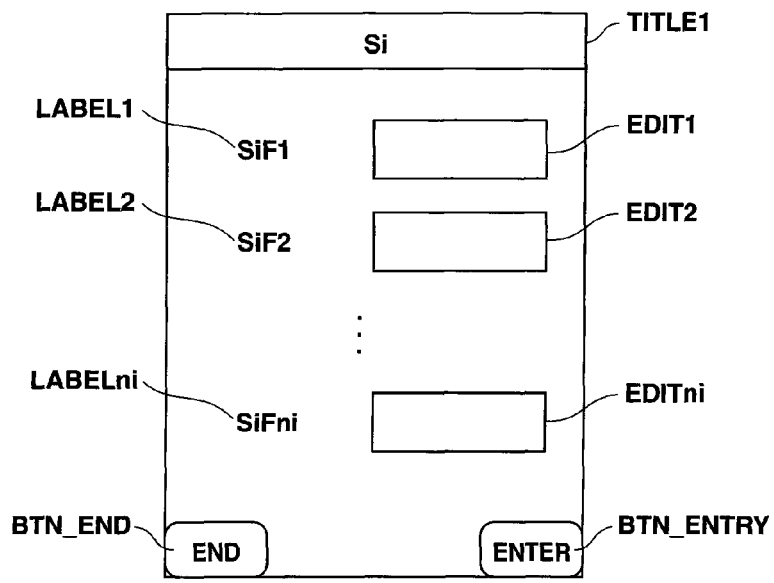
FIG. 17A is a schematic diagram showing an example of a display content when the operation application is executed, indicating symbols of each of the parts.
Figure 17B:
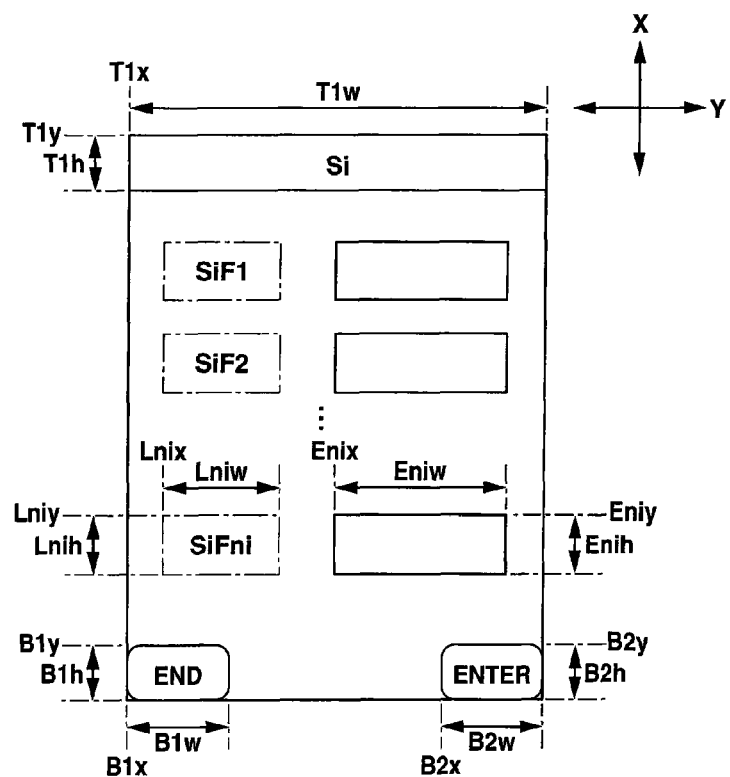
FIG. 17B is a schematic diagram showing an example of a display content when the operation application is executed, indicating positions which are shown by variables relating to layout.

FIGS. 17A and 17B are schematic diagrams showing examples of display content where the operation application 72 is being executed.

FIG. 17A shows symbols of each part.

FIG. 17B shows positions which are indicated by variables relating to layout.

The operation application definition 83 includes a display content of title and each button of the display screen, a content relating to items and textboxes, a content relating to focus of the textboxes, a content relating to focus of the textboxes, a content relating to information to be read by the scanner 41 and a content relating to the file name of the registration data 86, the file name which becomes the target when storing the data recorded in the registration data 86 in the registration table data 85, and information showing the textbox corresponding to the sheet name, the item name and data source.

In the embodiment, as shown in FIG. 16, the display contents of the title and each button of the display screen are included as data of [CTRL_BASE], a content relating to the item and the textboxes are included as data of [CTRL], a content relating to focus of the textboxes is included as data of [FOCUS], a content relating to information to be read by the scanner 41 is included as data of [SCAN] and a content relating to the file name of the registration data 86 and information indicating the textbox corresponding to the file name, the sheet name, the item name and the data source which are to be the target when storing the data recorded in the registration data 86 in the registration table data 85 as data of [ENTRY].

Each item of [CTRL_BASE] and [CTRL] are described in a form of "(numerical value)=(variable name), (type), (starting position in X-direction), (starting position in Y-direction), (width), (height), (applied letter string)".

(numerical value) indicates a value of net increase in which 1 is initial value, (variable name) indicates a content corresponding to a symbol attached to each display content shown in FIG. 17, (type) indicates the type of the display content, (starting position in X-direction), (starting position in Y-direction), (width) and (height) indicate the layout of the display content, and (applied letter string) indicates the content of the letter string which is actually reflected in the display content.

Here, there is no parameter of (applied letter string) for the (numerical value) in [CTRL] when the (numerical value) is an even number.

The numerical values which are applies to the title starting position in X-direction T1$x$, the title starting position in Y-direction T1$y$, the title width T1$w$, the title height T1$j$, the end button starting position in X-direction B1$x$, the end button starting position in Y-direction B1$y$, the end button width B1$w$, the end button height B1$h$, the enter button starting position in X-direction B2$x$, the enter button starting position in y-direction B2$y$, the enter button width B2$w$, the enter button height B2$h$, the starting position in X-direction Lni$x$ of the ni$^{th}$ item, the starting position in Y-direction Lni$y$ of the ni$^{th}$ item, the width Lni$w$ of the ni$^{th}$ item, the height Lni$h$ of the ni$^{th}$ item, the starting position in X-direction Eni$x$ of the ni$^{th}$ textbox, the starting position in Y-direction Eni$y$ of the ni$^{th}$ textbox, the width Eni$w$ of the ni$^{th}$ textbox and the height Eni$h$ of the ni$^{th}$ textbox shown in FIGS. 16 and 17B are obtained by the following formulas (1) to (20).

An initial value are respectively set to the variables ax, ay, aw, ah, bw, bh, lx, ly, lh, ex, ey, eh, sh and Glen used in the following formulas (1) to (20). In the embodiment, the initial values are set so as to be ax=0, ay=0, aw=240, ah=300, bw=60, bh=40, lx=5, ly=30, lh=30, ex=135, ey=30, eh=30, sh=10 and clen=10.

The CPU 31 of the handy terminal 5 decides layout of each of the display contents based on the above initial values, the coordinate positions which are shown by each numerical value when displaying in the display device 38 and the formulas (1) to (20).

$$T1x = ax \tag{1}$$

$$T1y = ay \tag{2}$$

$$T1w = aw \tag{3}$$

$$T1h = 20 \tag{4}$$

$$B1x = ax \tag{5}$$

$$B1y = ay + ah - bh \tag{6}$$

$$B1w = bw \tag{7}$$

$$B1h = bh \tag{8}$$

$$B2x = ax + aw - bw \tag{9}$$

$$B2y = ay + ah - bh \tag{10}$$

$$B2w = bw \tag{11}$$

$$B2h = bh \tag{12}$$

$$Lnix = lx \tag{13}$$

$$Lniy = ly + (lh + sh) \times (ni - 1) \tag{14}$$

$$Lniw = \text{(byte count of letter string of } SiFni) \times clen \tag{15}$$

$$Lnih = lh \tag{16}$$

$$Enix = ex \tag{17}$$

$$Eniy = ey + (eh + sh) \times (ni - 1) \tag{18}$$

$$Eniw = \text{(byte count of letter string of } SiPni) \times clen \tag{19}$$

$$Enih = eh \tag{20}$$

"Si" of [CTRL_BASE] and "SiF1", "SiF2" ... "SiFni" of [CTRL] which are (applied letter string) correspond to "Si", "SiF1", "SiF2" ... "SiFni" of the table data 81, respectively.

In each line of [CTRL_BASE], the line in which the (numerical value) is 1 sets the tile of the display screen, the line in which the (numerical value) is 2 sets the parameter relating to the end button and the line in which the (numerical value) is 3 sets the parameter relating to the enter button.

The (numerical value) of [CTRL] in which odd numbers are set respectively set parameters relating to items defined in the table data 81, and the (numerical value) of [CTRL] in which even numbers are set respectively set parameters relating to textboxes for inputting data of an item of the (numerical value) just before.

The (byte count of letter string SiFni) of the formula (15) corresponds to the byte count of the letter string of the item SiFni which is defined in the table data 81, and the (byte count of letter string SiPni) of the formula (19) corresponds to the byte count of the letter string of the data SiPni which is set in the table data 81.

Each line of [FOCUS] respectively indicates the moving order of focus, the textbox which is focused at the time when the operation application 72 is activated and the textbox which is focused after the data is registered.

"ORDER=EDIT1,EDIT2, ... , EDITni" shown in FIG. 16 shows the moving order of focus, and here, the moving of focus is carried out in the order of EDIT1, EDIT2, ... , EDITni.

"FIRST=EDIT1" shown in FIG. 16 indicates the textbox which is to be focused at the time when the operation application 72 is activated, and here, EDIT1 is being focused.

"SECOND=EDIT2" shown in FIG. 16 indicates the textbox which is to be focused after data is registered, and here, EDIT2 is to be focused. For example, when data is input to the textbox of EDIT1 and when the return key (omitted from the drawing) of the input device 37 is pushed, the focus is moved to the textbox of EDIT2 according to the description of ORDER.

Thereafter, when the enter button or the enter key (omitted from the diagram) is operated, the data which are inputted in each of the textboxes is written and stored in the registration data 86 and the focus moves to the textbox of EDIT2.

Here, in ORDER, the content of the textboxes which will be focused after the textbox set as SECOND, in this case, the textboxes after EDIT2, will be cleared.

Each line of [SCAN] respectively shows whether information read by the scanner 41 can be used to be inputted in the textboxes of EDIT1, EDIT2, ... , EDITni or not.

Each line of [SCAN] is described in a form of "ni=(either one of ALL or NON).

"ni" which is at the beginning of each linw of [SCAN] is a number which means the setting of EDITni is indicated.

ALL indicates that input of the information read by the scanner 41 is allowed, and NON indicates that input by the scanner 41 is not allowed.

That is, only when focus is on the textbox corresponding to the number in which ALL is set, switch ON of the scanner 41 by operating the trigger 42 can be carried out and the information read by the scanner 41 can be inputted in the textbox.

The decision of ALL or NON is based on whether the item corresponding to the textbox is assigned as the item corresponding to the information to be read when scanning, in the table data 81 which is the source, or not.

Each row of [ENTRY] includes information indicating the file name of the registration data 86, the file name, the sheet name and the item name which become the target when storing the data recorded in the registration data 86 in the registration table data 85, and the textbox corresponding to the data source.

FILENAME indicates the file name of the registration data 86.

CONNECT indicates the file name of the registration table data 85.

TABLE indicates the sheet name of the registration table data 85 which is assigned by CONNECT in which the content of the registration data 86 assigned in FILENAME is stored.

FIELDS indicates the item of data to be read from the registration data 86 assigned in FILENAME to be stored, among the items defined in the sheet assigned in TABLE.

VALUES indicates the textbox in which the data corresponding to the item assigned in FIELDS is to be inputted, and the description order corresponds to the order of the items described in FIELDS.

When the enter button among the display content of the operation application 72 is pushed, the input content of each of the textboxes are recorded and stored in a file of the registration data 86 which is assigned in the FILENAME.

When the end button among the display content of the operation application 72 is operated, the CPU 31 ends the operation application 72.

FIG. 18 shows an example of a display content of the operation application 72 in a state where input is carried out to each of the textboxes.

FIG. 19 shows an example of a content of the registration data 86.

As shown in FIG. 18, when the enter button or the enter key of the input device 37 (omitted from the drawing) is operated in a state where input is carried out to each of the textboxes when the operation application 72 is executed, the CPU 31 records and stores the input content of each textbox in the registration data 86 as shown in FIG. 19.

As shown in FIG. 19, the registration data 86 includes an entry to assign the file name and the sheet name of the registration table data 85 which is to be stored, an entry to assign the items of data to be stored in the registration table data 85 and an entry showing the content of data to be stored in the registration table data 85.

The first line of the registration data 86 shown in FIG. 19 is the entry to assign the file name and the sheet name of the registration table data 85 to be stored, and the content of the first line is same as the assigned content of CONNECT and the assigned content of TABLE of the operation application definition 83 read by the operation application 72 which is the source of input of the registration data 86.

The second line of the registration data 86 shown in FIG. 19 is the entry to assign the items of data to be stored in the registration table data 85, and the content of the second line is same as the content of FIELDS of the operation application definition 83 read by the operation application 72 which is the source of input of the registration data 86.

The lines after the third line of the registration data 86 shown in FIG. 19 are the entries showing contents of data to be stored in the registration table data 85, and the contents of the lines after the third line correspond to each data which was inputted to the textboxes assigned in VALUES of the operation application definition 83 read by the operation application 72, which is the source of input of the registration data 86, in the display screen while the operation application 72 is being executed.

In the example shown in FIG. 19, the last line of the registration data 86 corresponds to the input contents of each of the textboxes shown in FIG. 18. The entry indicating the content of data to be stored in the registration table data 85 is sequentially and additionally recorded and stored in the lines after the third line of the registration data 86.

FIG. 20 is a schematic diagram showing an example of a content of the registration table data 85 after the data of registration data 86 is stored.

As shown in FIG. 12 and in the above description, each sheet of the registration table data 85 is generated in a state where the second line of each sheet of the table data 81 which is the source is empty. Thereafter, when the CPU 11 of the data processing device 1 executes the table data registration module 64 to store the data in the registration table data 85 based on the registration data 86, the content of the registration data 86 is reflected in the registration table data 85 as shown in FIG. 20.

Particularly, the entries indicating the content of data to be stored in the registration table data 85, which is recorded and stored in the lines after the third line in the registration data 86 are sequentially stored in the lines after the second line in the registration table data 85. The registration data 86 stored in the registration table data 85 is deleted. Thereafter, when data is to be stored in the registration table data 85 based on the registration data 86 which is newly recorded and stored, the CPU 11 stores the entries which indicate the content of data to be stored in the registration table data 85 included in the registration data 86 in the first empty line which exits after the second line in the registration table data 85 and the lines thereafter.

Next, each of processing content will be described based on flowcharts.

Figure 21:
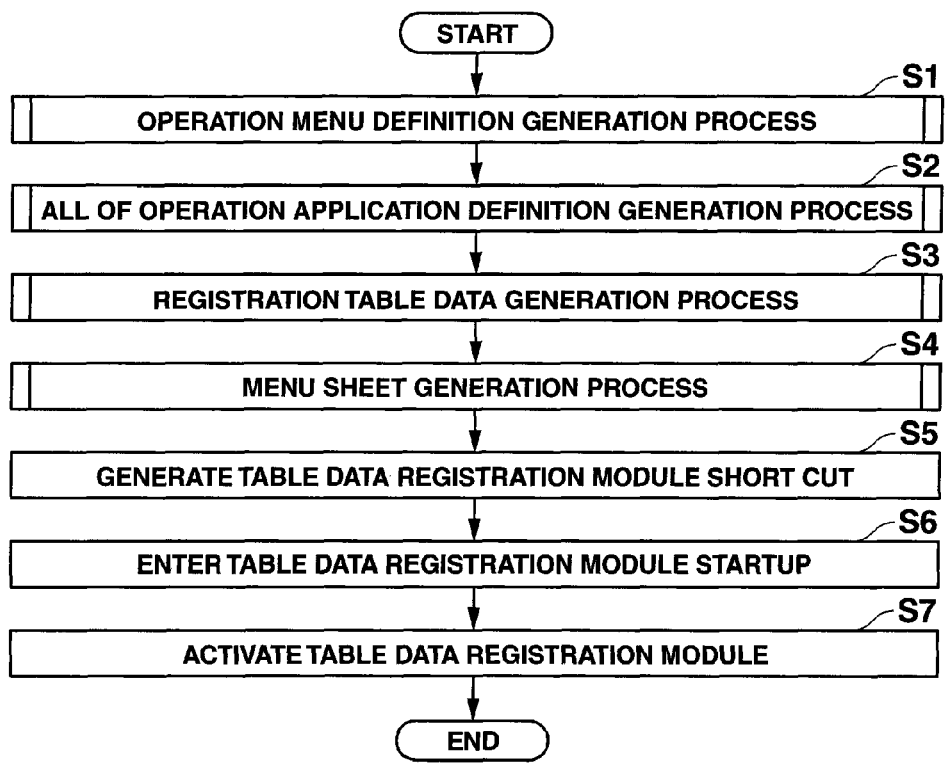
FIG. 21 is a flowchart showing a content of an application generation process.

FIG. 21 is a flowchart showing a content of the application generation process.

The CPU 11 orderly carries out a generation process of the operation menu definition 82 (step S1), a generation process of all of the operation application definition 83 (step S2), a generation process of the registration table data 85 (step S3) and a generation process of the menu sheet (step S4). Thereafter, the CPU 11 generates a shortcut of the table data registration module 64 (step S5), registers the shortcut generated in step S5 in the startup (step S6), and activates the table data registration module 64 (step S7).

Figure 22:
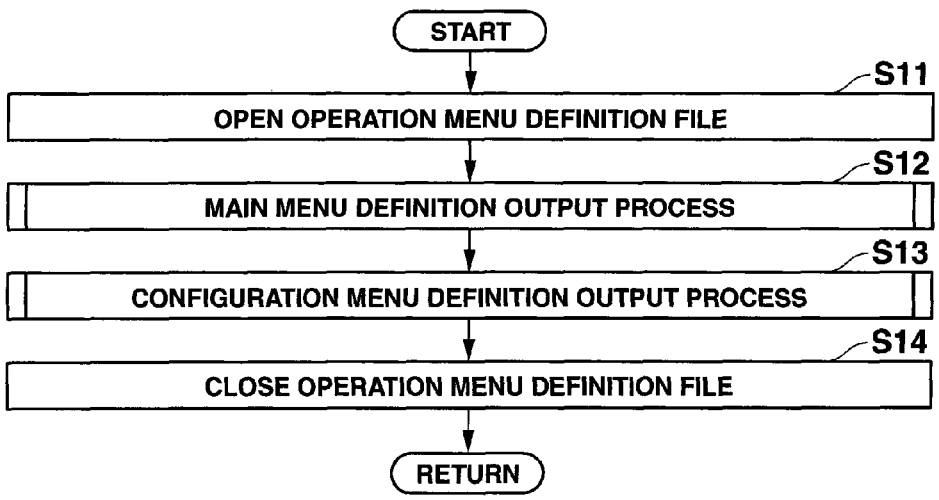
FIG. 22 is a flowchart showing a content of a generation process of the operation menu definition shown in step S1.

FIG. 22 is a flowchart showing the content of the generation process of the operation menu definition 82 shown in step S1 of FIG. 21.

The CPU 11 generates an empty file which is generated as the operation menu definition 82 and opens the file (step S11), and orderly carries out a main operation menu definition output process (step S12) and a configuration operation menu definition output process (step S13). Thereafter, the CPU 11 closes the file of the operation menu definition 82 (step S14).

Figure 23:
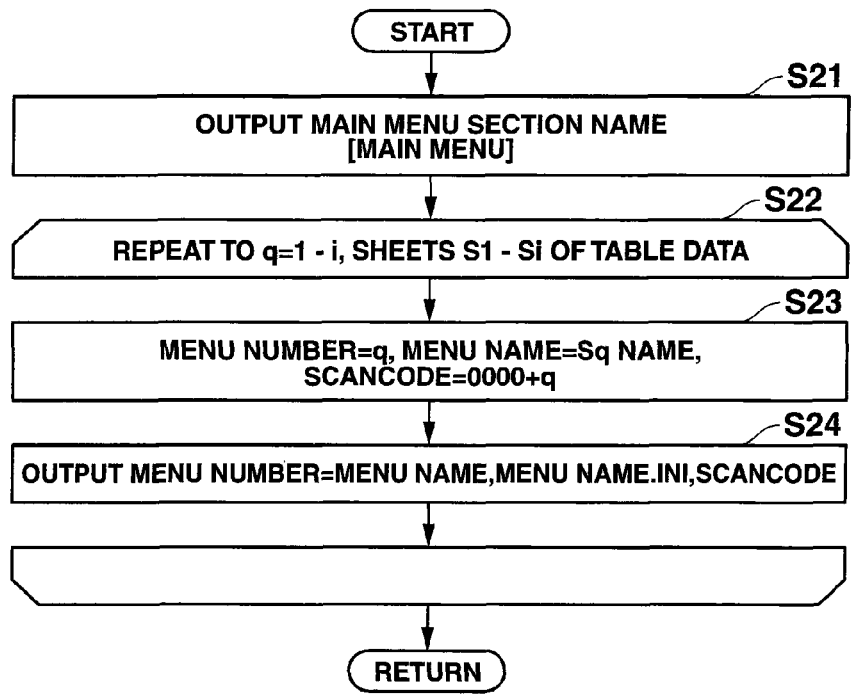
FIG. 23 is a flowchart showing a content of a main operation menu definition output process shown in step S12.

FIG. 23 is a flowchart showing the content of the main operation menu definition output process shown in step S12 of FIG. 22.

The CPU 11 outputs the letter string of [main menu] which is the main menu section name (step S21). Then, the CPU 11 declares the counter q by the initial value 1, and carries out the process of repeating the following step S23 and step S24 to the number of sheets (i of sheet Si) which are created in the table data 81 (step S22).

The CPU 11 carries out declaration of variables corresponding to the menu number, the menu name and the scancode number, and carries out a process so as to set the menu number=q, the menu name=name of sheet Sq and the scancode number=(0000+q) (step S23). Then, the CPU 11 outputs the letter string corresponding to "menu number=menu name, menu name.INI, scancode number" (step S24).

Figure 24:
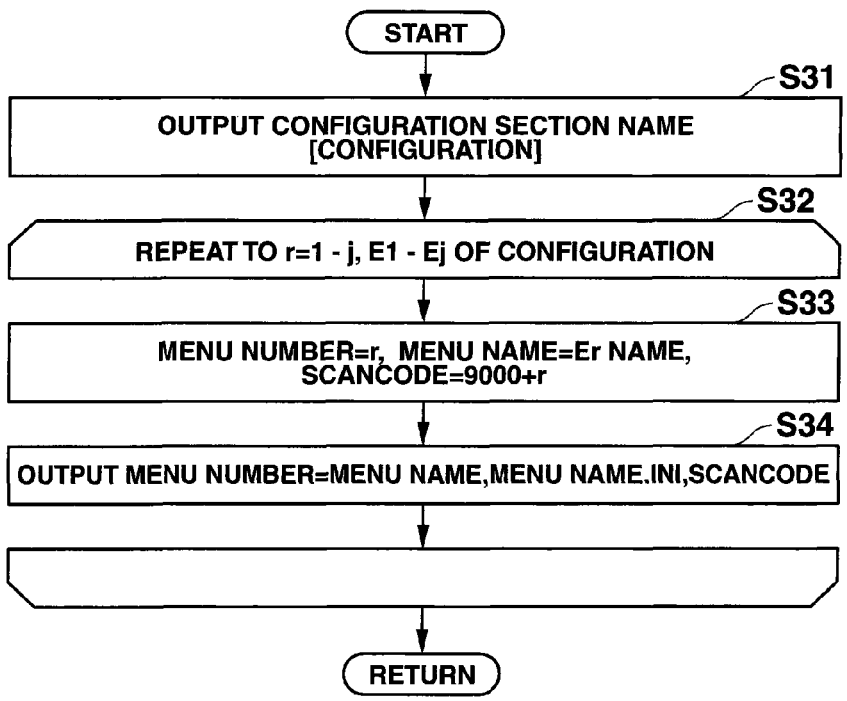
FIG. 24 is a flowchart showing a content of a configuration operation menu definition output process shown in step S13.

FIG. 24 is a flowchart showing the content of the configuration operation menu definition output process shown in step S13 of FIG. 22.

The CPU 11 outputs the letter string of [configuration] which is the configuration section name (step S31). Then, the CPU 11 declares the counter r by the initial value 1, and carries out the process of repeating the following step S33 and step S34 to the number of files (j) of the configuration definition 74 (step S32).

The CPU 11 carries out a declaration of variables corresponding to the menu number, the menu name and the scancode number, and carries out a process so as to set the menu number=r, the menu name=letter string excluding extension from the file name of the configuration definition 74 (Er name), and the scancode number=(9000+q) (step S33).

Then, the CPU 11 outputs the letter string in which the value set in step S33 is reflected in a form of "menu number=menu name, menu name.INI, scancode number" (step S34).

Figure 25:
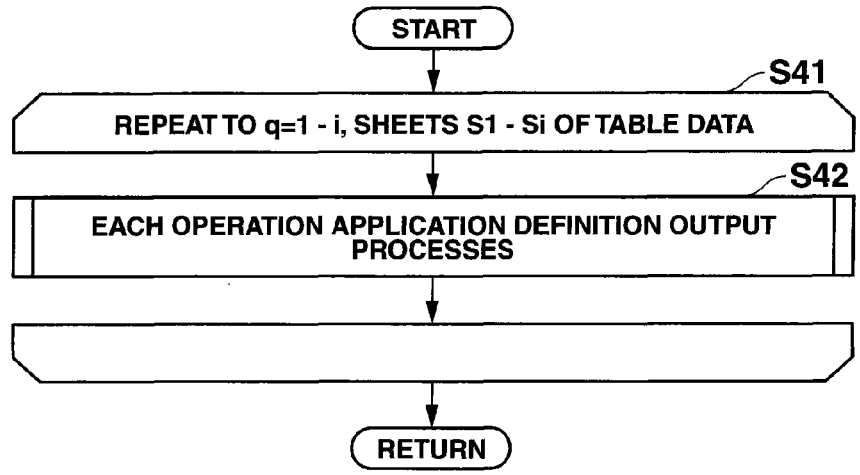
FIG. 25 is a flowchart showing a content of a generation process of all of application definitions shown in step S2.

FIG. 25 is a flowchart indicating the content of the generation process of all of the operation application definitions 83 shown in step S2 of FIG. 21.

The CPU 11 declares the counter q by the initial value 1, and carries out a process of repeating the output process (step S42) of each of the operation application definitions 83 to the number of the sheets (i of sheet Si) created in the table data 81 (step S41).

Figure 26:
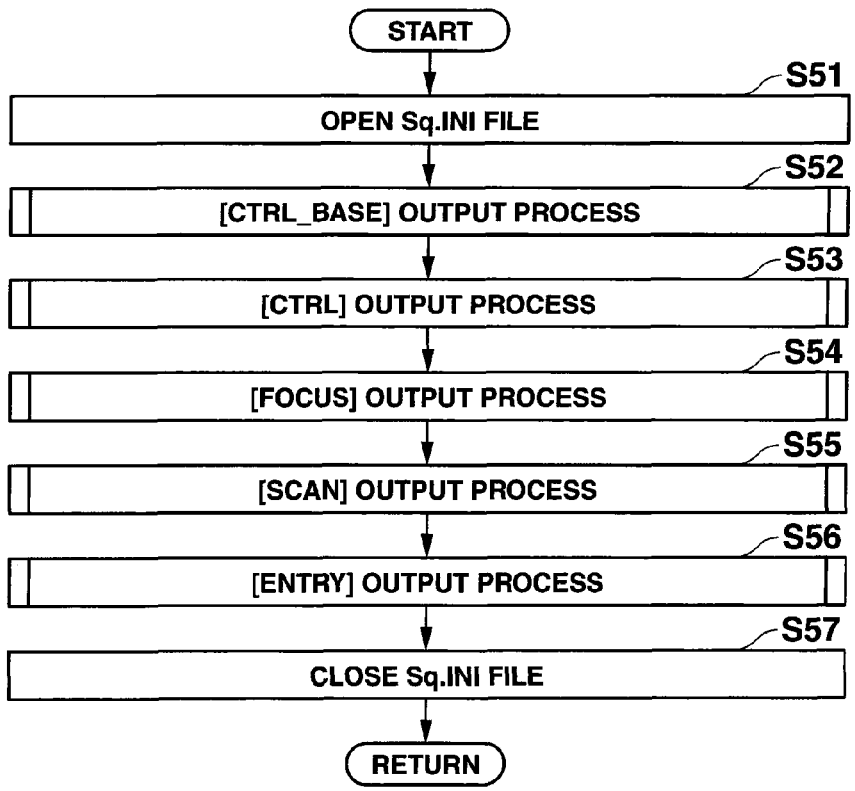
FIG. 26 is a flowchart showing a content of an output process of each application definition shown in step S42.

FIG. 26 is a flowchart showing the content of the output process of each of the operation application definitions 83 shown in step S42 of FIG. 25.

The CPU 11 generates an empty file which is generated as Sq.INI and opens the file (step S51), and orderly carries out [CTRL_BASE] output process (step S52), [CTRL] output process (step S53), [FOCUS] output process (step S54), [SCAN] output process (step S55) and [ENTRY] output process (step S56).

Thereafter, the CPU 11 closes the file of Sq.INI (step S14).

Figure 27:
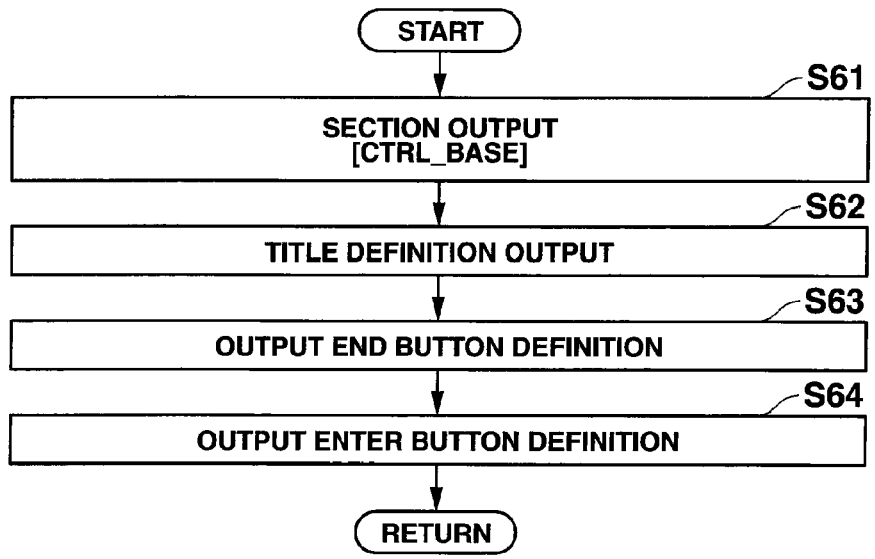
FIG. 27 is a flowchart showing a content of a [CTRL_BASE] output process shown in step S52.

FIG. 27 is a flowchart showing the content of [CTRL_BASE] output process shown in step S52 of FIG. 26.

The CPU 11 orderly carries out output of the section name of [CTRL_BASE] (step S61), output of the title definition (the letter string in the line of "1=TITLE1, . . . " of FIG. 16) (step S62), output of the end button definition (the letter string in the line of "2=BTN_END, . . . " of FIG. 16) (step S63), and output of the enter button definition (the letter string in the line of "3=BTN_ENTRY, . . . " of FIG. 16) (step s64).

Figure 28:
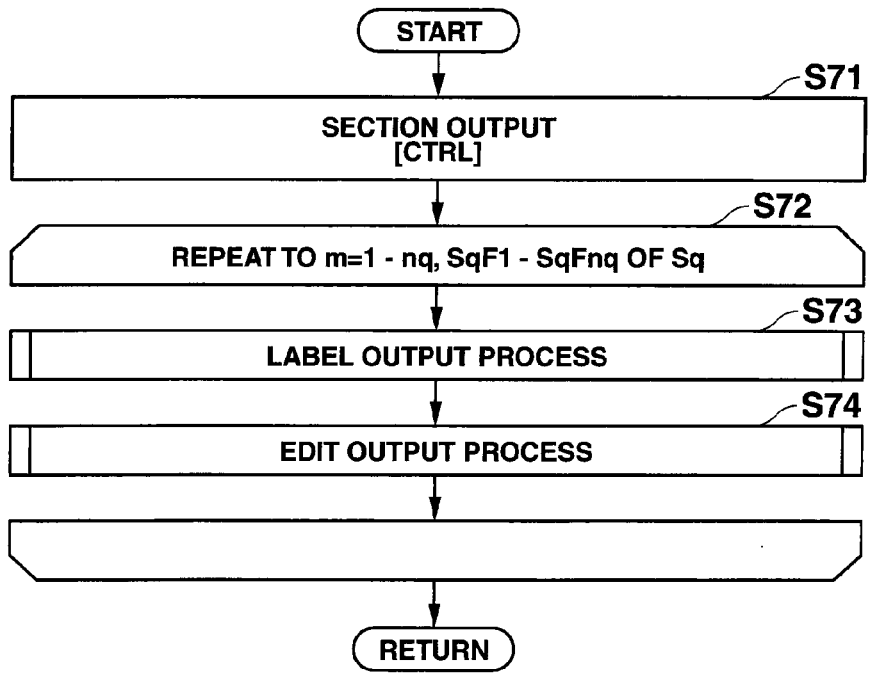
FIG. 28 is a flowchart showing a content of a [CTRL] output process shown in step S53.

FIG. 28 is a flowchart showing the content of [CTRL] output process shown in step S53 of FIG. 26.

The CPU 11 outputs the section name of [CTRL_BASE] (step S71). Then, the CPU 11 declares the counter m by the initial value 1, and carries out a process of repeating the LABEL output process (step S73) and the EDIT output process (step S74) to the number of items defined in the sheet Sq, that is, the value of nq in the last item SqFnq (step S72).

Figure 29:
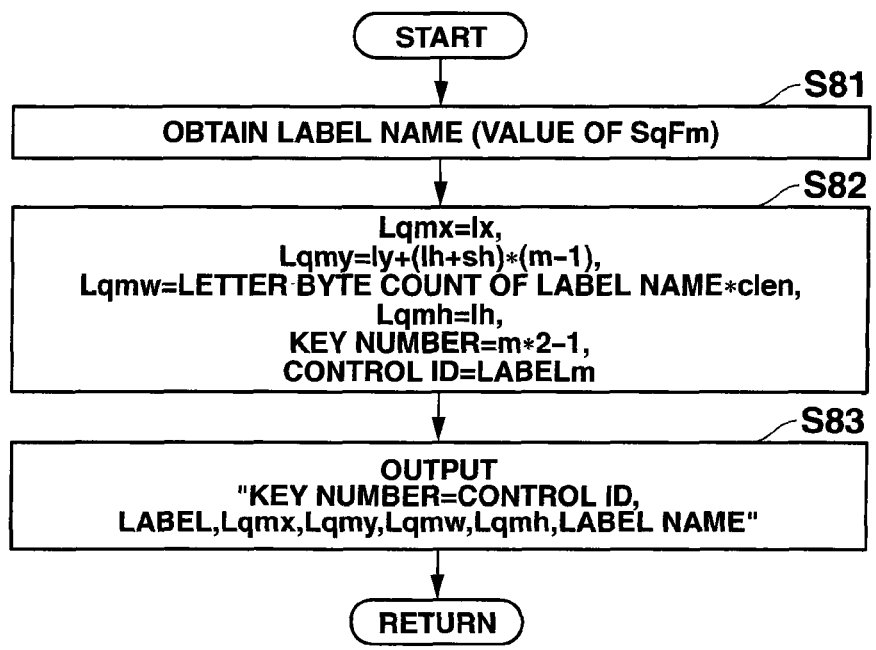
FIG. 29 is a flowchart showing a content of a LABEL output process shown in step S62.

FIG. 29 is a flowchart showing the content of the LABEL output process shown in step S73 of FIG. 28.

The CPU 11 obtains the value (letter string) of item SqFm which is defined as the LABEL name (step S81). Then, the CPU 11 calculates Lqmx, Lqmy, Lqmw and Lqmh based on the formulas (13) to (16), and also, declares variables corresponding to the key number and the control ID and sets the value of each variable by executing the following formulas (21) and (22) (step S82).

Here, LABELm is a letter string in which the value of counter m is added to the end of the letter string LABEL.

$$\text{Key number} = m \times 2 - 1 \qquad (21)$$

$$\text{Control ID} = \text{LABEL}m \qquad (22)$$

Then, the CPU 11 outputs the letter string in which the values set in step S81 and in step S82 are reflected in a form of "key numer=control ID, LABEL, Lqmx, Lqmy, Lqmw, Lqmh, label name" (step S83).

Figure 30:
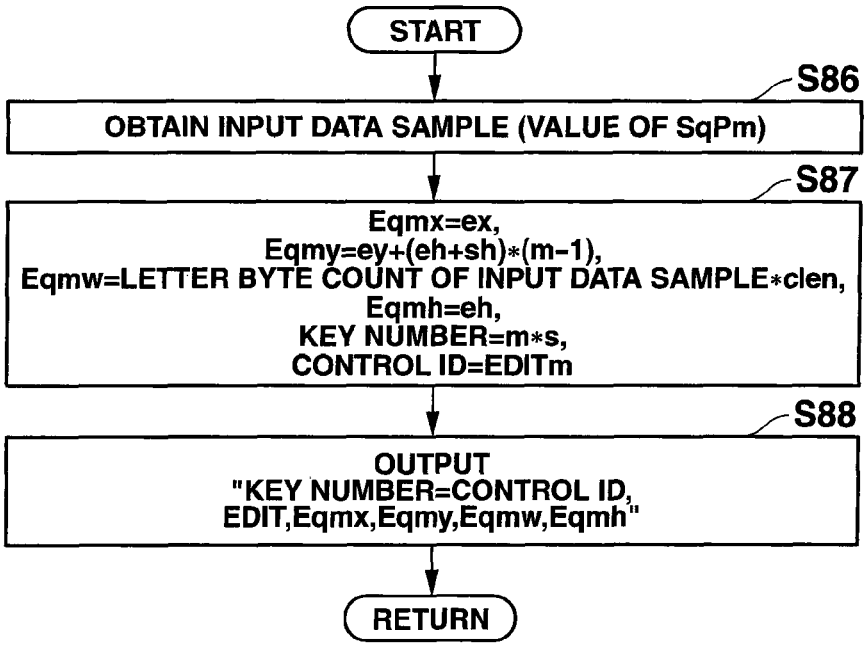
FIG. 30 is a flowchart showing a content of an EDIT output process shown in step S63.

FIG. 30 is a flowchart showing the content of the EDIT output process shown in step S74 of FIG. 28.

The CPU 11 obtains the value (letter string) of the item SqPm which is defined as an input data sample for calculating the letter string byte count (step S86). Then, the CPU 11 calculates Eqmx, Eqmy, Eqmw and Eqmh based on the formulas (17) to (20), and also, declares variables corresponding to the key number and the control ID and sets the value of each variable by executing the following formulas (23) and (24) (step S87). Here, EDITm is a letter string in which the value of the counter m is added at the end of the letter string EDIT.

$$\text{Key number} = m \times 2 \qquad (23)$$

$$\text{Control ID} = \text{EDIT}m \qquad (24)$$

Then, the CPU 11 outputs the letter string in which the values set in step S86 and in step S87 are reflected in a form of "key number=control ID, EDIT, Eqmx, Eqmy, Eqmw, Eqmh" (step S88).

Figure 31:
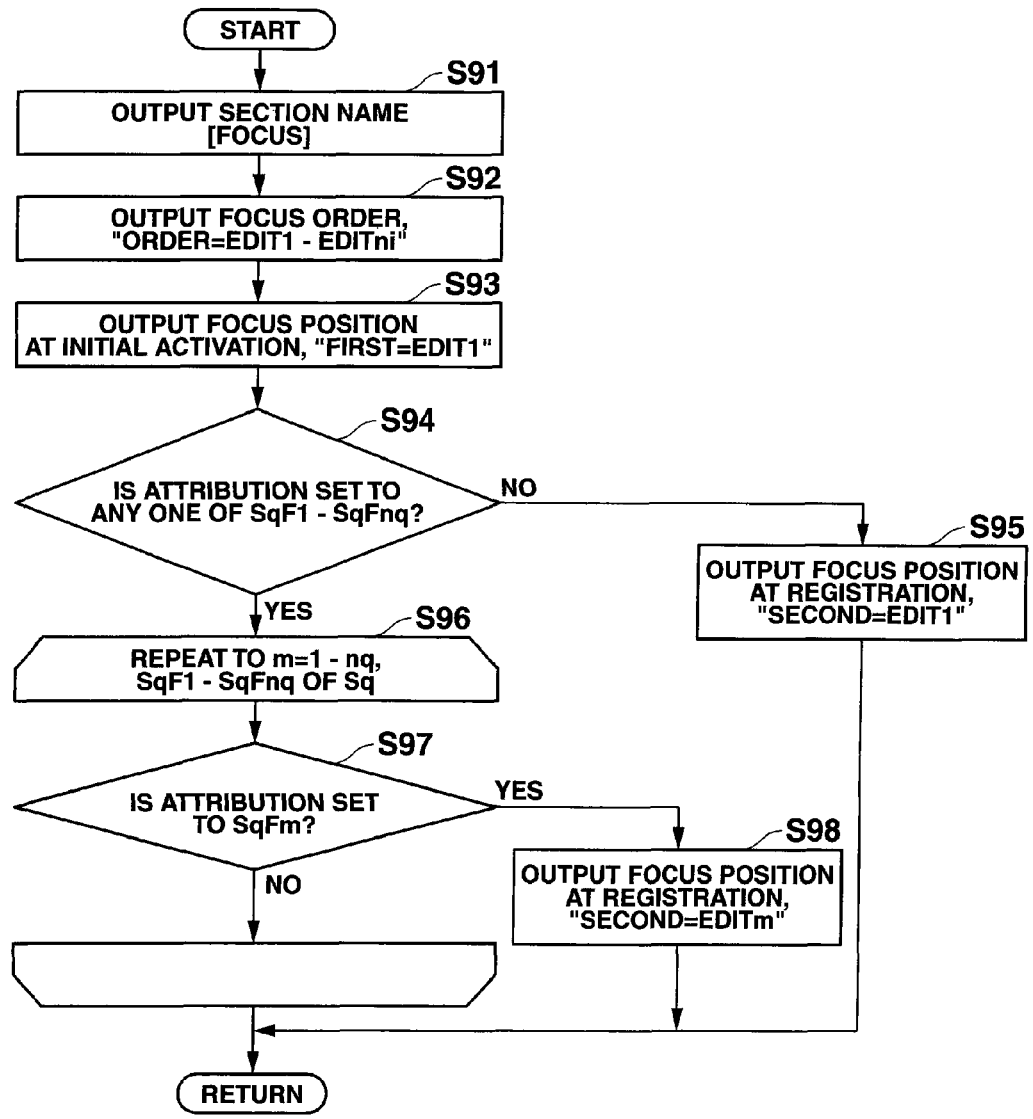
FIG. 31 is a flowchart showing a content of a [FOCUS] output process shown in step S54.

FIG. 31 is a flowchart showing the content of [FOCUS] output shown in step S54 of FIG. 26.

The CPU 11 carries out output of the section name of [FOCUS] (step S91), output of the focus order (the letter string of the line of "ORDER= . . . " in FIG. 16) (step S92), and output of the position of focus at the time of initial activation (the letter string of the line of "FIRST= . . . " in FIG. 16) (step S93).

Then, the CPU 11 determines whether attribute is set to the items SqF1 to SqFnq which are defined so as to assign the items as items corresponding to the information to be read when scanning is carried out (step S94).

In step S94, when the attribute is not set to any of the items (step S94: NO), the CPU 11 outputs SECOND=EDIT1 as the letter string of the line indicating the focus position at the time of registration (step S95).

In step S94, when the attribution is set to any one of the items (step S94: YES), the CPU 11 declares the counter m by the initial value 1, and carries out a process of repeating the following step S97 to the number of items which are defined in the sheet Sq, that is, the value of nq of the last item SqFnq (step S96).

The CPU 11 determines whether the attribution is set to the item SqFm (step S97). In step S97, when the attribution is set (step S97: YES), the CPU 11 outputs the line indicating the focus position at the time of registration as SECOND=EDITm, and exits from the repeating process of step S96 (step S98).

In step S97, when the attribution is not set (step S97: NO), the process returns to step S96.

Figure 32:
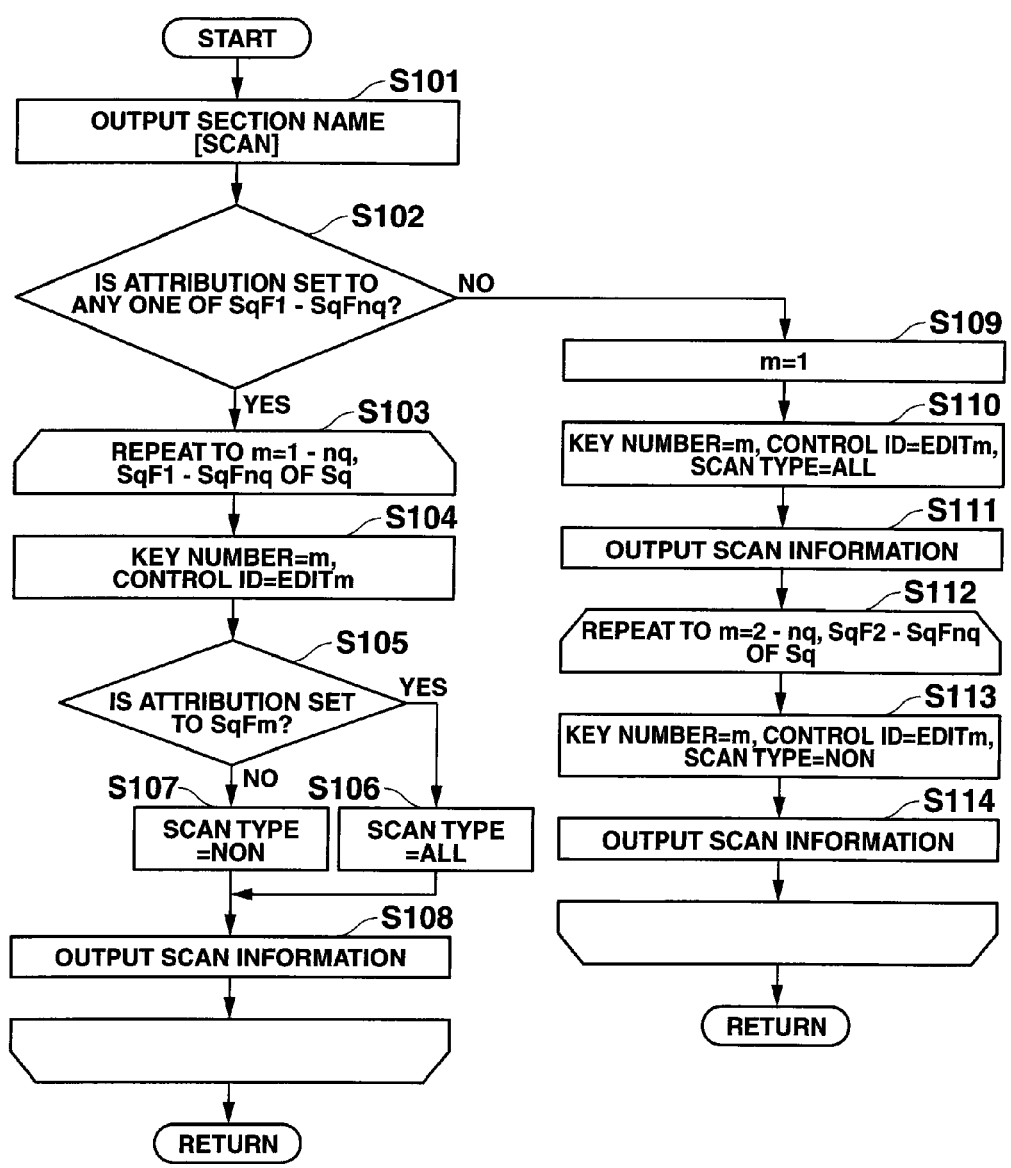
FIG. 32 is a flowchart showing a content of a [SCAN] output process shown in step S55.

FIG. 32 is a flowchart showing the content of [SCAN] output process shown in step S55 of FIG. 26.

The CPU 11 outputs the section name of [SCAN] (step S101). Then, the CPU 11 determines whether the attribution is set to the items SqF1 to SqFnq which are defined so as to assign the items as items corresponding to the information to be read when scanning is carried out or not (step S102).

In step S102, when the attribution is set to any one of the items (step S102: YES), the CPU 11 declares the counter m by the initial value 1, and carries out a process of repeating the following step S104 to step S108 to the number of items defined in the sheet Sq, that is, the value of nq of the last item SqFnq (step S103).

First, the CPU 11 declares variables corresponding to the key number and the control ID, and carries out the setting so as to be the key number=m and the control ID=EDITm (step S104).

Then, the CPU 11 determines whether the attribution is set to the item SqFm or not (step S105). When the attribution is set (step S105: YES), the CPU 11 outputs ALL for the scan type (step S106), and when the attribution is not set (step S105: NO), the CPU 11 outputs NON for the scan type (step S107).

After step S106 or step S107, the CPU 11 carries out an output based on the result obtained in step S106 or step S107 as scan information of EDITm (step S108).

In step S102, when the attribution is not set to any of the items (step S102: NO), the CPU 11 declares the counter m by the initial value 1 (step S109).

Then, the CPU 11 declares variables corresponding to the key number and the control ID, and carries out a process so as to set the key number=m and the control ID=EDITm, and also, the CPU 11 sets ALL for the scan type (step S110) and outputs EDITm, that is, the scan information of EDIT1 based on the content of step S110 (step S111).

Thereafter, the CPU 11 adds 1 to the counter m so as to set m=2, and carries out a process of repeating the following step S113 and step S114 to the number of items defined in the sheet Sq, that is, the value nq of the last item SqFnq (step S112).

The CPU 11 sets the key number=m and the control ID=EDITm, and also, sets NON for the scan type (step S113) and outputs the scan information of EDITm based on the content of step S113 (step S114).

Figure 33:
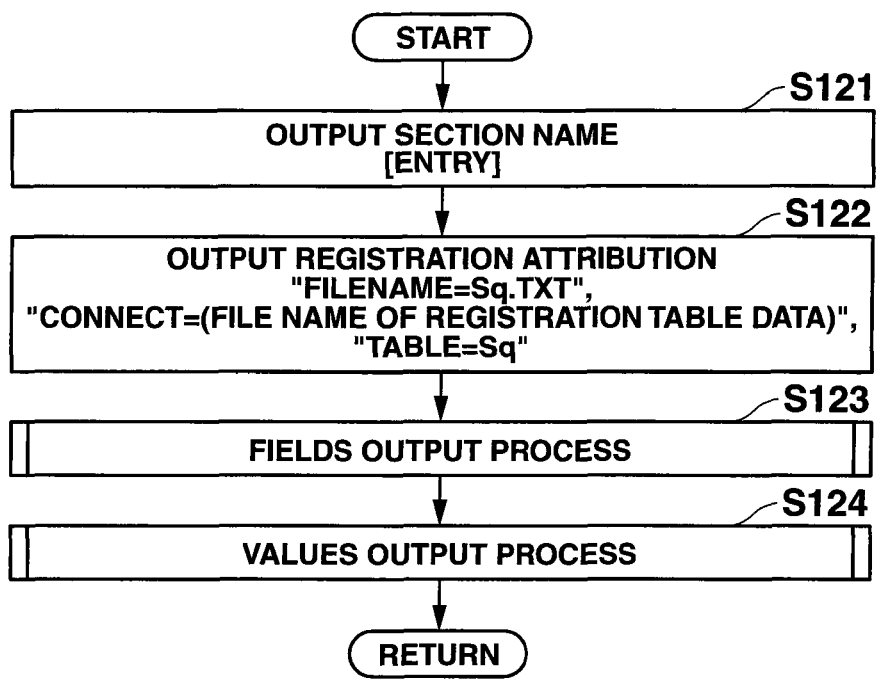
FIG. 33 is a flowchart showing a content of an [ENTRY] output process shown in step S56.

FIG. 33 is a flowchart showing the content of [ENTRY] output process shown in step S56 of FIG. 26.

The CPU 11 orderly carries out output of the section name of [ENTRY] (step S121) and a registration attribution output (step S122). As the registration attribution output of step S122, in particular, each entry of "FILENAME=Sq.TXT", "CONNECT=(file name of registration table data 85)" and "TABLE=Sq" are outputted. Then, the CPU 11 orderly carries out a FIELDS output process (step S123) and a VALUES output process (step S124).

Figure 34:
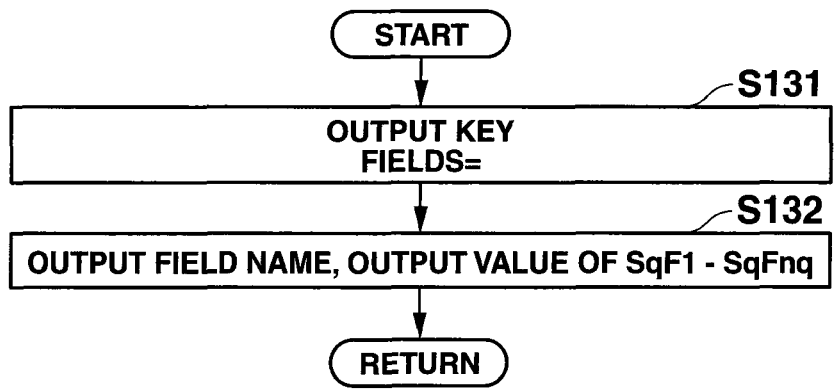
FIG. 34 is a flowchart showing a content of a FIELDS output process shown in step S123.

FIG. 34 is a flowchart showing the content of the FIELDS output process shown in step S123 of FIG. 33.

The CPU 11 carries out output (key output) of the letter string of "FIELDS=" (step S131), and outputs (field name output) the values of the items SqF1 to SqFnq which are defined in comma-delimited form as letter strings following the letter string of "FIELDS=" of step S131 (step S132).

Figure 35:
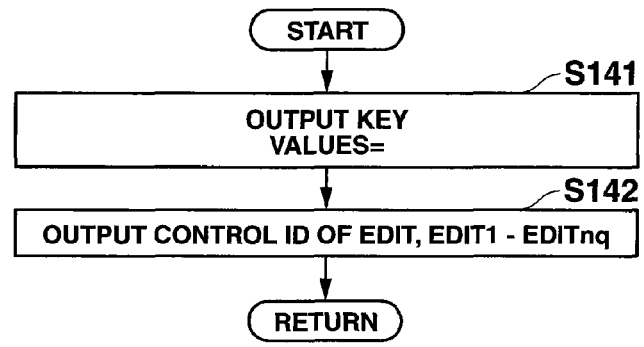
FIG. 35 is a flowchart showing a content of a VALUES output process shown in step S124.

FIG. 35 is a flowchart showing the content of VALUES output process shown in step S124 of FIG. 33.

The CPU 11 carries out output (key output) of the letter string of "VALUES=" (step S141), and outputs (field name output) EDIT1 to EIDTnq in comma-delimited form as letter strings following the letter string of "VALUES=" of step S141 (step S142).

Figure 36:
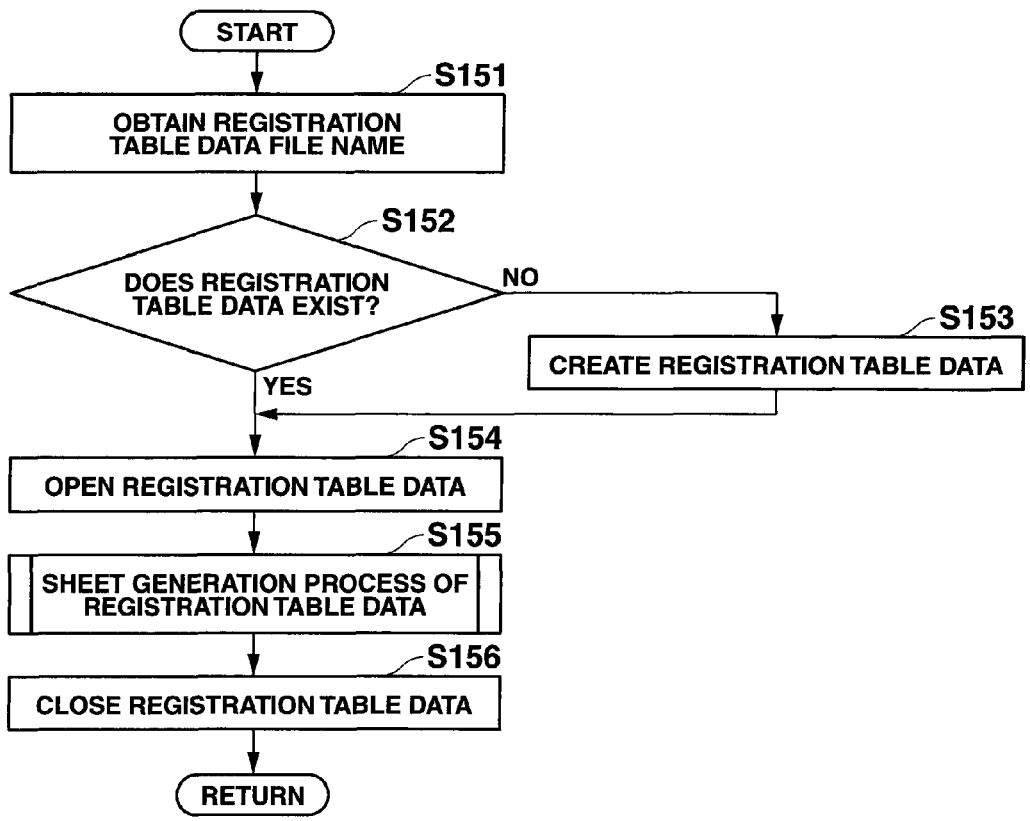
FIG. 36 is a flowchart showing a content of a generation process of the registration table data shown in step S3.

FIG. 36 is a flowchart showing the content of a generation process of the registration table data 85 shown in step S3 of FIG. 21.

The CPU 11 obtains the file name which is set as the item "output book name" (step S151).

Then, the CPU 11 confirms whether the registration table data 85 of the file name which is obtained in step S151 exists in the HDD 14 or not (step S152). When the registration table data 85 of the file name which is obtained in step S151 does not exist (step S152: NO), the CPU 11 generates a registration table data 85 in the file name obtained in step S151 (step S153).

After the process of step S153 or when the file exists in step S152 (step S152: YES), the CPU 11 opens the registration table data 85 (step S154), carries out the sheet generation process of the registration table data 85 (step S155), and closes the registration table data 85 (step S156).

Figure 37:
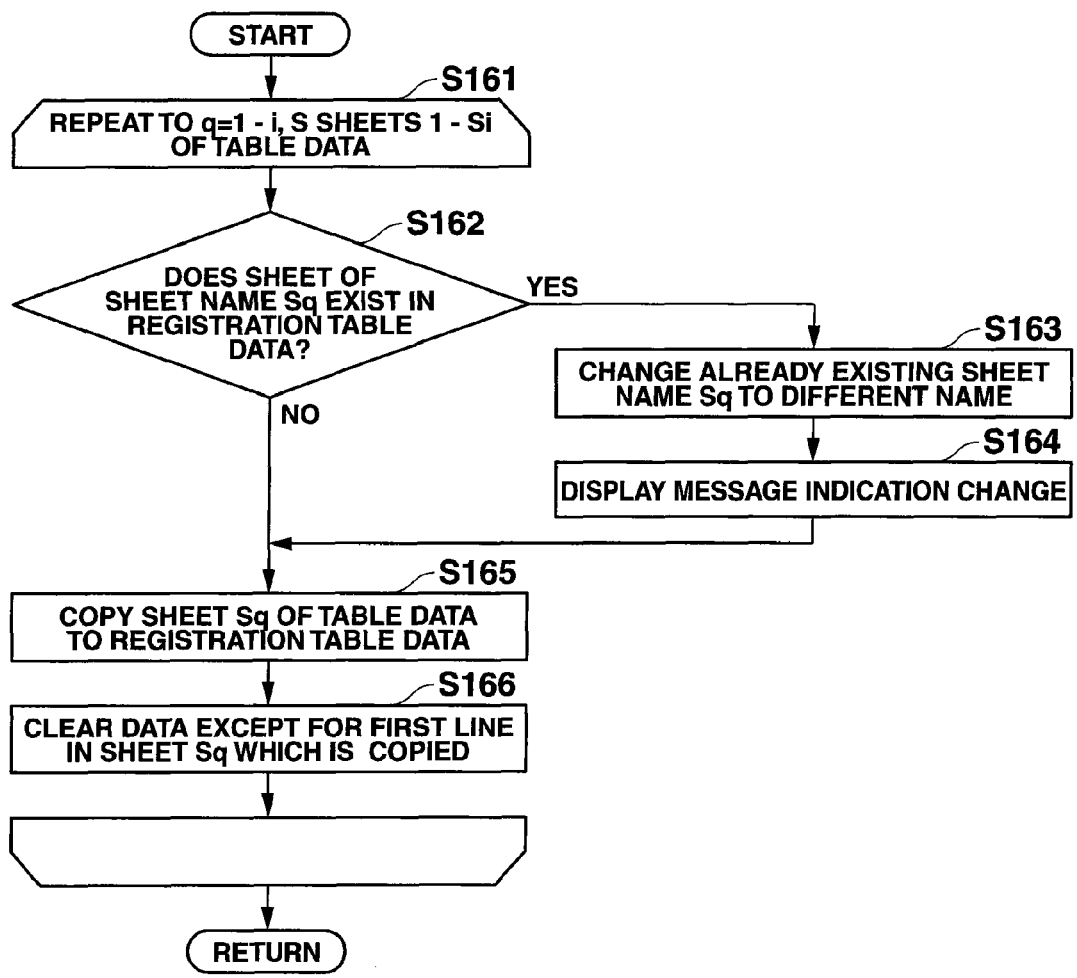
FIG. 37 is a flowchart showing a content of a sheet generation process of the registration table data shown in step S155.

FIG. 37 is a flowchart showing the content of the sheet generation process of the registration table data 85 shown in step S155 of FIG. 36.

The CPU 11 declares the counter q by the initial value 1, and carries out a process of repeating the following step S162 to step S166 to the number of sheets created in the table data 81, that is, the value indicated by i of the sheets S1 to Si (step S161).

The CPU 11 determines whether a sheet in which the sheet name is S1 exists in the registration table data 85 or not (step S162). When the sheet named Sq exists (step S162: YES), the CPU 11 changes the name of the sheet named Sq which already exists to a different name (step S163), and makes the display device 18 display a message to inform that the name of the sheet named Sq which already existed have been changed (step S164).

After the process of step S164 or when a sheet in which the sheet name is Sq does not exist in step S162 (step S123: NO), the CPU 11 copies the sheet Sq of the table data 81 to the registration table data 85 (step S165) and clears the data except the first line of the sheet Sq of the copied registration table data 85 (step S166).

Figure 38:
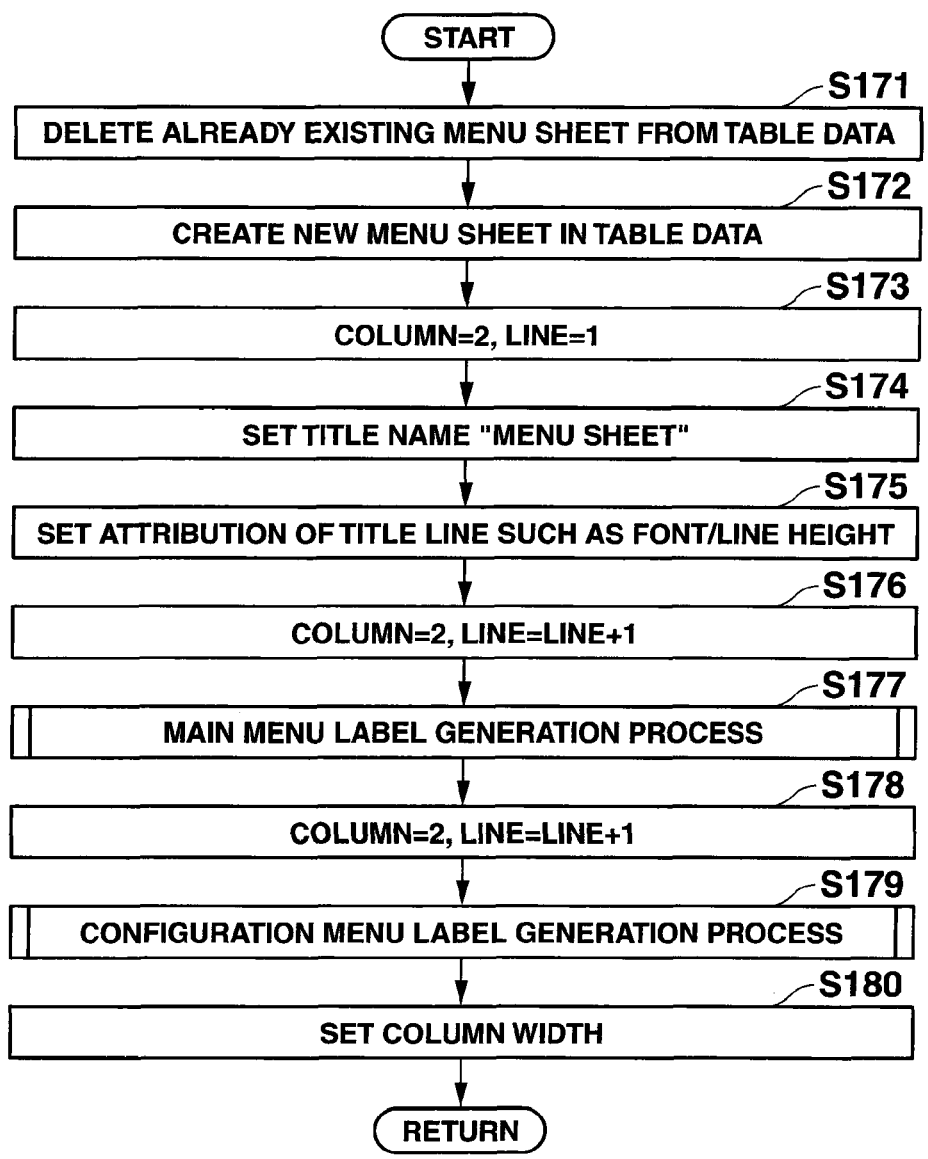
FIG. 38 is a flowchart showing a content of a menu sheet generation process shown in step S4.

FIG. 38 is a flowchart showing the content of the menu sheet generation process shown in step S4 of FIG. 21.

The CPU 11 orderly carries out a process to delete the existing menu sheet in the table data 81 (step S171) and a process to create a new menu sheet in the table data 81 (step S172).

Then, the CPU 11 declares a variable (column) for managing the column number in the menu sheet and a variable (line) for managing the line number, and sets the column=2 and the line=1 (step S173). Further, the CPU 11 sets the title name of "menu sheet" in the cell which is assigned based on step S173 (step S174).

Then, the CPU 11 carries out the attribution setting (for example, font, line height and the like) of the line in which the title is set in step S174 (step S175).

Thereafter, the CPU 11 adds 1 to the line number (line) (step S176) and carries out the main menu label generation process (step S177).

Further, the CPU 11 adds 1 to the line number (line) after the main menu label generation process in step S177 (step S178) and carries out the configuration menu label generation process (step S179).

Then, the CPU 11 sets the column width of the menu sheet (step S180).

Here, various types of setting content such as the font and the line height in step S175 and the column width in step S180 are based on the setting content which is previously set.

The setting content is included in the content of file which is assigned in the item "referring book name", for example.

The same applies to the after-mentioned step S193, step S200, step S213 and step S220.

Figure 39:
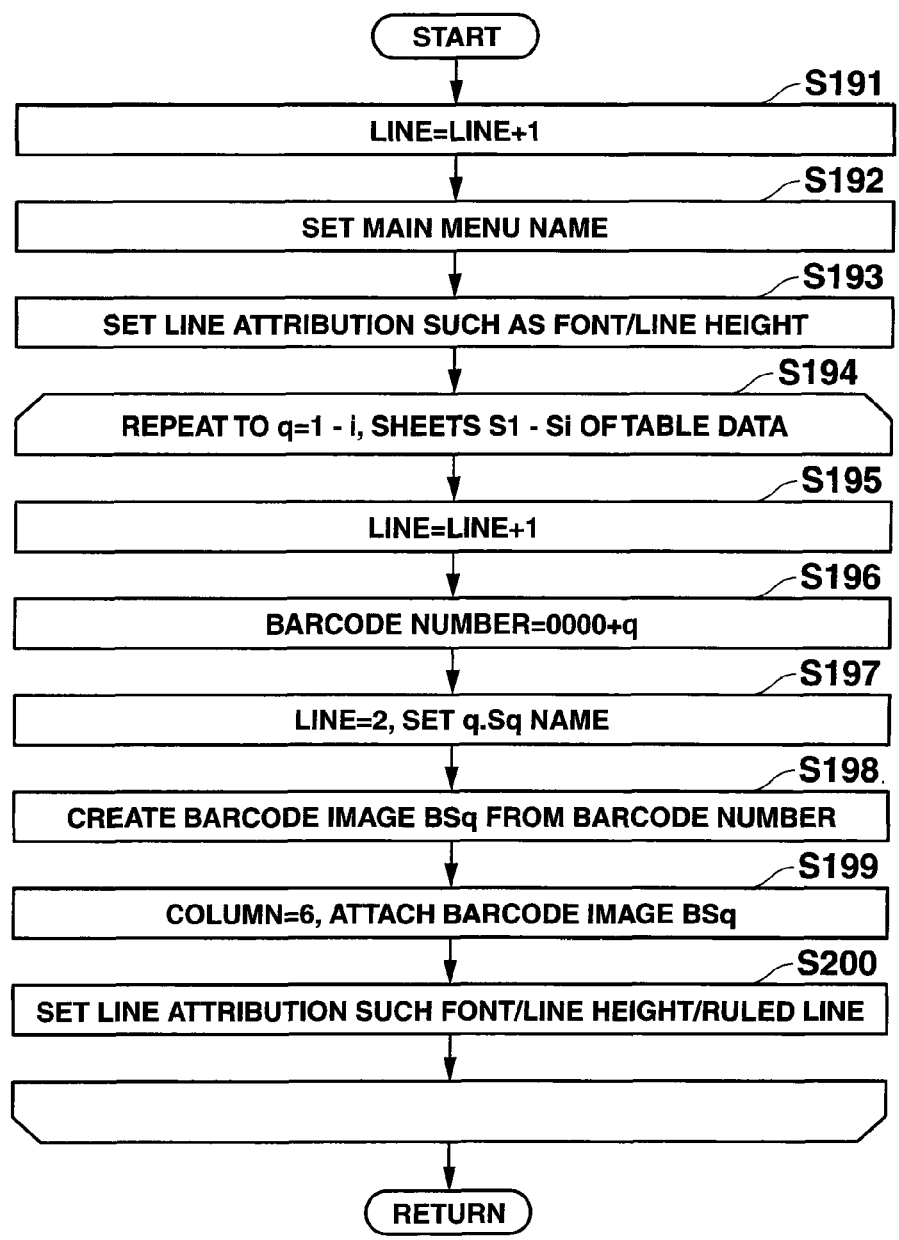
FIG. 39 is a flowchart showing a content of a main menu label generation process shown in step S177.

FIG. 39 is a flowchart showing the content of the main menu label generation process shown in step S177 of FIG. 38.

The CPU 11 adds 1 to the line number (line) after the process of step S176 (step S191), and orderly carries out setting of the main menu name (step S192) and a process of the attribution setting (for example, font, line height and the like) of the line in which the main menu name is set in step S192 (step S193).

Then, the CPU 11 declared the counter q by the initial value 1, and carries out a process of repeating the following step S195 to step S200 to the number of sheets created in the table data 81, that is, the value indicated by i of the sheets S1 to Si (step S194).

The CPU 11 adds 1 to the line number (line) after the process of step S191 (step S195) and obtains the calculation result of 0000+q as the barcode number (step S196). Then, the CPU 11 sets a letter string corresponding to q. Sq in the cell which is assigned by the line number (line) after the process of step S195 and the column=2 (step S197).

In the letter string set in step S197, q is the value of the counter and Sq is the sheet name of the $q^{th}$ sheet in the table data 81. Then, the CPU 11 creates the barcode image BSq based on the barcode number obtained in step S196 (step S198), and attaches the barcode image BSq which is created in step S198 in the cell assigned by the line number (line) after the process of step S195 and the column=6 (step S199).

Then, the CPU 11 carries out the attribution setting (for example, font, line height, ruled line and the like) for the line which is assigned in step S195 (step S200).

Figure 40:
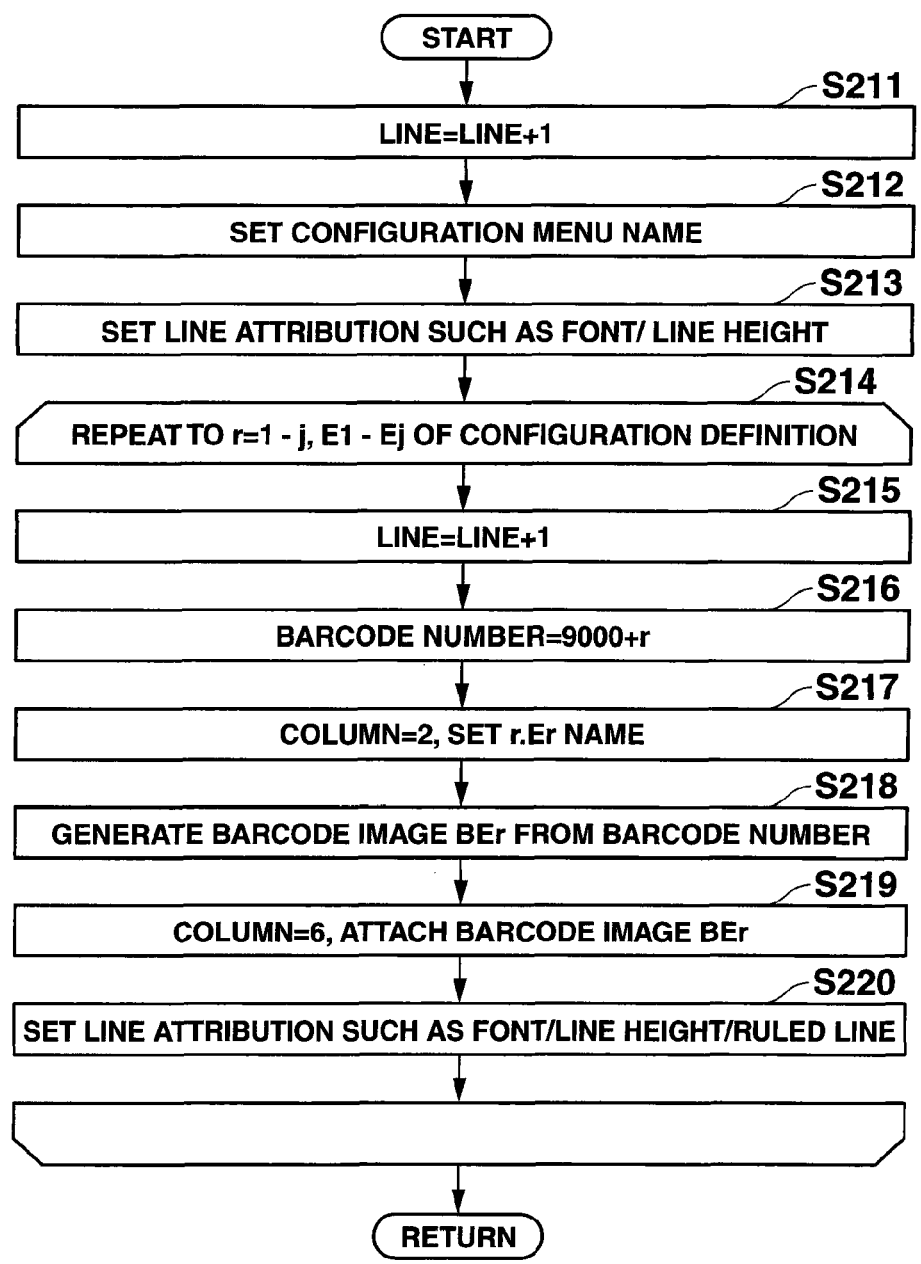
FIG. 40 is a sub-flowchart showing a content of a configuration menu label generation process shown in step S179.

FIG. 40 is a flowchart showing the content of the configuration menu label generation process shown in step S179 of FIG. 38.

The CPU 11 adds 1 to the line number (line) after processing of step S178 (step S211), and orderly carries out setting of the configuration menu name (step S212) and a process of attribution setting (for example, font, line height and the like) of the line in which the configuration menu name is set in step S212 (step S213).

Then, the CPU 11 declares the counter r by the initial value 1, and carries out a process of repeating the following step S215 to step S220 to the value indicated by the number (j) of the configuration definition 74 (step S214).

The CPU 11 adds 1 to the line number (line) after the processing of step S211 (step S215) and obtains the calculation result of 90000+r as the barcode number (step S216).

Then, the CPU 11 sets the letter string correspond to r. Er in the cell which is assigned by the line number (line) after the processing of step S215 and the column=2 (step S217).

In the letter string which is set in step S217, r is a value of the counter and Er is the name of $r^{th}$ configuration. Then, the CPU 11 creates the barcode image BEr based on the barcode number obtained in step S216 (step S218), and attaches the barcode image BEr which is created in step S218 in the cell assigned by the line number (line) after the processing of step S215 and line=6 (step S219).

Then, the CPU 11 carries out the attribution setting (for example, font, line height, ruled line and the like) of the line assigned in step S215 (step S220).

Figure 41:
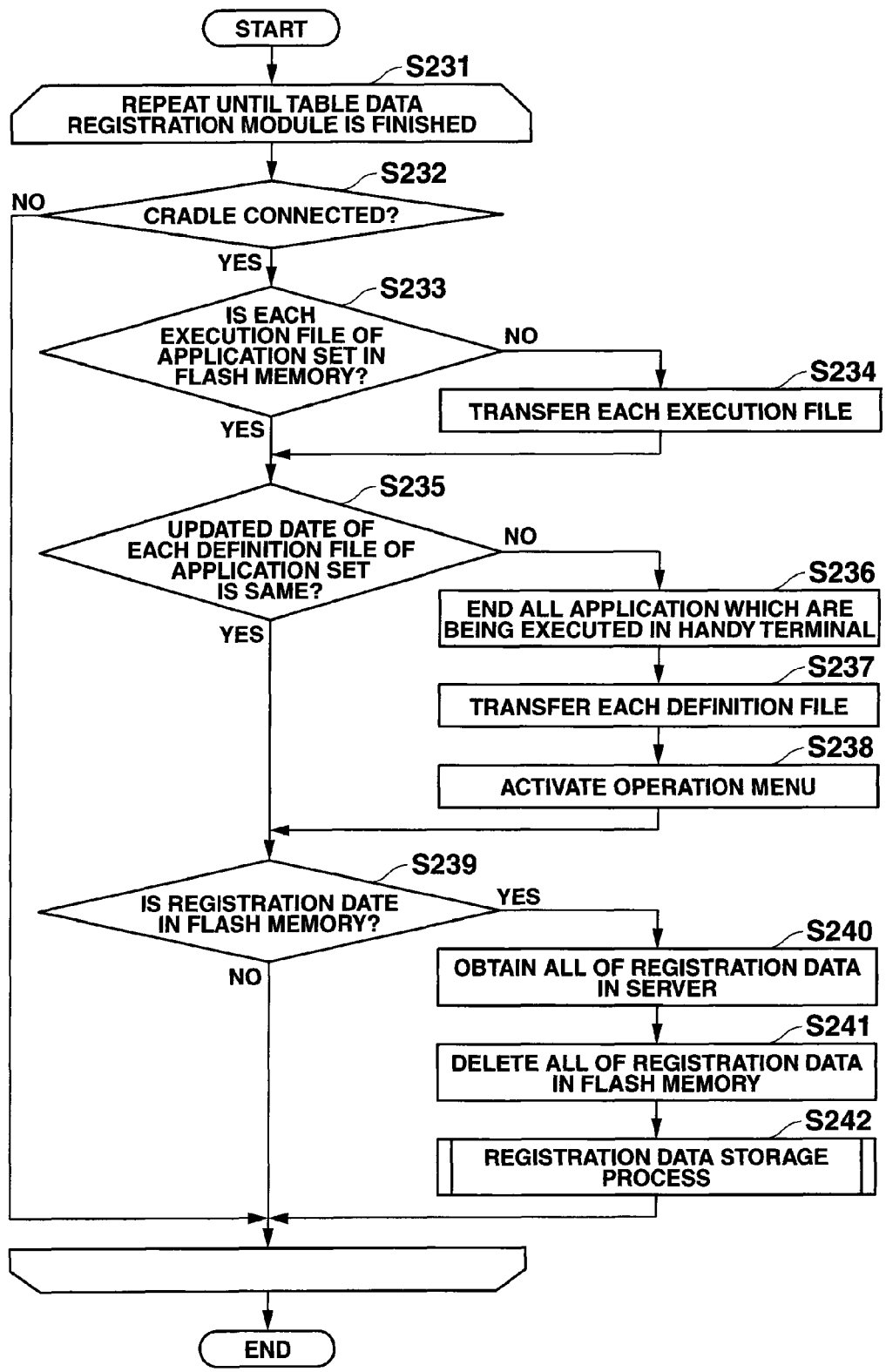
FIG. 41 is a flowchart showing a content of a monitoring process of a cradle.

FIG. 41 is a flowchart showing the content of the monitoring process of the cradle 2.

The CPU 11 carries out a process of repeating the following step S232 to step S242 until the table data registration module 64 is finished (step S231).

The CPU 11 carries out the monitoring until the handy terminal 5 is connected via the cradle 2 (step S232: NO), and carries out the processes after step S233 when the handy terminal 5 is connected (step S232: YES).

The CPU 11 confirms whether each execution file of the application set 80, that is, the operation menu 71, the operation application 72 and the configuration application 73 are in the flash memory 34 of the handy terminal 5 or not (step S233). When any one of the above execution files does not exist (step S233: NO), the CPU 11 transfers each execution file of the application set 80 to the handy terminal 5 (step S234).

After the processing of step S234 or in step S233, when there are all of the operation application 72 and the configuration application 73 in the flash memory 34 (step S233: YES), the CPU 11 confirms whether the updated data (file creation data or updated date) of each definition file, that is, the operation menu definition 82, the operation application definition 83 and the configuration definition 74 of the application set 80 which is stored in the flash memory 34 is same as the file creation date or the updated data of each definition file of the application set 80 which is stored in the HDD 14 or not (step S235).

Then, when the dates are not the same or when one or more of the operation menu definition 82, the operation application definition 83 and the configuration definition 74 do not exist (step S235: NO), the CPU 11 controls so as to make the CPU 31 of the handy terminal 5 finish all of the applications which are executed in the handy terminal 5 (step S236).

Thereafter, the CPU 11 transfers the operation menu definition 82, the operation application definition 83 and the configuration definition 74 to the handy terminal 5 from the data processing device 1 (step S237). Then, the CPU 11 makes the CPU 31 of the handy terminal 5 activate the operation menu 71 (step S238).

After the processing of step S238 or in step S235, when the file creation date or the updated date of the operation menu definition 82, the operation application definition 83 and the configuration definition 74 is same as the file creation date or the updated data of each definition file of the application set 80 which is stored in the HDD 14 (step S235: YES), the CPU 11 confirms whether the registration data 86 is in the flash memory 5 or not (step S239).

Then, when the registration data 86 is in the flash memory 5 (step S239: YES), the CPU 11 obtains all of the registration data 86 (step S240), deletes all of the registration data 86 in the flash memory 34 (step S241), and carries out the storing process of the registration data 86 (step S242).

Figure 42:
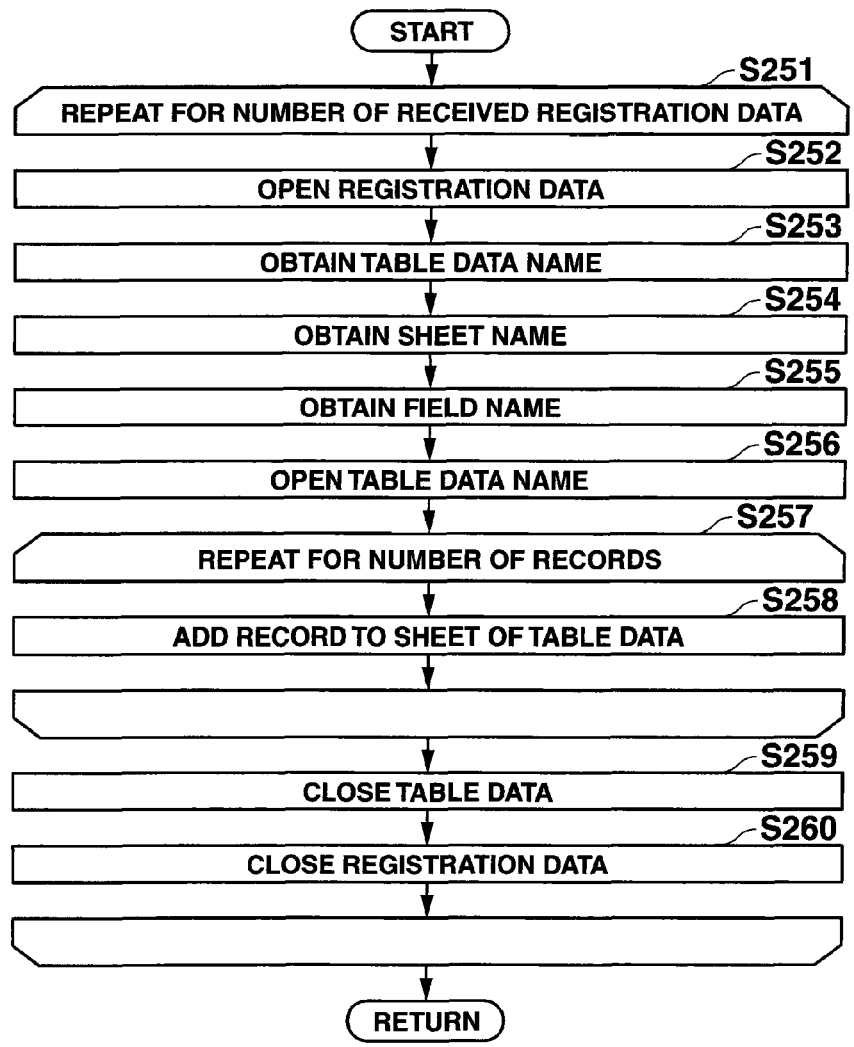
FIG. 42 is a flowchart showing a content of a storing process of the registration data shown in step S242.

FIG. 42 is a flowchart showing the content of the storing process of the registration data 86 shown in step S242 of FIG. 41.

The CPU 11 carries out a process of repeating the following step S252 to step S260 for number of times according to the number of all of the registration data which are obtained in step S240 (step S251).

The CPU 11 opens the registration data 86 (step S252), and orderly carries out a process to obtain the file name of the registration table data 85 which is to be the target for storing data (step S253), a process to obtain the sheet name of the registration table data 85 which is to be the target for storing data (step S254) and a process to obtain the field name of the registration table data 85 which is to be the target for storing data (step S255).

The field names of the registration table data 85 are the item names which are assigned in the second line of the registration data 86 shown in FIG. 19. Thereafter, the registration table data 85 of the file name which is obtained in step S253 is opened (step S256).

Then, the CPU 11 carries out a process of repeating a process to add a record of the lines after the third line of the registration data 86 in the sheet having the sheet name which is obtained in step S254 (step S258) for a number of times according to the number of records (step S257).

Thereafter, the CPU 11 closes the registration table data 85 (step S259) and closes the registration data 86 (step S260).

Figure 43:
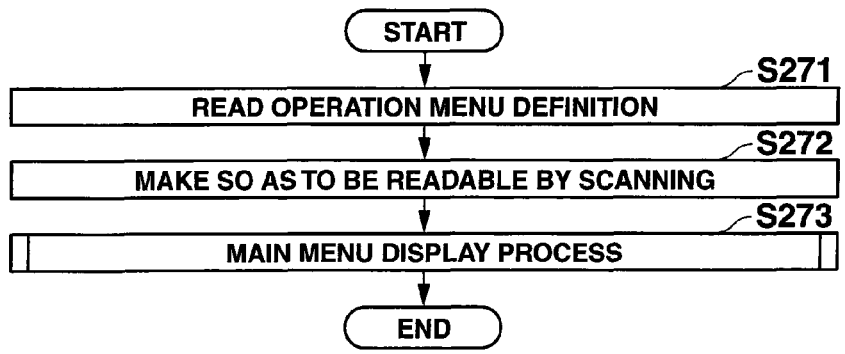
FIG. 43 is a flowchart showing a content of a start-up process of the operation menu.

FIG. 43 is a flowchart showing the content of the activation process of the operation menu 71.

The CPU 31 of the handy terminal 5 reads the operation menu definition 71 (step S271), makes the scanner 41 so as to be able to carry out the reading operation (step S272), and carries out the main menu display process (step S273).

Figure 44:
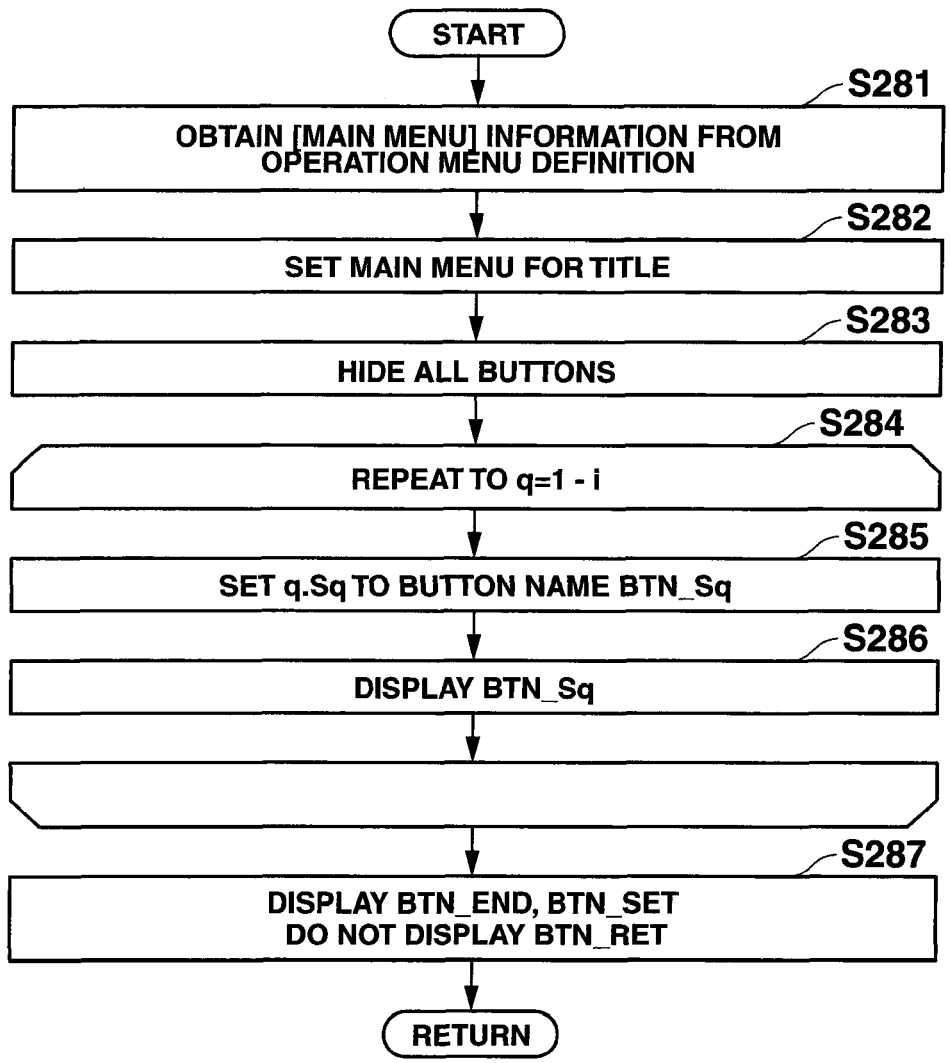
FIG. 44 is a flowchart showing a content of a main menu display process shown in step S273.

FIG. 44 is a flowchart showing the content of the main menu display process shown in step S273 of FIG. 43.

The CPU 31 orderly carries out a process to obtain information relating to [main menu] from the operation menu definition 71 (step S281), a process to set [main menu] for the title (step S282) and a process to not display all of the buttons of the menu screen (step S283).

Then, the CPU 31 sets the counter q by the initial value 1, and carries out a process of repeating the following step S285 and step S286 for the number of sheets created in the table data 81, that is, the value indicated by i of the sheets S1 to Si (step S284).

The CPU 31 caries out a process to set q. Sq for the button name of BTN_Sq (step S285) and displays BTN_Sq (step S286).

In the letter string which is set in step S285, q is the value of the counter and Sq is the sheet name of the $q^{th}$ sheet in the table data 81.

Thereafter, the CPU 31 carries out a process to display the end button BTN_END and the set button BTN_SET and to not display the return button BTN_RET (step S287).

Figure 45:
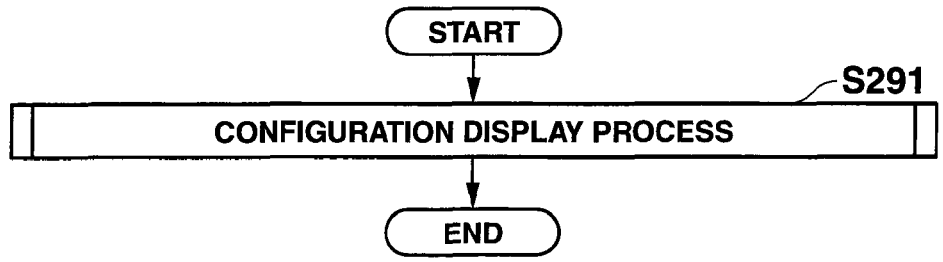
FIG. 45 is a flowchart showing a processing content when a setting button is operated.

FIG. 45 is a flowchart showing the processing content when the set button is operated.

When the set button BTN_SET is operated, the CPU 31 carries out the configuration display process (step S291).

Figure 46:
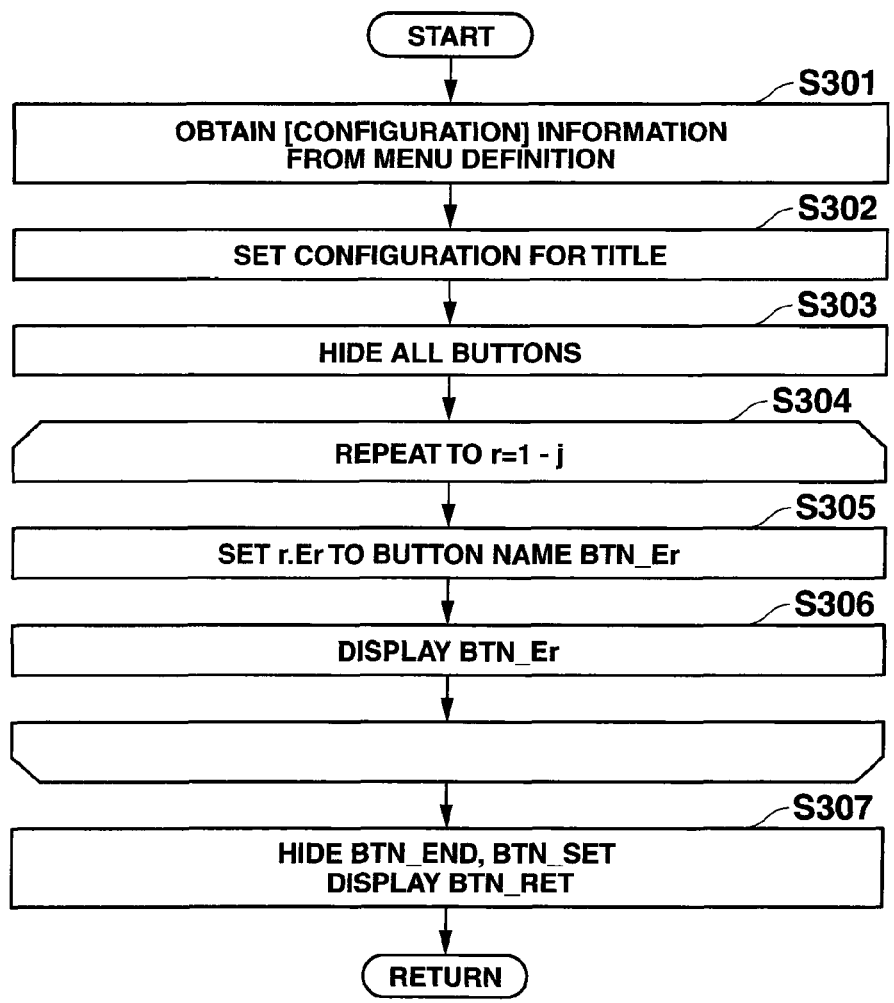
FIG. 46 is a flowchart showing a content of a configuration display process shown in step S291.

FIG. 46 is a flowchart showing the content of the configuration display process shown in step S291 of FIG. 45.

The CPU 31 orderly carries out a process to obtain information relating to [configuration] from the operation menu definition 71 (step S301), a process to set [configuration] for the title (step S302), and a process to not display all of the buttons in the menu screen (step S303).

Then, the CPU 31 sets the counter r by the initial value 1, and carries out a process of repeating the following step S305 and step S306 for the number of files (j) in the configuration definition 74 (step S304).

The CPU 31 carries out a process to set r.Er for the button name of BTN_Er (step S305) and displays BTN_Er (step S306).

In the letter string which is set in step S305, r is the value of the counter and Er is the name of the $r^{th}$ configuration.

Thereafter, the CPU 31 carries out a process to not display the end button BTN_END and the set button BTN_SET and to display the return button BTN_RET (step S307).

Figure 47:
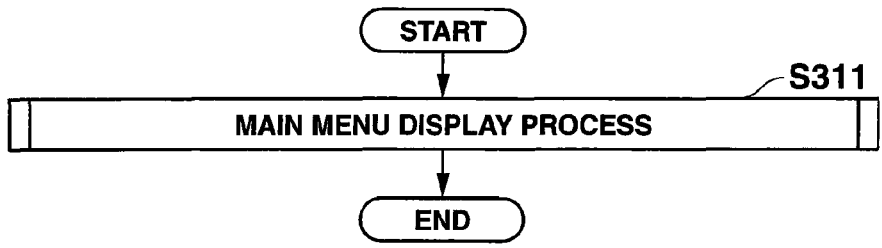
FIG. 47 is a flowchart showing a processing content when a return button is operated.

FIG. 47 is a flowchart showing the process content when the return button is operated.

When the return button BTN_REN is operated, the CPU 31 carries out the main menu display process similar to step S273 (step S311).

Figure 48:
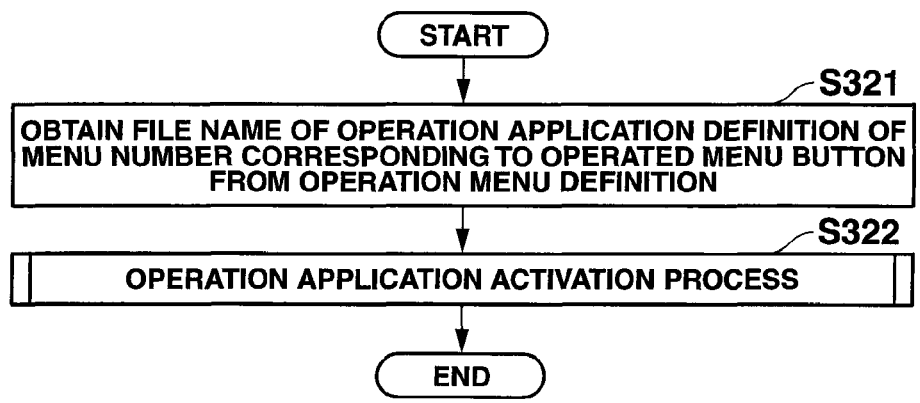
FIG. 48 is a flowchart showing a processing content when a menu button in a main menu screen is operated.

FIG. 48 is a flowchart showing the processing content when the menu button in the main menu screen is operated.

The CPU 31 obtains the file name of the operation application definition 83 to which the menu number corresponding to the operated menu button is attached from the operation menu definition 82 (step S321) and carries out an activation process of the operation application 72 (step S322).

Figure 49:
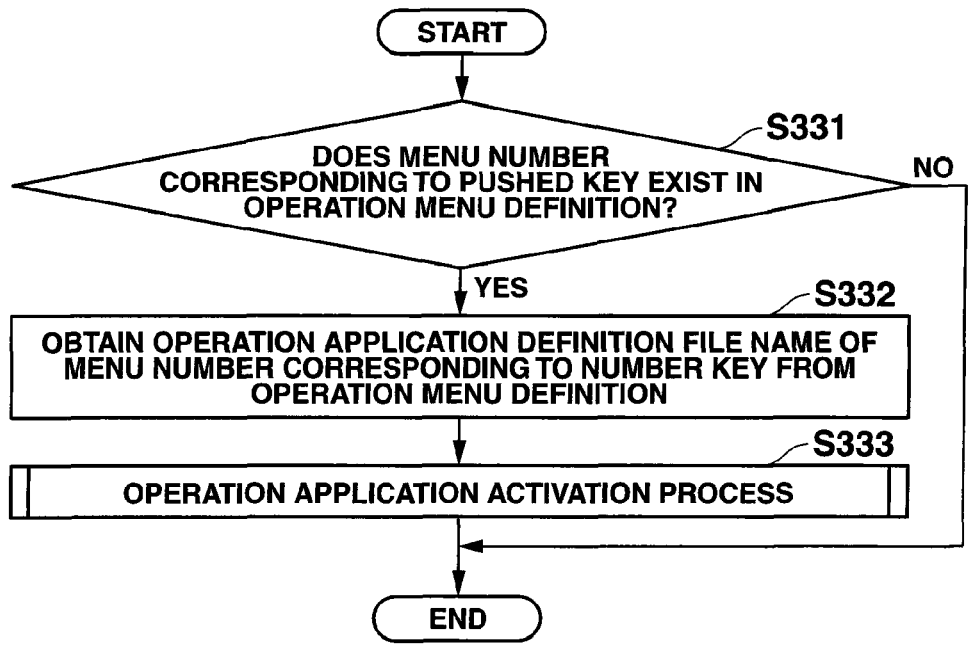
FIG. 49 is a flowchart showing a processing content when number keys in the main menu screen are operated.

FIG. 49 is a flowchart showing the processing content when the number key in the main menu screen is operated.

The CPU 31 determines whether the menu number corresponding to the operated number key exists in the operation menu definition or not (step S331). When the menu number does not exist (step S331: NO), the process is finished.

In step S331, when the menu number corresponding to the operated number key exists in the operation menu definition (step S331: YES), the CPU 31 obtains the file name of the operation application definition 83 to which the menu number corresponding to the operated number key is attached from the operation menu definition 82 (step S332) and carries out the activation process of the operation application 72 (step S333).

Figure 50:
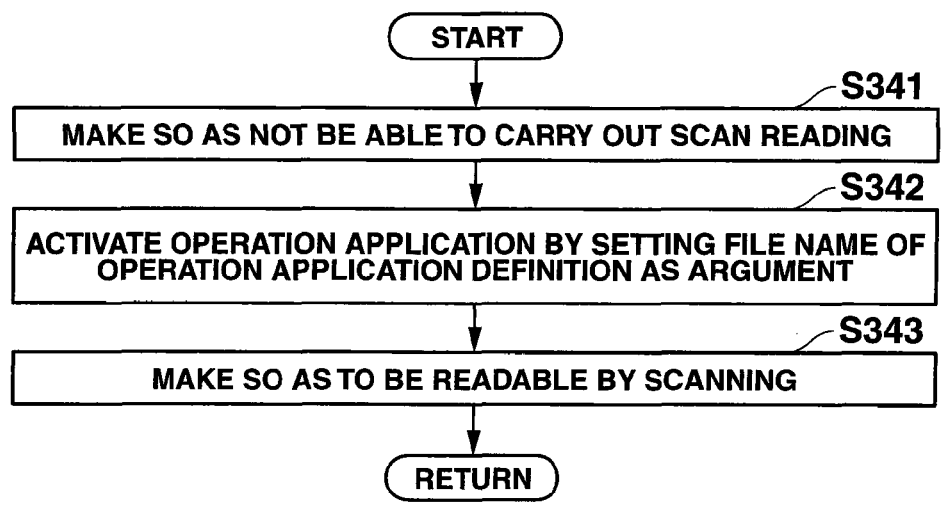
FIG. 50 is a flowchart showing a content of a start-up process of the operation application.

FIG. 50 is a flowchart showing the content of the activation process of the operation application 72.

The CPU 31 makes the scanner 41 be in a state where reading cannot be carried out (step S341), activates the operation application 71 by setting the file name of the operation application definition 83 which is obtained in step S321 or in step S332 as an argument (step S342), and thereafter, makes the scanner 41 be in a state where reading can be carried out (step S343).

Figure 51:
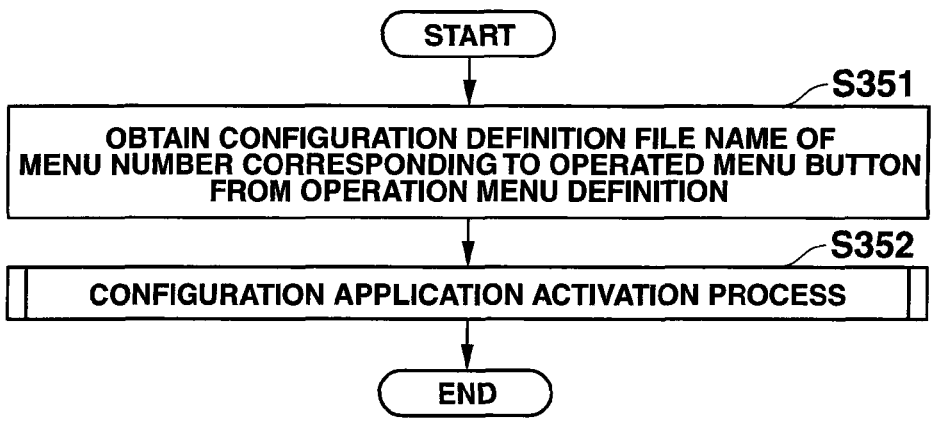
FIG. 51 is a flowchart showing a processing content when a menu button in a configuration menu screen is operated.

FIG. 51 is a flowchart showing the processing content when the menu button in the configuration menu screen is operated.

The CPU 31 obtains the file name of the configuration definition 74 to which the menu number corresponding to the operated menu button is attached from the operation menu definition 82 (step S351), and carries out an activation process of the configuration application 73 (step S352).

Figure 52:
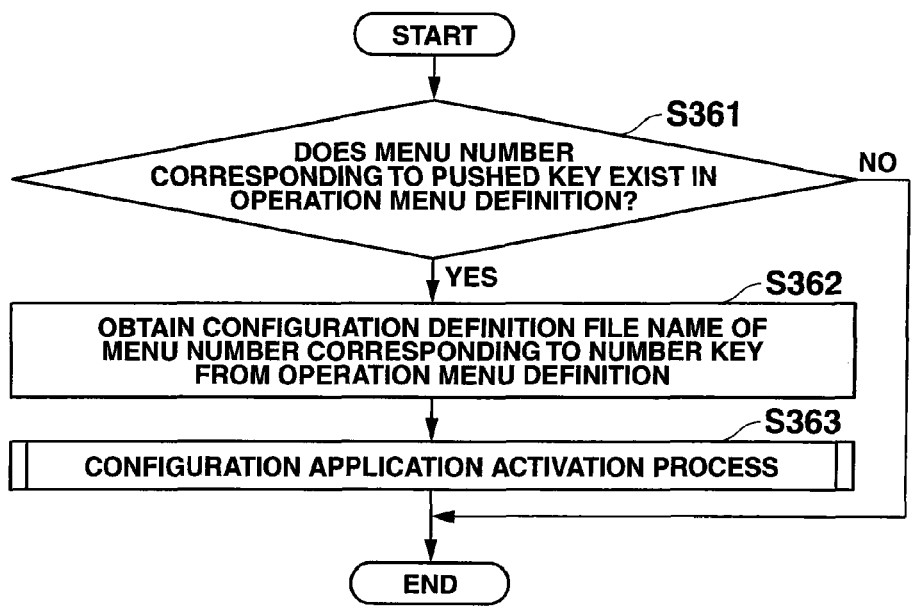
FIG. 52 is a flowchart showing a processing content when number keys in the configuration menu screen are operated.

FIG. 52 is a flowchart showing the processing content when a number key in the configuration menu screen is operated.

The CPU 31 determines whether the menu number corresponding to the operated number key exists in the operation menu definition or not (step S361). When the menu number does not exist (step S361: NO), the process is finished.

In step S361, when the menu number corresponding to the operated number key exists in the operation menu definition (step S361: YES), the CPU 31 obtains the file name of the configuration definition 74 of the menu number corresponding to the operated number key from the operation menu configuration 82 (step S362), and carries out the activation process of the configuration application 73 (step S363).

Figure 53:
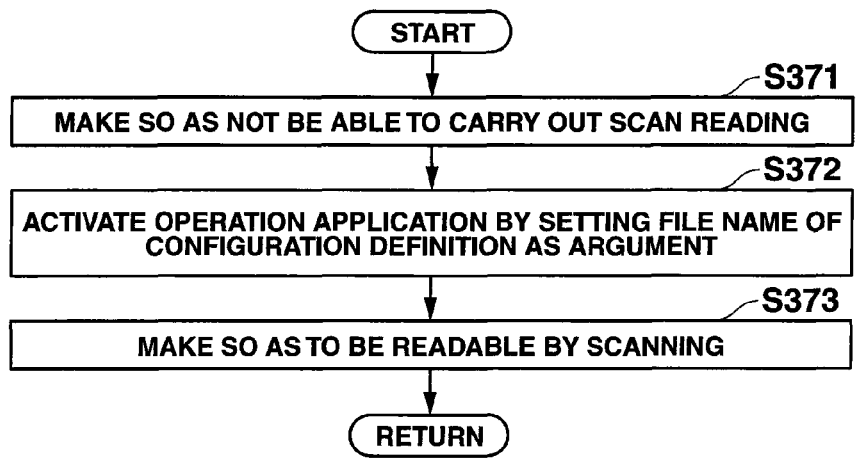
FIG. 53 is a flowchart showing a content of a start-up process of a configuration application.

FIG. 53 is a flowchart showing the content of the activation process of the configuration application 73.

The CPU 31 makes the scanner 41 be in a state where reading cannot be carried out (step S371), activates the configuration application 74 by setting the file name of the configuration definition 74 obtained in step S351 or in step S362 as an argument (step S372), and thereafter, makes the scanner 41 be in a state where reading can be carried out (step S373).

Figure 54:
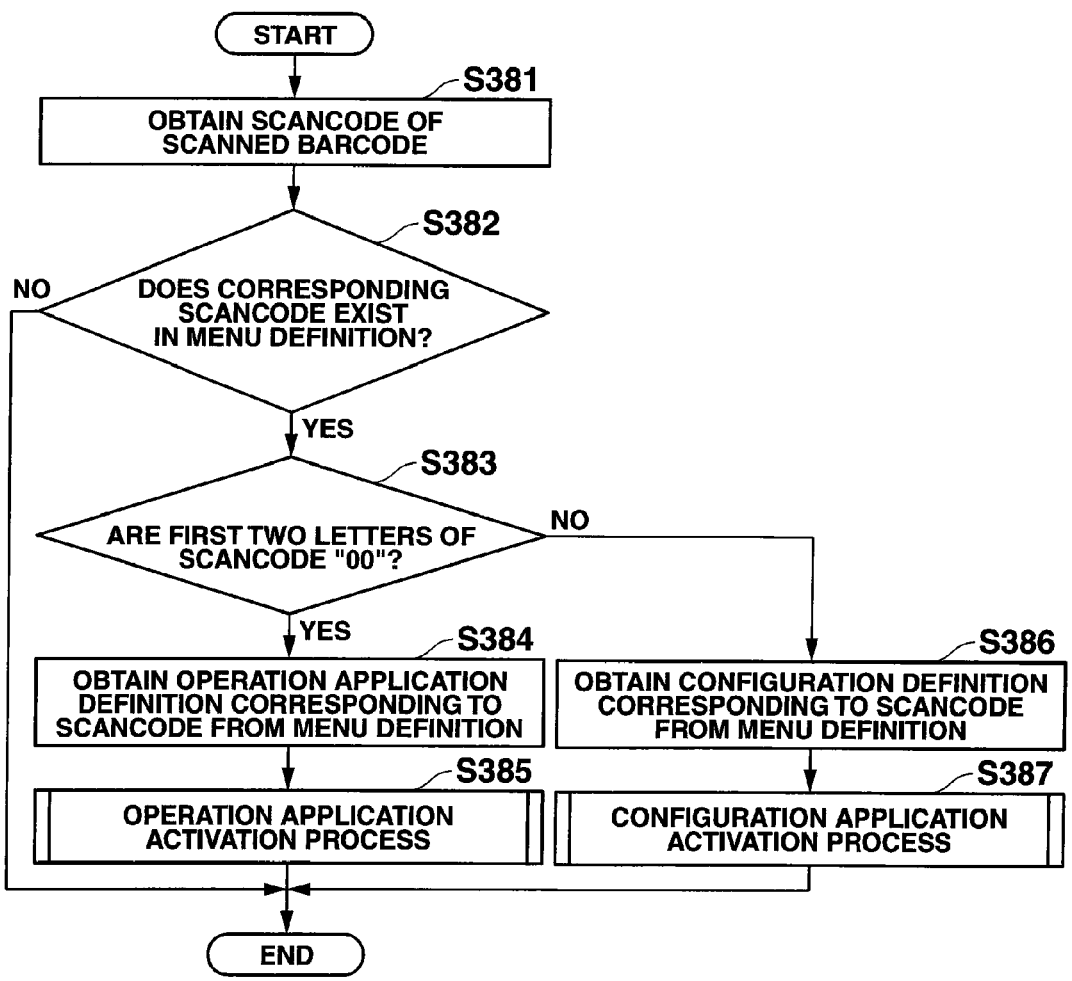
FIG. 54 is a flowchart showing a content of a scan process of the menu sheet.

FIG. 54 is a flowchart showing the content of the scan process of the menu sheet 84.

The CPU 31 obtains letter string information (scancode) indicated by the barcode which is scanned by the scanner 41 (step S381), and determines whether the scancode number corresponding to the scancode obtained in step S381 exists in the content of the operation menu definition 72 or not (step S382).

In step S382, when the scancode number corresponding to the content of the operation definition 72 does not exist (step S382: NO), the CPU 31 finishes the process, and when the scancode number corresponding to the content of the operation menu definition 72 exists (step S382: YES), the CPU 31 determines whether the first two letters of the scancode number is "00" or not (step S383).

In step S383, when the first two letters of the scancode number is "00" (step S383: YES), the CPU 31 obtains the file name of the operation application definition 83 corresponding to the scancode number from the operation menu definition 82 (step S384), and carries out the activation operation of the operation application 72 (step S385).

In step S383, when the first two letters of the scancode number is not "00" (step S383: NO), the CPU 31 obtains the file name of the configuration definition 74 corresponding to the scancode number from the operation menu definition 82 (step S386), and carries out the activation process the configuration application 73 (step S387).

Figure 55:
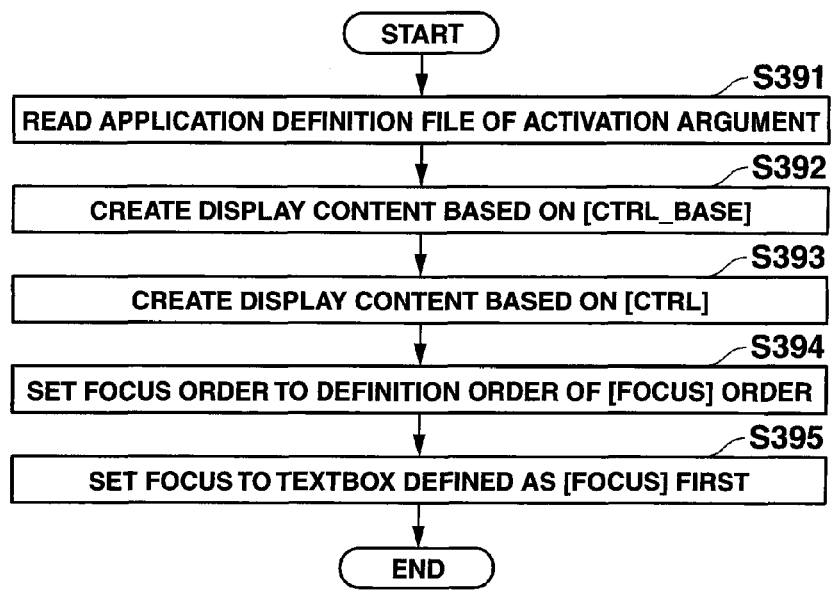
FIG. 55 is a flowchart showing a processing content to be carried out at the time of start-up of the operation application.

FIG. 55 is a flowchart showing the processing content which is carried out when the operation application 72 is activated.

The CPU 31 reads the file of the operation application definition 83 which is assigned as the argument at the time of activation (step S391), and orderly carries out a forming of a display content based on the content of [CTRL_BASE] of the read operation application definition 83 (step s392), a creating of a display content based on the content of [CTRL] of the read operation application definition 83 (step S393), a process to set focus order in the order defined by "ORDER= . . . " of [FOCUS] of the read operation application definition 83 (step S394), and a process to focus the textbox which is defined by "FIRST= . . . " of [FOCUS] of the read operation application definition 83 (step S395).

Figure 56:
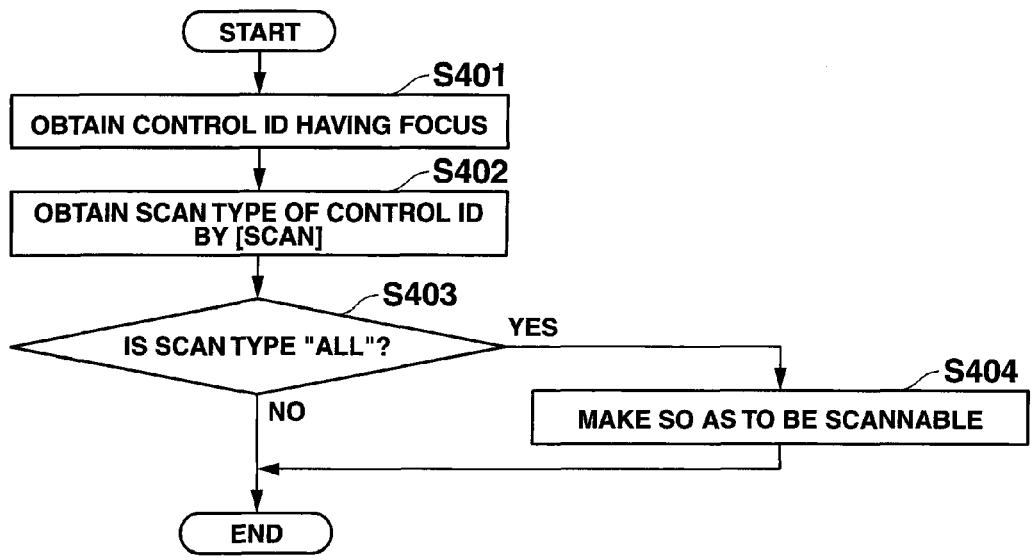
FIG. 56 is a flowchart showing a content of an EDIT focus-in process.

FIG. 56 is a flowchart showing the content of EDIT focus-in process. The EDIT focus-in is a switching process of scan capable/not capable which is carried out when the textbox is to be focused.

The CPU 31 obtains the control ID of the textbox which is focused (step S401), and obtains the scan type (ALL or NON) of the entry corresponding to the control ID obtained in step S401 among the control ID defined in [SCAN] of the operation application definition 83 which is read at the time of activation of the operation application 72 (step S402).

Then, the CPU 31 determines whether the scan type obtained in step S402 is "ALL" or not (step S403). When the scan types is "ALL", the CPU 31 allows scanning to be carried out by the scanner 41 (step S404), and when the scan type is not "ALL", the process is finished.

Figure 57:
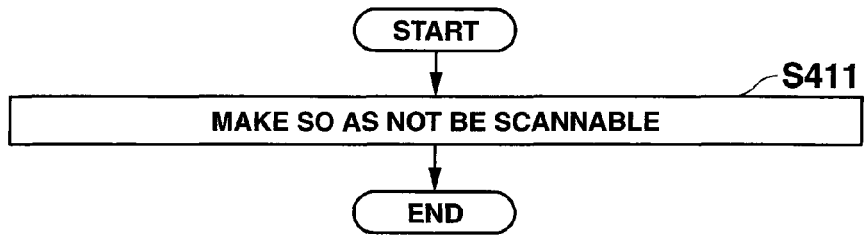
FIG. 57 is a flowchart showing a content of an EDIT focus-out process.

FIG. 57 is a flowchart showing the content of EDIT focus-out process. The EDIT focus-out is a switching process of scan capable/not capable which is carried out when the focus is taken away from the textbox.

The CPU 31 carries out a process to make scanning not be able to carried out by the scanner 41 at the time of the focus-out (step S411).

Figure 58:
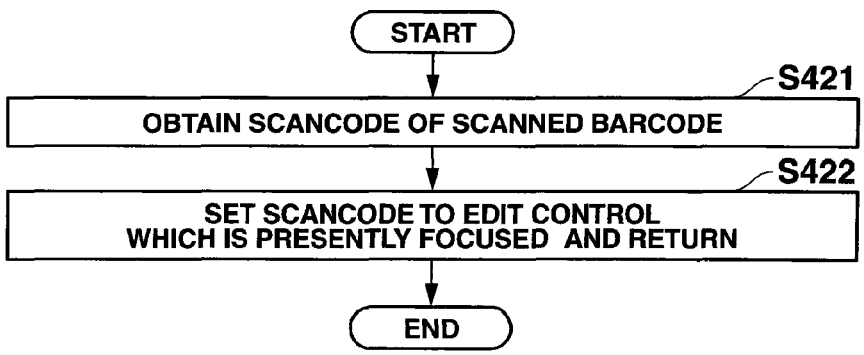
FIG. 58 is a flowchart showing a content of a scan process when the operation application is executed.

FIG. 58 is a flowchart showing the content of the scan process when the operation application 72 is executed.

The CPU 31 obtains the letter string information indicated by the scanned barcode (scancode) (step S421), and sets the scancode in the textbox presently being focused and returns (step S422).

In step S422, "return" means to carry out a process to fix the inputted content in the textbox and to move the focus to the next textbox.

Figure 59:
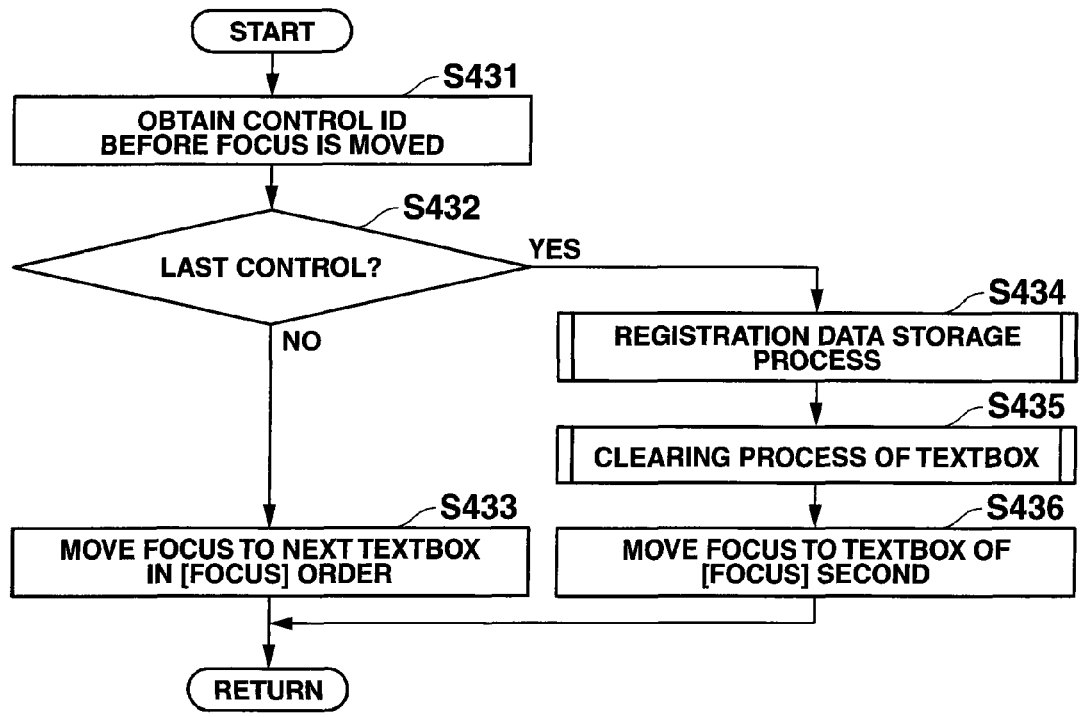
FIG. 59 is a flowchart showing a processing content when the focus is moved.

FIG. 59 is a flowchart showing the processing content when the focus moves.

The CPU 31 obtains the control ID of the textbox which was focused before the focus is moved (step S431), and determines whether the control ID obtained in step S431 is the textbox (last control) which is described lastly in "ORDER= . . . " of [FOCUS] of the operation application definition 83 which is read when the operation application 72 is activated or not (step S432).

In step S432, when the control ID obtained in step S431 is not the last control (step S432: NO), the CPU 31 moves the focus to the textbox which is described next to the control ID which is obtained in step S431 in "ORDER= . . . " of [FOCUS] of the operation application definition 83 which is read when the operation application 72 is activated (step S433).

In step S432, when the control ID obtained in step S431 is the last control (step S432: YES), the CPU 31 orderly carries out the registration data storage process (step S434) and the clearing process of the textbox (step S435), and moves the focus to the textbox which is assigned by "SECOND= . . . " of [FOCUS] of the operation application definition 83 which is read when the operation application 72 is activated (step S436).

Figure 60:
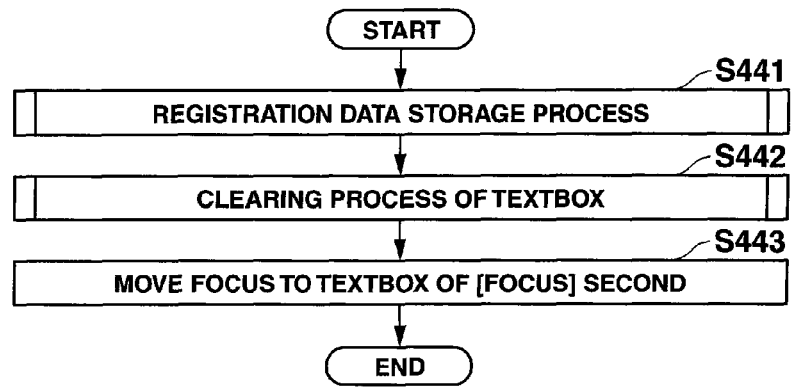
FIG. 60 is a flowchart showing a processing content when a registration button and a return key of the input device are operated.

FIG. 60 is a flowchart showing the processing content when the enter button and the return key of the input device 37 are operated.

The CPU 31 orderly carries out the registration data storage process (step S441) and the clearing process of the textbox (step S442), and moves the focus to the textbox which is assigned by "SECOND= . . . " of [FOCUS] of the operation application definition 83 which is read when the operation application 72 is activated (step S443).

Figure 61:
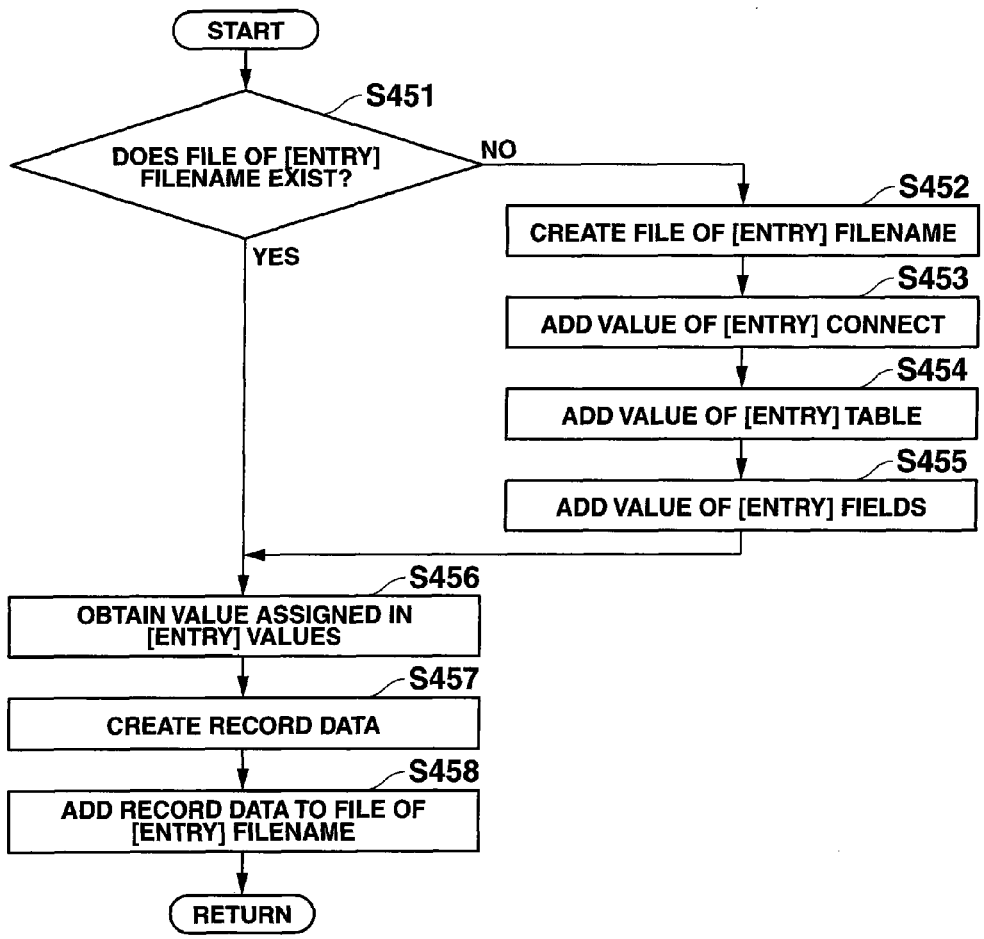
FIG. 61 is a flowchart showing a content of a registration data storage process shown in step S434 and step S441.

FIG. 61 is a flowchart showing the content of the registration data storage process shown in step S434 of FIG. 59 and in step S441 of FIG. 60.

The CPU 31 determines whether a file including the file name which is set to FILENAME entry of [ENTRY] of the operation application definition 83 which is read when the operation application 72 is activated exists in the flash memory 34 or not (step S451).

In step S451, when the file does not exit in the flash memory 34 (step S451: NO), the CPU 31 creates a file in the file name which is set to FILENAME entry of [ENTRY] (step S452), and orderly carries out an add process of the value of CONNECT of [ENTRY] to the tile created in step S452 (step S453), an add process of the value of TABLE of [ENTRY] (step S454) and an add process of the value of FIELDS of [ENTRY] (step S455) to the file formed in step S452.

After the process of step S455 or in step S451, when the file exists in the flash memory 34 (step S451: YES), the CPU 31 obtains a value which indicates the textbox which is assigned by VALUES of [ENTRY] (step S456), creates record data to record the input content of each textbox in the registration data 86 based on the value of control obtained in step S456 (step S457), and additionally records the record data created in step S457 in the file having the file name which is set in FILENAME entry of [ENTRY] (step S458).

Figure 62:
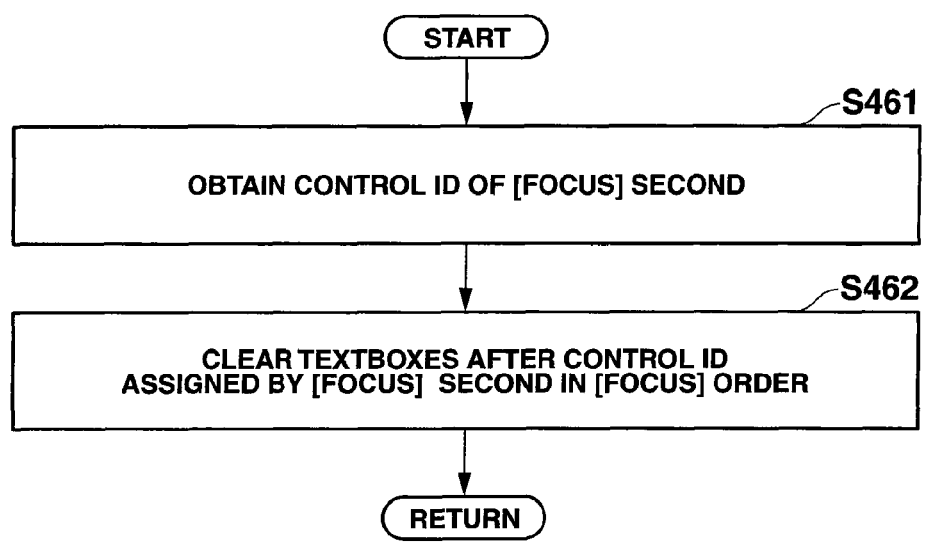
FIG. 62 is a flowchart showing a content of a clearing process of a textbox shown in step S435 and step S442.

FIG. 62 is a flowchart showing the content of the clearing process of the textbox shown in step S435 of FIG. 59 and in step S442 of FIG. 60.

The CPU 31 obtains the control ID which indicates the textbox assigned by "SECOND= . . . " of [FOCUS] of the operation application definition 83 which is read when the operation application 72 is activated (step S461), and clears the values which are inputted in the textboxes corresponding to the control ID described after the control ID which indicates the textbox assigned by the control ID obtained in step S461, that is, the textbox assigned by "SECOND= . . . " of [FOCUS] (step S462).

The application generation system 100 according to the embodiment, a label (barcode label) in which the barcodes are printed can also be formed by the function of the barcode label forming module 65.

In FIG. 63, an example of display content of the display device 18 of the data processing device 1 when forming the barcode label is shown.

In FIG. 64, an example of printing data of the generated barcode label is shown.

The data processing device 1 can create the barcode label based on the master data 75.

As shown in FIG. 63, the master data 75 exists as data so as to make at least each record of product codes and product names be corresponded to each other.

In addition to make the product codes and the product names be corresponded to each other, the master data 75 can also make additional other items (for example, "product name reading" shown in FIG. 63 and the like) be corresponded.

The master data 75 is tabular data which can be used in the spreadsheet software 61.

The master data 75 is opened by using the spreadsheet software 61, and when "create barcode label" in the right-click menu is selected in a state where the product code and the product name of which the barcode label is desired to be made are selected, the CPU 11 executes the barcode label creating module 65 based on the selected product code and product name to generated the barcode sheet 87 shown in FIG. 64.

The generated barcode sheet 87 is printed on the label sheet by being printed via the label printer 3 and is printout as the barcode label.

According to the application generation system 100 of the embodiment, the table data 81 in which arbitrary items are defined is generated by using the spreadsheet software 61, the application generation module 62 generates the operation application definition 83 which is the definition file for carrying out data collection and recording of the items which are defined in the table data 81 by the operation application 72 executed by the handy terminal 5 based on the table data 81, and the operation application 72 and the operation application definition 83 are transferred to the handy terminal 5 by the communication modules 63 and 66.

In such way, the data collection and recording of the arbitrary items which are defined by a user in the table data 81 can be carried out by the handy terminal 5. Generation of the table data 81 and operation for defining the arbitrary items can be done only by the inputting operation of data using the spreadsheet software 61, and this is extremely easy comparing to creating of application and creating of application by using a special program tool. That is, a user can easily form the application for carrying out the data collection and recording of the arbitrary items by the handy terminal 5 by carrying out simple operation.

Further, by setting attribution (for example, bold font assignment and the like) to the arbitrary items in the operation of the spreadsheet software 61, arbitrary items can be assigned as the item corresponding to the information to be read by the scanner 41.

In such way, a user can explicitly assign the items corresponding to the data to be read from the barcode when forming the table data 81.

Further, by setting attribution (for example, bold font assignment and the like) to the arbitrary items in the operation of the spreadsheet software 61, the items which are assigned as the items corresponding to the information to be read by the scanner 41 can be visually discriminated from other items.

In such way, a user can explicitly assign the items corresponding to the data to be read from the barcode when forming the table data 81, and also, a use can visually confirm the items which are assigned as the items corresponding to the information to be read by the scanner 41.

Moreover, when the operation application 72 is executed, the CPU 31 makes the display device 38 display the screen which allows data input by the input device 38 of the handy terminal 5 with respect to a plurality of items which are defined in the table data 81 by reading the operation application definition 83 and allows input to the textbox of the item which is focused in the screen as shown in FIGS. 7A to 7C, for example. Further, as shown in FIGS. 8A and 8B, when the item corresponding to the data to be collected based on the barcode among a plurality of items which are defined in the table data is not the item to be input first, the CPU 31 moves the focus to the item corresponding to the data to be collected based on the barcode when the focus is to be moved by the "enter" button included in the display content or the return key included in the input device 3 after the input of the items to be inputted before the items corresponding to the data to be collected based on the barcode is finished.

In such way, moving of the focus with respect to the items in which the content of data changes by repeating the scan operation can be carried out smoothly, and the scan operation can be carried out smoothly.

In addition, as for the data in which the input content inputted by the scan operation is not changed, for example, input of data such as data when the scan operation is carried out, name of the person in charge who carries out the scan operation and the like, it is sufficient that the input is carried out only once.

After the input of data in which the input content does not change, the focus will not move to the data in which the input content by the scan operation does not change. Therefore, a user will not delete or change the input content by mistake.

Furthermore, because there is no need to manually move the focus to the item to which the scan operation it to be carried out, the scan operation can be carried out even more smoothly.

Moreover, the data processing device 1 generates the registration table data 85 when the application generation module 62 is executed, and takes the registration data 86 into the data processing device 1 and stores the data recorded in the registration data 86 in the registration table data 85 when the registration data 86 exists in the flash memory of the handy terminal 5 by the function of the table data registration module 64.

In such way, a use can take the result of the data collection and recording which are carried out by using the handy terminal 5 into the data processing device 1 and store the result in the registration table data 85 just by connecting the handy terminal 5 to the cradle 2 after the data collection and recording. Therefore, the efficiency of data collection is improved.

Further, a plurality of sheets are formed when the table data 81 is formed and individual items can be defined in each of the sheets, and the application generation module generates the operation application definition 83 corresponding to each of the sheet in the table data 81.

In such way, data collection and recoding of the items which are defined in each of the sheets can be carried out by the handy terminal 5 by assigning the operation application definition 83 to be read when the operation application 72 is activated. Therefore, a user can create an application to carry out more varied and versatile data collection.

Moreover, when the application generation module 62 is executed, the data processing device 1 generates the operation menu definition 82 which corresponds to each of the sheets generated in the table data 81, that is, corresponding to each of the operation application definitions 83 to be generated, and transfers the operation menu definitions 82 to the handy terminal 5 along with the operation menu 71.

In such way, the operation application definition 83 to be read when the operation application 72 is activated can be selected and assigned by executing the operation menu 71 in the handy terminal 5, and the items defined in each of the sheets in the table data 81 can be used accordingly. Therefore, a user can easily use the application to carry out varied and versatile data collection.

The above description of the embodiment shows an example of embodiments of the present invention, and does not limit the embodiment of the present invention.

For example, in the above embodiment, the operation application 72 and the operation application definition 83 are individually provided, and it is structured that operation application 72 reads the operation application definition 83 when the operation application 72 is activated and decides the processing content, and the operation content of the operation application 72 is decided by the application generation module 62 generating the operation application definition 83. However, other methods can be used.

For example, the operation application 72 and the operation application definition 83 may be one execution file and not be individually provided, and the application generation module 62 may generate the execution file of the application which can be executed by the data collection device such as the handy terminal 5.

In the above embodiment, barcode is described as an example of discrimination information and a handy terminal is described as an example of data collection device. However, other discrimination information and data collection device may be used. For example, two-dimensional barcodes, RFID and other standard may be used as discrimination information, and a terminal with camera, a RFID reader and the like may be used as data collection device other than the handy terminal.

As for the communication by the communication device 16 and the communication device 36 shown in the above embodiment, using of devices for other communication standard and a communication standard which will be standardized in future is not prevented from being used.

Similarly, as for each of the parts that construct the application generation system 100, replacement by an existing structure in which each of the parts are fungible or by a structure which comes out in future is not prevented from being used.

Various types of variables, parameters, formats and other configurations which are exemplified in the above embodiment are only examples and they can be changed arbitrarily.

The entire disclosure of Japanese Patent Application No. 2009-020567 filed on Jan. 30, 2009 including descriptions, claims, drawings, and abstracts are incorporated herein by reference in its entirety.

What is claimed is:

1. An application software generation device which generates definition data for defining data to be collected by a data collection device by operating with a program constituting an application software, and which generates the application software for the data collection device having a reading unit to read discrimination information to carry out a data collection operation based on the discrimination information, the application software generation device comprising:
   a CPU, wherein the CPU operates as:
      a table data generation unit to generate table data which includes a sheet in which a sheet name and an item corresponding to the data collection operation are set according to an input operation of a user;
      an application software generation unit to:
   (i) generate an operation application definition as the definition data of an operation application which is a program for obtaining the data based on the discrimination information, and (ii) generate an operation menu definition as the definition data of an operation menu which is a program for displaying, in a display device of the data collection device, a menu screen for selecting the operation application definition defining the operation application from among a plurality of operation application definitions; and
      a transfer unit to transfer the generated operation application definition and the generated operation menu definition to the data collection device,
   wherein the application software generation unit generates the operation application definition for defining the operation application and the operation menu definition for defining the operation menu based on the table data which is generated according to the input operation of the user,
   wherein the application software comprises:
      a function to make the display device of the data collection device display a screen to carry out an input of data by the data collection device with respect to the plurality of items which are defined in the table data,
      a function to allow input to an item which is focused on in the screen, and
      a function to move the focus based on a predetermined rule, and
   wherein, when the item which corresponds to the data to be collected based on the discrimination information from among the plurality of items defined in the table data is not a first item to be input, the application software generation unit generates a rule to move the focus to the item when the focus is moved by the function to move the focus after the input to the item to be input before the item is finished.

2. The application software generation device according to claim 1, wherein the CPU further operates as an assigning unit to assign the item which corresponds to the data to be collected based on the discrimination information.

3. The application software generation device according to claim 2, wherein the assigning unit makes the item, which corresponds to the data to be collected based on the discrimination information, from among a plurality of items defined in the table data, to be visually discriminated from other items.

4. The application software generation device according to claim 1, wherein the CPU further operates as:
   an empty data generation unit to generate an empty table data having items corresponding to a plurality of items which are defined in the table data;
   a take-in unit to take in data collected by the data collection device in which the application software is executed; and
   a storage unit to store the data which is taken in by the take-in unit in the empty table data.

5. The application software generation device according to claim 1, wherein the table data generation unit generates a plurality of table data, and the application software generation unit generates a plurality of application software corresponding to the plurality of table data, respectively.

6. The application software generation device according to claim 5, wherein the application software generation unit generates the plurality of application software which respectively correspond to each of the plurality of table data and also generates the operation menu to select and use any one of the generated plurality of application software, and the transfer unit transfers the plurality of application software and the operation menu to the data collection device.

7. The application software generation device according to claim 1, wherein the application software generation unit: (i) generates the operation application definition for making the data to be collected by the data collection device and data of the item set in the sheet of the table data correspond to each other based on the table data generated by the table data generation unit for the sheet individually, and (ii) generates the operation menu definition for making a selection item to be displayed in the display device of the data collection device in which the operation menu is executed, wherein the operation application definition generated based on the sheet in the table data correspond to each other based on a number of the sheet and the sheet name of the sheet included in the table data.

8. A non-transitory computer readable recording medium having stored thereon a computer program which is operable to control a computer to generate definition data for defining data to be collected by a data collection device by operating with a program constituting an application software, and generate the application software for the data collection device having a reading unit to read discrimination information to carry out a data collection operation based on the discrimination information, wherein the computer program is executable by the computer to perform functions comprising:

- generating table data which includes a sheet in which a sheet name and an item that corresponds to the data collection operation are set according to an input operation of a user;
- generating an operation application definition as the definition data of an operation application which is a program for obtaining the data based on the discrimination information, and generating an operation menu definition as the definition data of an operation menu which is a program for displaying in a display device of the data collection device, a menu screen for selecting the operation application definition defining the operation application from among a plurality of operation application definitions; and
- transferring the generated operation application definition and the generated operation menu definition to the data collection device,
- wherein the operation application definition for defining the operation application and the operation menu definition for defining the operation menu are generated based on the table data which is generated according to the input operation of the user,
- wherein the application software comprises:
  - a function to make the display device of the data collection device display a screen to carry out an input of data by the data collection device with respect to the plurality of items which are defined in the table data,
  - a function to allow input to an item which is focused on in the screen, and
  - a function to move the focus based on a predetermined rule, and
- wherein, when the item which corresponds to the data to be collected based on the discrimination information from among the plurality of items defined in the table data is not a first item to be input, a is generated rule to move the focus to the item when the focus is moved by the function to move the focus after the input to the item to be input before the item is finished.

9. An application software generation system, comprising:
- a data collection device having a reading unit to read discrimination information, and
- an application software generation device which generates definition data for defining data to be collected by the data collection device by operating with a program constituting an application software, and which generates the application software for the data collection device to carry out a data collection operation based on the discrimination information, wherein the application software generation device comprises a CPU which is operable as:
  - a table data generation unit to generate table data which includes a sheet in which a sheet name and an item corresponding to the data collection operation are set according to an input operation of a user;
  - an application software generation unit to:
  (i) generate an operation application definition as the definition data of an operation application which is a program for obtaining the data based on the discrimination information, and (ii) generate an operation menu definition as the definition data of an operation menu which is a program for displaying in a display device of the data collection device, a menu screen for selecting the operation application definition defining the operation application from among a plurality of operation application definitions; and
  - a transfer unit to transfer the generated operation application definition and the generated operation menu definition to the data collection device,
- wherein the application software generation unit generates the operation application definition for defining the operation application and the operation menu definition for defining the operation menu based on the table data which is generated according to the input operation of the user,
- wherein the application software comprises:
  - a function to make the display device of the data collection device display a screen to carry out an input of data by the data collection device with respect to the plurality of items which are defined in the table data,
  - a function to allow input to an item which is focused on in the screen, and
  - a function to move the focus based on a predetermined rule, and
- wherein, when the item which corresponds to the data to be collected based on the discrimination information from among the plurality of items defined in the table data is not a first item to be input, the application software generation unit generates a rule to move the focus to the item when the focus is moved by the function to move the focus after the input to the item to be input before the item is finished.

* * * * *